Nov. 8, 1932. H. ISHERWOOD 1,886,685
CALCULATING MACHINE
Filed June 18, 1928 30 Sheets-Sheet 5
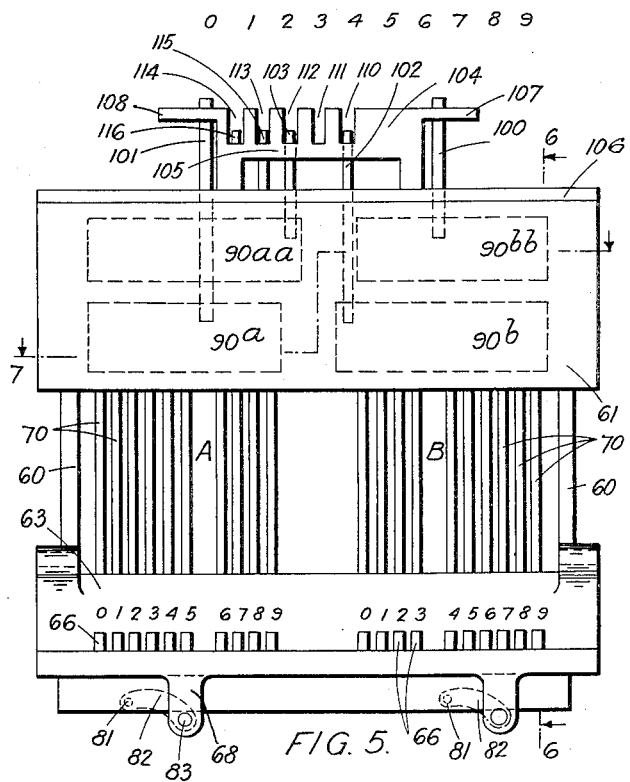

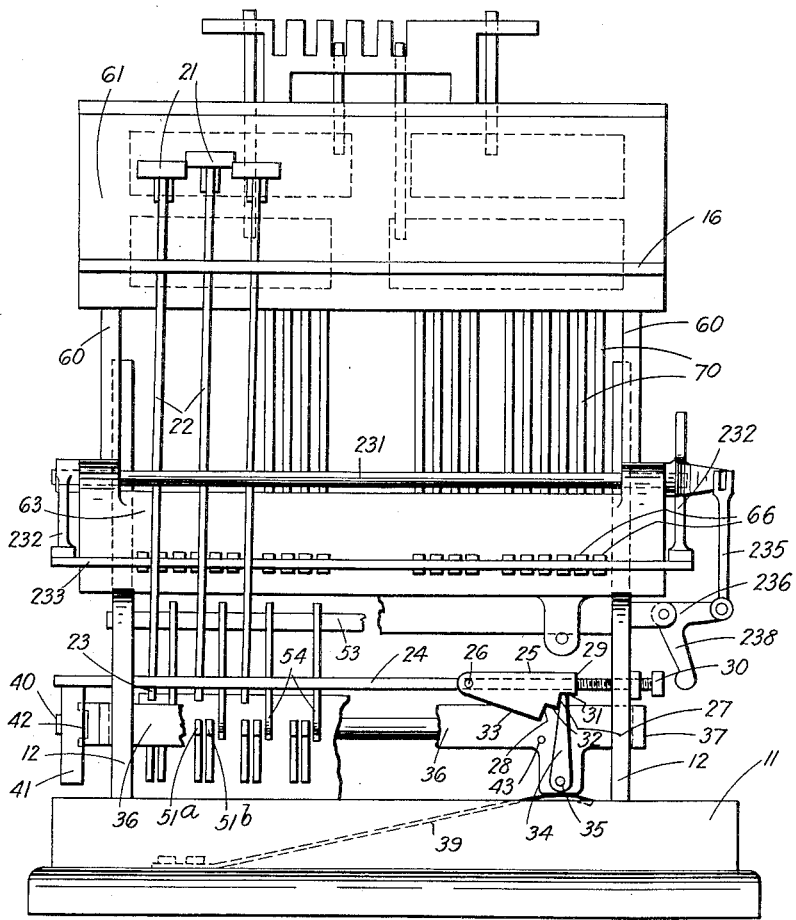

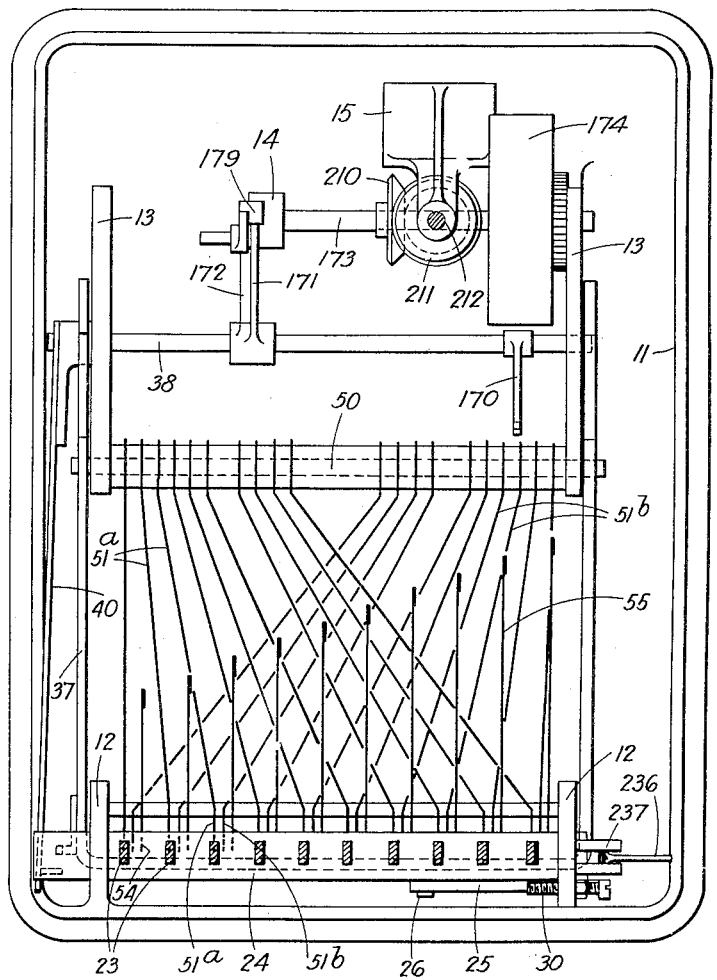

Nov. 8, 1932. H. ISHERWOOD 1,886,685
CALCULATING MACHINE
Filed June 18, 1928 30 Sheets-Sheet 6

Inventor
Harold Isherwood
By Watson, Coit, Morse & Grindle
attys

Nov. 8, 1932.  H. ISHERWOOD  1,886,685
CALCULATING MACHINE
Filed June 18, 1928   30 Sheets-Sheet 7
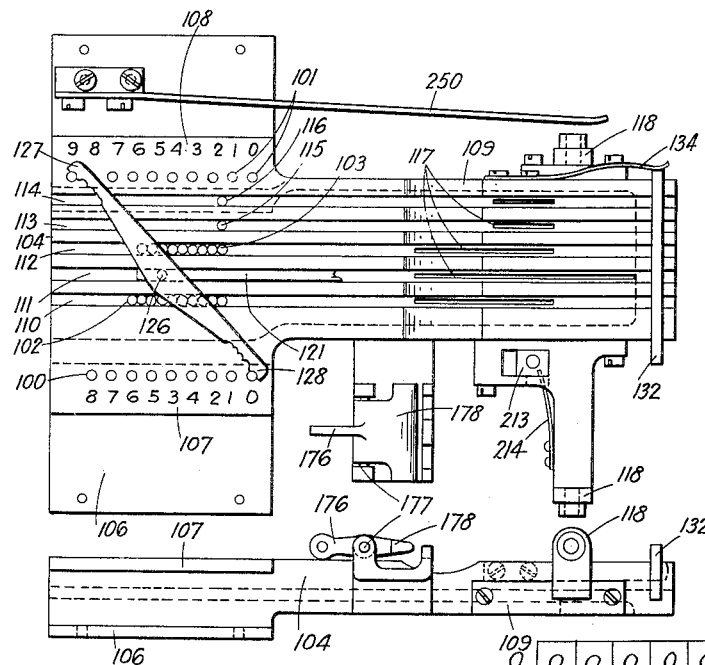
FIG.9.
FIG.9a
FIG.8a
FIG.10
FIG.11.
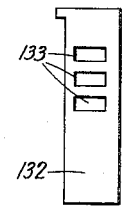
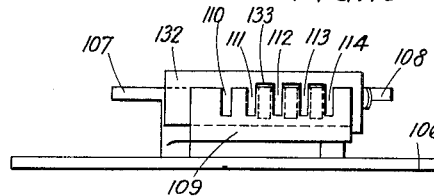
Inventor
Harold Isherwood
By Watson, Coit, Morse & Grindle
attys Nov. 8, 1932.   H. ISHERWOOD   1,886,685
CALCULATING MACHINE
Filed June 18, 1928   30 Sheets-Sheet 8

FIG.8.b

Inventor
Harold Isherwood

By Watson, Coit, Morse & Grindle
Attys

Nov. 8, 1932.   H. ISHERWOOD   1,886,685
CALCULATING MACHINE
Filed June 18, 1928   30 Sheets-Sheet 11

Inventor
Harold Isherwood
By Watson, Coit, Morse & Grindle
Attys.

Nov. 8, 1932.  H. ISHERWOOD  1,886,685
CALCULATING MACHINE
Filed June 18, 1928  30 Sheets-Sheet 12
FIG. 18.
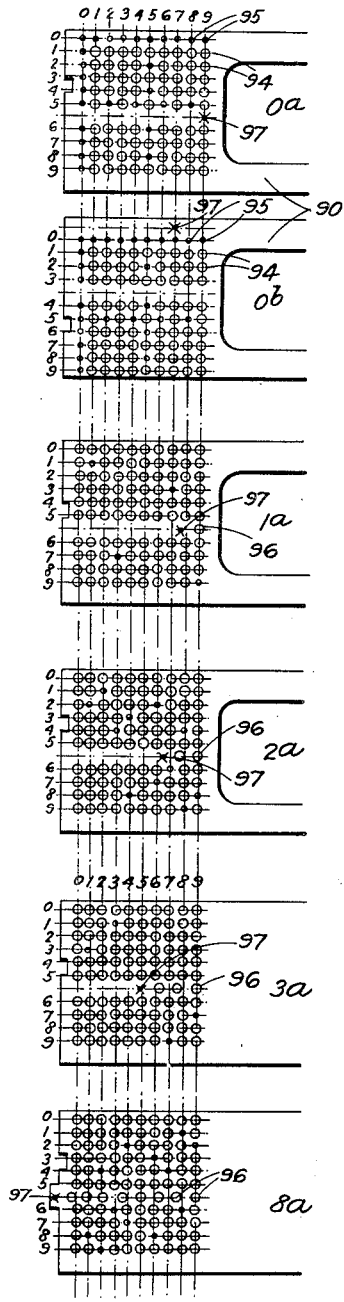
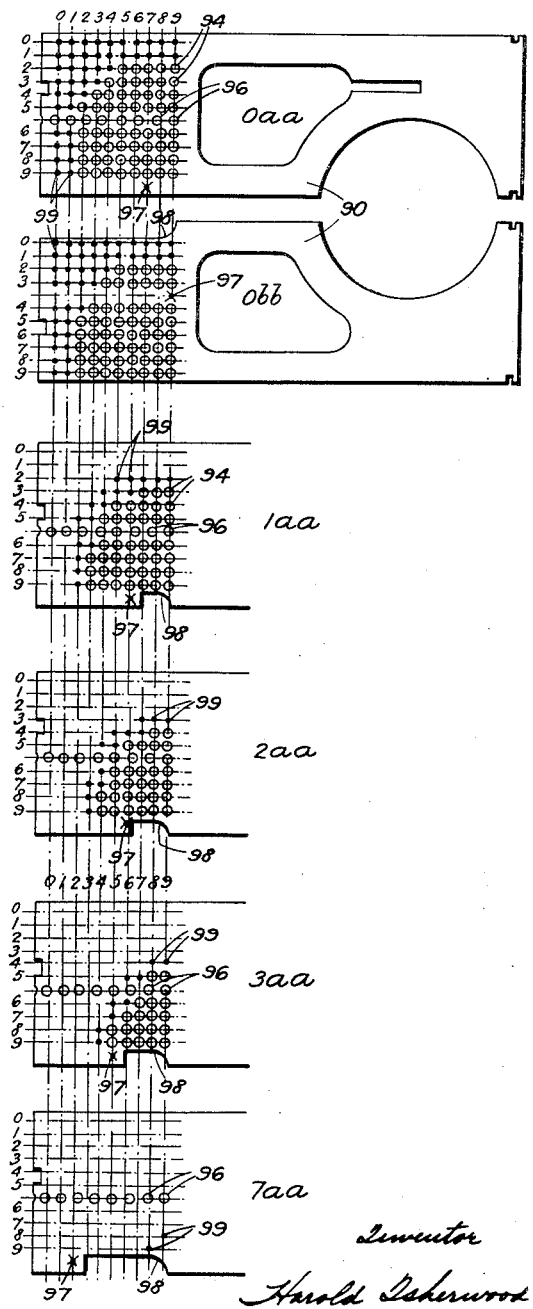

Nov. 8, 1932.   H. ISHERWOOD   1,886,685
CALCULATING MACHINE
Filed June 18, 1928   30 Sheets-Sheet 14

Nov. 8, 1932.   H. ISHERWOOD   1,886,685
CALCULATING MACHINE
Filed June 18, 1928   30 Sheets-Sheet 15

Inventor
Harold Isherwood
By Watson, Coit, Morse & Grindle
attys

Nov. 8, 1932.  H. ISHERWOOD  1,886,685
CALCULATING MACHINE
Filed June 18, 1928  30 Sheets-Sheet 16

Nov. 8, 1932.   H. ISHERWOOD   1,886,685
CALCULATING MACHINE
Filed June 18, 1928    30 Sheets-Sheet 18

Inventor
Harold Isherwood
By Watson, Coit, Morse & Grindle
Attys

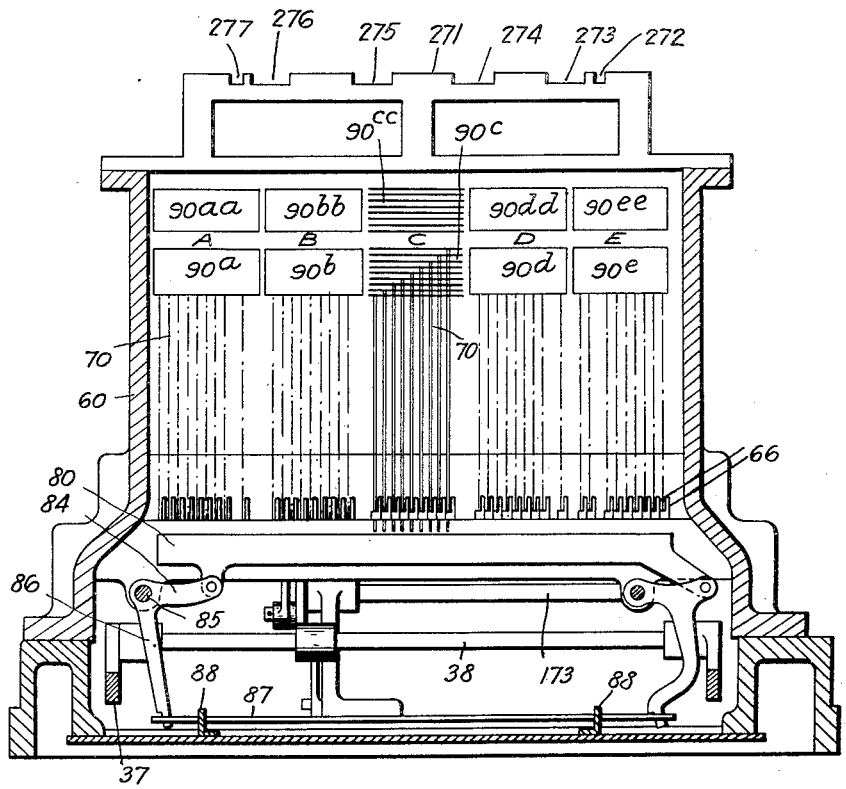
FIG. 26.
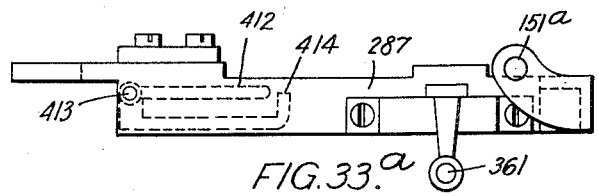
FIG. 33.ᵃ

Nov. 8, 1932.　　　H. ISHERWOOD　　　1,886,685
CALCULATING MACHINE
Filed June 18, 1928　　　30 Sheets-Sheet 21

Inventor
Harold Isherwood
By Watson, Coit, Morse & Grindle
Attys

Nov. 8, 1932.  H. ISHERWOOD  1,886,685
CALCULATING MACHINE
Filed June 18, 1928   30 Sheets-Sheet 22

Nov. 8, 1932.  H. ISHERWOOD  1,886,685
CALCULATING MACHINE
Filed June 18, 1928    30 Sheets-Sheet 23

Inventor
Harold Isherwood
By Watson, Coit, Morse & Grindle
Attys

Nov. 8, 1932. H. ISHERWOOD 1,886,685
CALCULATING MACHINE
Filed June 18, 1928 30 Sheets-Sheet 24
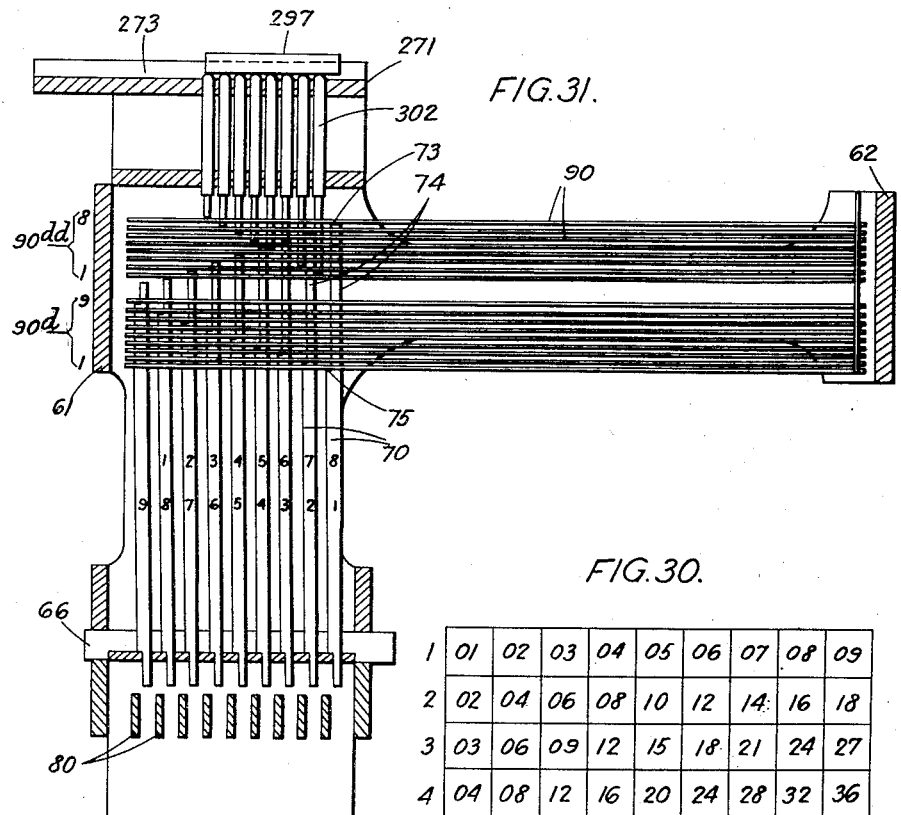

Nov. 8, 1932.  H. ISHERWOOD  1,886,685
CALCULATING MACHINE
Filed June 18, 1928   30 Sheets-Sheet 25
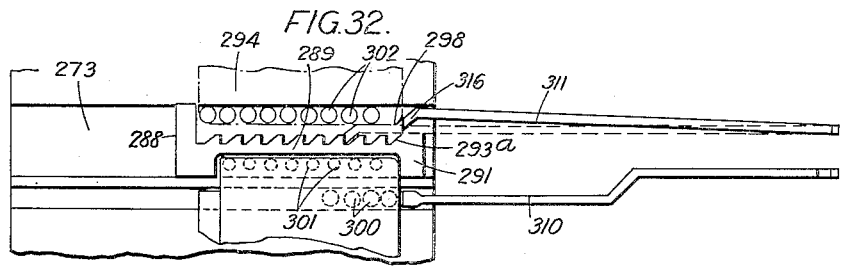
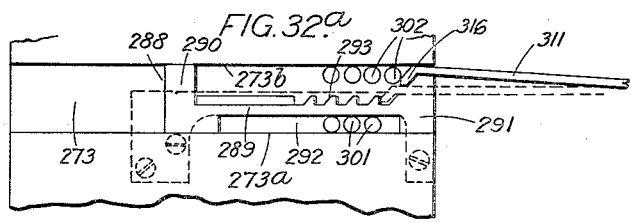
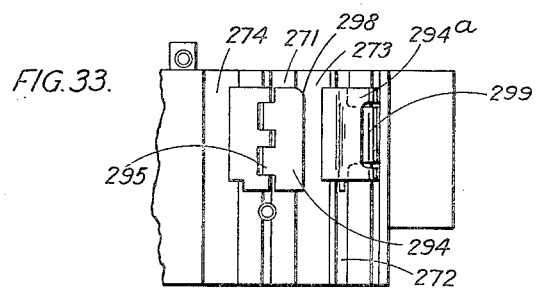
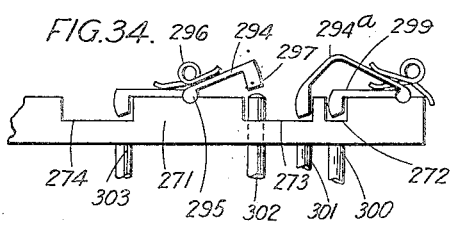
Inventor
Harold Isherwood
By Watson, Coit, Morse & Grindle
Attys Nov. 8, 1932.  H. ISHERWOOD  1,886,685
CALCULATING MACHINE
Filed June 18, 1928    30 Sheets-Sheet 26

Nov. 8, 1932.  H. ISHERWOOD  1,886,685
CALCULATING MACHINE
Filed June 18, 1928   30 Sheets-Sheet 27

Nov. 8, 1932.  H. ISHERWOOD  1,886,685
CALCULATING MACHINE
Filed June 18, 1928    30 Sheets-Sheet 30

Patented Nov. 8, 1932

1,886,685

UNITED STATES PATENT OFFICE

HAROLD ISHERWOOD, OF LONDON, ENGLAND, ASSIGNOR TO THE AUTOKAL SYNDICATE LIMITED, OF LONDON, ENGLAND, A COMPANY OF GREAT BRITAIN

CALCULATING MACHINE

Application filed June 18, 1928, Serial No. 286,250, and in Great Britain July 6, 1927.

This invention relates to calculating machines for performing multiplication and of the type in which members of the nature of stops to which number values are assigned are selected and set up, these stops being subsequently "felt" for the purpose of ascertaining the number values represented by the stops so as to enable an indication to be given of the answer to the sum performed.

According to this invention the calculating machine comprises in combination selector mechanism by means of which stops with partial product values can be set up, a set of numeral keys, two or more sets of members by movement of which stop selection and setting up is brought about in the selector mechanism, and means whereby as and when successive key operation takes place for the purpose of feeding the factors of a sum or problem to be solved into the machine, members are moved in different sets in succession. The mechanism whereby the selector mechanism is actuated so as to effect stop selection and set up the selected stops comprises one or more sets of members which are operated when the figure or figures in the first factor of the sum are fed into the machine, these members serving to effect partial selection in the selector mechanism, and a single set of members which are operated when the figure or figures in the second factor of the sum are fed into the machine, these members serving to complete the selection in and cause the setting up of the stops by the selector mechanism. Key-actuated members are interposed between the keys and the said selector actuating members, these key-actuated members being arranged on the one hand in sets corresponding to and co-operating with the several sets of selector actuating members, and on the other hand being grouped in relation to the several keys so that a key-actuated member belonging to each set is associated with and can be actuated by one and the same key.

Means are provided whereby the operative relation between each key and the key-actuated members forming the group associated with that key can be altered so that selector actuating members will be operated in different sets in succession as and when successive key operation takes place. The selector is composed of sections which function severally in respect of different denominations. The sets of members by means of which selection is effected serve first to bring the selector sections in succession into operative relation with a single set of keys in accordance with the different denominations of the figures in the first factor when these figures are fed in and partial selection is taking place, and secondly they serve to establish an operative connection between the keys and the means by which the selection is completed in all the selector sections simultaneously. In combination with the set of numeral keys and the selector mechanism by means of which stops with partial product values can be set up, there may be two or more sets of levers by actuation of which partial selection is effected in the selector mechanism and by suitable means the successive operation of a key or keys for the purpose of feeding into the machine the figure or figures in the first factor of the sum will cause the actuation of the said levers in separate sets in succession. There may also be a set of levers by actuation of which selection is completed in the selector mechanism and by suitable means these levers are actuated after the feeding in of the first factor in the sum has been completed and when a key or keys are operated in succession to feed into the machine the figure or figures in the second factor of the sum.

The selector mechanism comprises conveniently a series of two or more substantially similar sections the number of which corresponds to the capacity of the machine in respect of the number of figures in the first factor that can be dealt with. There are two or more sets of selector actuating members each set corresponding to a section of the selector mechanism the movement of the members in a set effecting partial selection in the selector section with which the set of members cooperates. There is a single set of selector actuating members operative with respect to all the sections of the selector mechanism simultaneously to complete the selection and setting up of stops. Conveniently the selector actuating members and the key-actuated members are respectively constituted by the arms of two-armed levers, these two-armed levers as a whole being arranged in sets but with the key-actuated arms of these levers or members acting thereon or connected thereto arranged in groups in such relation to the several keys that a two-armed lever belonging to each set can be actuated by one and the same key, the actuation of the grouped members taking place in succession as the keys are actuated in succession for the purpose of feeding in the factors of the sum to be performed.

The mechanism for selecting and setting up the stops may be constructed in various ways but conveniently comprises rods disposed substantially vertically and each movable independently in the direction of its length. The lower ends of all these rods appear in end view as in parallel rows which extend in two directions in one plane and preferably at right angles.

The rods forming those rows which extend in one direction constitute sets so mounted that all the rods in a selected set can be moved simultaneously as by swinging in a direction transverse to their length. A series of knife-like members are mounted so that any selected knife can be reciprocated towards the ends of the rods, all the knives lying parallel and extending in a direction forming an angle to the direction in which the rods are movable transversely. The selective swinging or other transverse movement of a set of rods will bring the ends of these rods into the paths of the knives when the selective reciprocation of a knife will cause those rods which have been swung into its path to be pushed up and by this means stops with partial product values are set up. These selective movements are effected by movements of selector actuating members in the above-mentioned sets consequent on key actuation. The stop setting portion of the selector mechanism may comprise two or more sets of movable members of plate-like or other form. For example the members composing each set are disposed substantially horizontally and superimposed while each member is mounted so that it can be raised by the key-actuated selector mechanism. There is a set of stops having partial product values corresponding to each set of plate-like members and each stop is arranged so that when its corresponding plate-like member is lifted the stop will be moved into a position which will enable the value represented by that stop to be ascertained by feeling and an indication to be given of this value. Conveniently each set of plate-like stop setting members is composed of two superimposed groups of these plate-like members these groups functioning respectively for tens and units. The lifting of a plate-like member is effected by the pushing up by a knife of a selected vertically moving rod.

The mechanism employed for feeling the stops which have been selected and set up and for indicating the answer values thereby ascertained may vary but conveniently this mechanism comprises the following features. There are a series of members each of which is movable through a distance which is a measure of a partial product value and there are a plurality of sets of stops by means of which the distances through which the members are moved are determined. Each stop thus has a position value in relation to a movable member and also represents the number value of a single figure in a partial product. These stops are selected and set up by the key-actuated selector mechanism. By suitable means the distance through which at least one of the said members moves is determined as a result of feeling stops in two separate sets, while in the cases of other members, the distance through which each moves is determined by a stop in a single corresponding set. After they have moved into the positions determined by the stops set up these members are restored by suitable means to their zero positions. The movements of the members as determined by the stops are utilized in some convenient manner to indicate the answer to the sum performed in the machine.

Broadly speaking, the improved calculating machine may be regarded as comprising the following main parts:—

(1) The key-actuated mechanism. This comprises that portion of the apparatus which is more directly actuated by the keys and by means of which the selector mechanism is operated. In this key-actuated mechanism is comprised the means whereby a single set of keys serves for feeding in all the figures in both factors of the sum to be performed. This mechanism includes the key-actuated members which are grouped in relation to the several keys and the means whereby the operative relation between each key and the key-actuated members associated with that key can be altered.

(2) The selector mechanism. This comprises the portion of the apparatus in which the selection of stops takes place and by means of which these stops are set up. The selector mechanism includes what is in effect a mechanical representation of the multiplication table this representation being duplicated in each of the sections of the selector mechanism.

(3) The stop-feeling mechanism. This comprises the movable members by means of which are felt the stops that have been selected and set up.

(4) The answer-indicating mechanism. This comprises the mechanism whereby the positioning of the members, which results from feeling of the stops that have been set up, is utilized to indicate the answers to the sums performed in the machine.

(5) The resetting mechanism.

The capacity of the machine, that is to say, the number of figures and factors which can be dealt within the machine, may vary and while the principal features of the different portions of the mechanism may be said to be the same whatever the capacity of the machine, certain modifications may be effected and certain constructions more conveniently employed according to whether the capacity of the machine is smaller or greater. Thus with regard to the key-actuated mechanism, while the actual mechanism used for the purpose of enabling the operative relation between each key and the key-actuated members associated therewith may take one form in the case of a machine having a relatively small capacity, as for example a machine that is capable of dealing only with factors containing two or three figures, it is desirable to employ mechanism differing in structural details though functionally the same in the case of a machine having a greater capacity, as for instance where the machine is intended to deal with factors each containing as many as five figures. Again, under similar circumstances, that is to say in accordance with the capacity of the machine, structural variations may be desirable in the stop-feeling and answer-indicating mechanisms.

While the present invention relates more particularly to the key-actuated mechanism associated with the selector mechanism and to certain preferred constructions of stop-feeling, answer producing and resetting mechanisms, it is to be understood that key-actuated mechanism and selector mechanism embodying the essential features of the invention may be employed with stop-feeling and answer producing mechanisms whose structures may respectively be more or less of known type or may differ materially from the preferred forms of these mechanisms.

The resetting mechanism also may vary and in some cases must necessarily do so in accordance with the nature of the mechanisms such as that for stop-feeling and answer producing which are employed.

Before setting out by way of example details of alternative complete machine structures as instances of the manner in which the invention may be carried into practice, it will be convenient to indicate in a somewhat general sense the way in which the improved calculator operates.

That portion of the selector mechanism which, as above indicated, may be said to constitute a mechanical representation of the multiplication table is composed of a series of sections the number of which determines the capacity of the machine with respect to the number of figures in the first of the two factors which is fed into the machine. That is to say, if the machine has a capacity such as to enable it to multiply a two-figure factor by a factor containing two or three figures, the part of the selector mechanism referred will comprise two sections. On the other hand, if the machine has a larger capacity and for example is capable of multiplying a five-figure factor by a second factor containing five figures, then this portion of the selector mechanism will comprise five sections. Thus the actual capacity of the machine is determined primarily by the number of sections in this portion of the selector mechanism, but the number of these sections does not affect the number of figures in the second factor that may be fed into the machine.

The limit of the capacity of the machine with respect to the number of figures in the second factor is actually controlled by the structure of the answer producing mechanism and associated parts which must be designed so as to be capable of receiving some fixed number of partial products, adding these together, and presenting an answer of the necessary dimensions with respect to the number of digits therein. Thus a machine primarily constructed as to its key-actuated mechanism, its selector mechanism and its stop-feeling mechanism, with the object of dealing only with a two-figure factor and a three-figure factor, may be utilized without material alternation of these portions of the mechanism to deal with sums containing not more than two figures in the first factor but say up to six figures or more in the second factor, if the answer producing mechanism is suitably modified to enable it to deal with the necessarily larger number of partial products and to produce answers with the necessarily larger number of digits therein.

Each section of the selector mechanism includes two groups of members one of such groups serving with respect to the tens and the other with respect to the units in the products resulting from the multiplcation of two single figure factors, these products, however, being partial products with respect to the whole sum that may be performed in the machine. By means of these grouped members stops are set up having position values corresponding respectively to the tens and units in the products obtained from the one section of the selector mechanism.

If the multiplication table be set out as hereunder, it will be seen that it can be split up into two tables, one of which will contain only the tens digits of the products appearing in this table while the second table will contain only the units digits of these products:—

| | 0 | 1 | 2 | 3 | 4 | 5 | 6 | 7 | 8 | 9 |
|---|---|---|---|---|---|---|---|---|---|---|
| 0 | 00. | 00. | 00. | 00. | 00. | 00. | 00. | 00. | 00. | 00. |
| 1 | 00. | 01. | 02. | 03. | 04. | 05. | 06. | 07. | 08. | 09. |
| 2 | 00. | 02. | 04. | 06. | 08. | 10. | 12. | 14. | 16. | 18. |
| 3 | 00. | 03. | 06. | 09. | 12. | 15. | 18. | 21. | 24. | 27. |
| 4 | 00. | 04. | 08. | 12. | 16. | 20. | 24. | 28. | 32. | 36. |
| 5 | 00. | 05. | 10. | 15. | 20. | 25. | 30. | 35. | 40. | 45. |
| 6 | 00. | 06. | 12. | 18. | 24. | 30. | 36. | 42. | 48. | 54. |
| 7 | 00. | 07. | 14. | 21. | 28. | 35. | 42. | 49. | 56. | 63. |
| 8 | 00. | 08. | 16. | 24. | 32. | 40. | 48. | 56. | 64. | 72. |
| 9 | 00. | 09. | 18. | 27. | 36. | 45. | 54. | 63. | 72. | 81. |

The units group of members in a section of the selector mechanism deals solely with the setting up of stops having values corresponding to the units digits in these several products while the tens group of members in a selector section deals with the setting up of stops having values corresponding to the several tens digits in these products.

Broadly speaking, all these sections of the selector mechanism are substantially similar and the function of each section is to set up two stops which taken together have the number value of one of the complete products appearing in the multiplication table as set out above. One of these stops may represent 0 where there is no tens digit or the unit is a 0 in the product. Thus in the case of a machine having two sections in the selector mechanism and therefore a capacity for dealing with two figures only in the first factor, but one or more figures in the second factor, the selector sections will function in the following manner when performing say such a sum as 27×346. One of the selector sections which may be referred to as the A section, will deal only with the products resulting from multiplying the first or tens figure, that is 2, in the first factor by each of the figures in the second factor, while the other selector section, which may be referred to as the B section, will deal only with the products resulting from multiplying the second or units figure, that is 7, in the first factor by each of the figures in the second factor.

The groups of members comprised in the A selector section may be referred to as the group A1, dealing with the tens, and the groups A2, dealing with the units. Similarly, in the B selector section the one group of members therein dealing with the tens may be referred to as the B1 group, while the other group which deals with the units may be referred to as the B2 group. Taking the first partial product, namely that resulting from multiplying 27 by 3, in the A selector section the A1 group will set up a stop with value 0 while the A2 group will set up a stop with value 6.

In the B selector section the B1 group will set up a stop with the value of 2 while the B2 group will set up a stop with the value of 1. The values of the stop 6 in the A2 group and of the stop 2 in the B1 group will be added together in the process of feeling all these stops and the total partial product 81 will be fed into the answer-producing mechanism. The other partial products obtained by the successive multiplication of 27 by 4 and 6 will be dealt with in succession by the same selector sections in a similar manner and the several partial products 81, 108 and 162 will be added together in succession in the adding mechanism until the final answer 9342 is made up and presented.

The following indicates the manner in which the partial products are dealt with as described above—

```
               A section.    B section.
      Groups  A1.  A2.      B1.  B2.
    2×3=      0    6              = 60
    7×3=                     2    1 = 21
                                     — 81
    2×4=      0    8              = 80
    7×4=                     2    8 = 28
                                     —108
    2×6=      1    2              =120
    7×6=                     4    2 = 42
                                     —162
```

From this it will be apparent how the same selector sections are utilized in succession to deal with the partial products resulting from multiplying the figures in the first factor by the figures in the second factor in succession no matter how many figures there may be in this second factor.

Hence it will be appreciated further that as and when the figures in the first factor of the sum are fed into the machine by the depression of keys a partial selection is effected in the several sections of the selector mechanism, these sections being in turn brought into operative relation with the same set of keys and then when the keys are again operated to feed in the figures comprised in the second factor, the stop selection process is completed simultaneously in each selector section. Thus once the first part of the selection has been performed in accordance with the figures in the first factor, this partial selection can be completed any number of times to give the required partial products by successive operation of the keys to feed in whatever may be the number of figures comprised in the second factor.

In the key-actuated mechanism is comprised apparatus which causes successive operation of the keys to bring about partial selection as above indicated in the several sections of the selector in succession, this apparatus as the keys are depressed altering automatically the operative relation between each key and the several selector sections, and finally bringing the keys into operative relation with the mechanism by means of which the selection will be completed after all the digits in the first factor have been fed in and when the feeding in of the digits in the second factor commences.

Turning now to the details of the structures that may be embodied in the improved calculating machine, two of these machines will be described as illustrating examples of calculating machines having capacities which are respectively relatively small and greater.

In the first place, there will be described a machine capable of multiplying a two-figure factor by a three-figure factor, that is to say, a machine whose capacity is such that it can be employed for multiplying any number from 1 to 99 by any number from 1 to 999. Secondly, there will be described a machine whose capacity is such that it is capable of multiplying together two five-figure factors, that is to say, it can be used for multiplying any number from 1 to 99999 by any number from 1 to 99999.

The accompanying drawings illustrate by way of example the two alternative constructions of calculating machine embodying the present invention as indicated above. The construction shown in Figures 1–18 inclusive is designed to deal with factors respectively composed of two and three figures, that is to say, the machine has such a capacity as to enable any number from 1 to 99 to be multiplied by any number from 1 to 999. Figures 19–43 inclusive illustrate a construction having a greater capacity in that it is capable of dealing with factors each containing five figures, that is to say, it can be employed to multiply any number from 1 to 99,999 by any number from 1 to 99,999.

In the accompanying drawings—

Figure 3 is a front elevation of the machine with the outer casing removed, certain parts being broken away or omitted for the sake of clearness and in order to show parts which lie behind. The adding mechanism and certain parts co-operating therewith which are located in the upper part of the machine are omitted from this view.

Figure 4 is a sectional plan on the broken line 4—4 in Figure 1 and illustrates the disposition of the key-actuated levers.

Figure 5 is a front elevation of that part of the selector mechanism which for convenience will be referred to as constituting a mechanical multiplication table, this mechanism comprising sets of vertically slidable rods and horizontally disposed plate-like members adapted to be moved or lifted by the rods and serving to set up the stops.

Figure 7:
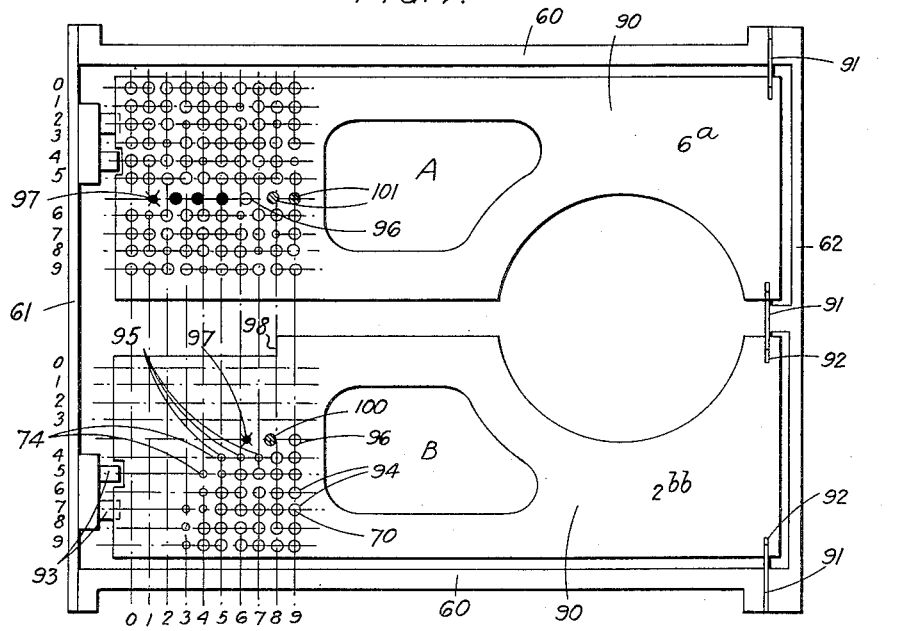

Figure 7 is a sectional plan showing two of the plate-like members in the mechanical multiplication table, the section being taken as on the line 7—7 in Figure 5. The upper part of Figure 7 is in effect a section on the line 7a in Figure 6 while the lower part is a section as on the line 7b in Figure 6.

Figure 8 indicates the multiplication table set out for convenience of reference more particularly in connection with the part shown in Figure 7.

Figures 8a and 8b are similarly arranged tables but showing in Figure 8a the tens digits only and in Figures 8b the units digits only as taken out from the complete table set out in Figure 8.

Figure 1:
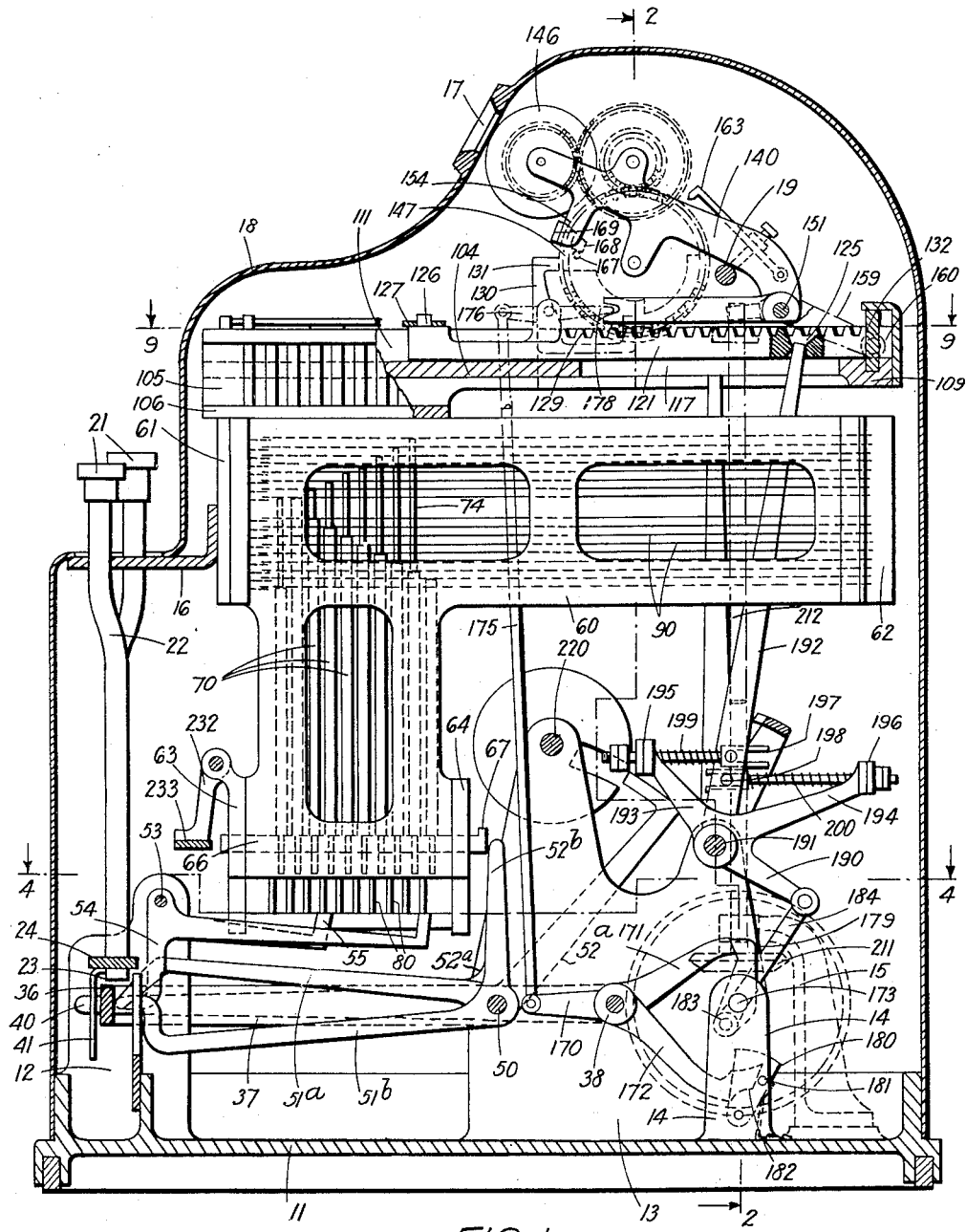
Figure 1 is a side elevation of the machine parts being shown in section substantially as on the line 1—1 in Figure 2 looking in the direction of the arrows.

Figure 9 is a plan of the upper part of the machine with the adding mechanism removed, and illustrating the relative disposition of the stops which can be set up by the selector mechanism and the means whereby these stops are "felt". As referred to Figure 1, Figure 9 is a plan on the line 9—9 in Figure 1 and is also in effect a plan of Figure 5 but with the sliding feeler members shown in place.

Figure 9a is an elevation of a transversely sliding plate forming a detail of the parts shown in Figure 9.

Figure 10 is a side elevation of the guide plate and parts carried thereby which are shown in plan in Figure 9.

Figure 11 is an elevation of the rear end of the guide plate shown in Figures 9 and 10.

Figure 12:
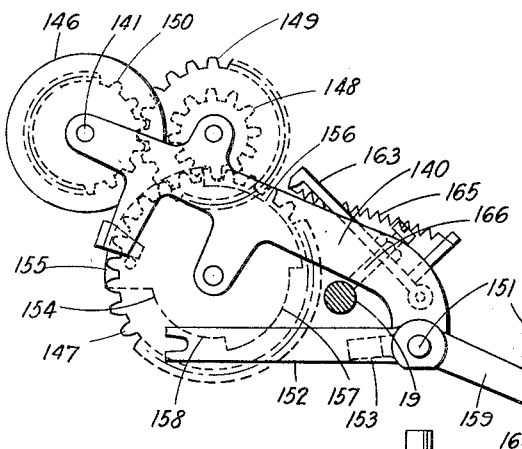

Figure 12 is a side elevation of the adding mechanism.

Figure 13:
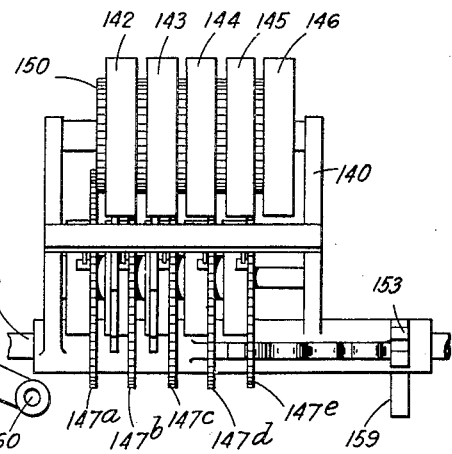

Figure 13 is a front elevation of this mechanism.

Figure 14:
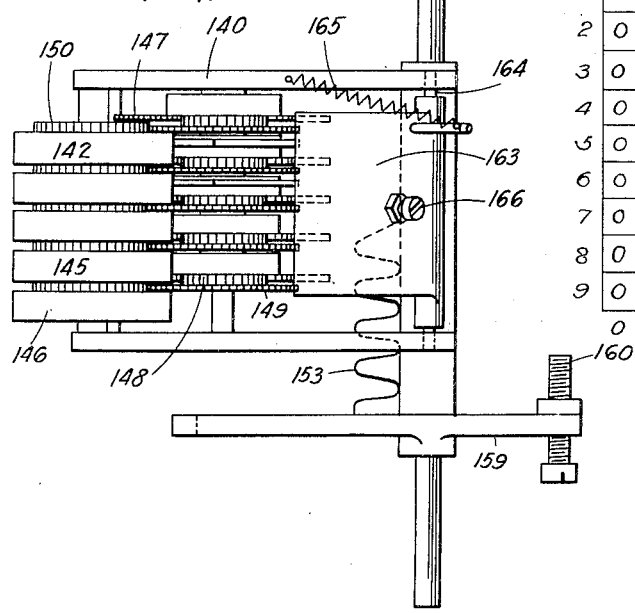

Figure 14 is a plan of this mechanism.

Figure 15:
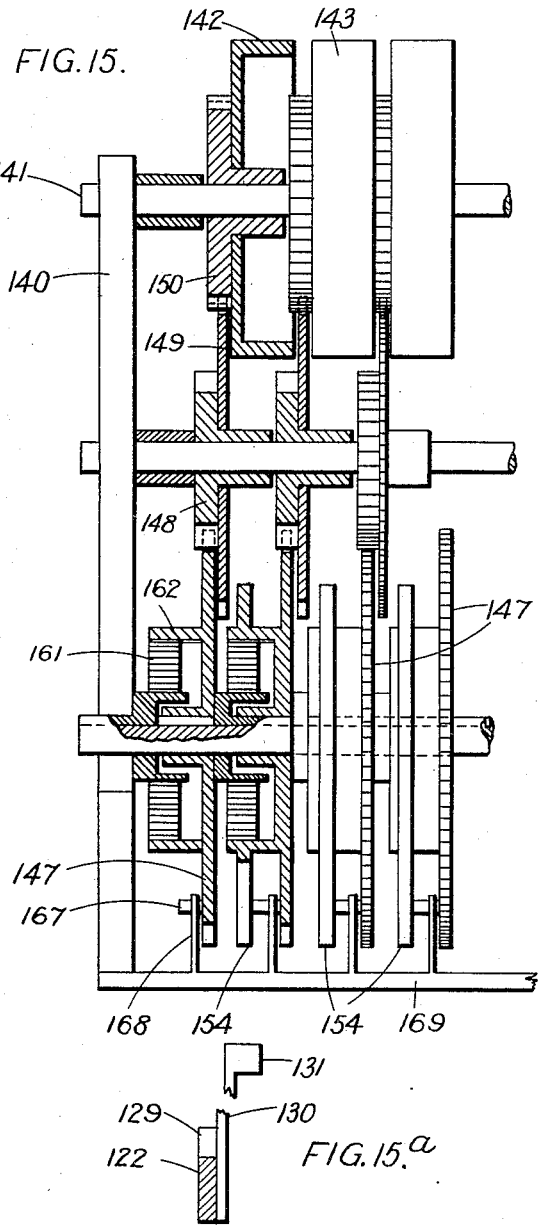

Figure 15 is a displayed sectional view on an enlarged scale of the adding mechanism showing details of the parts.

Figure 15a is a detail.

Figure 16:
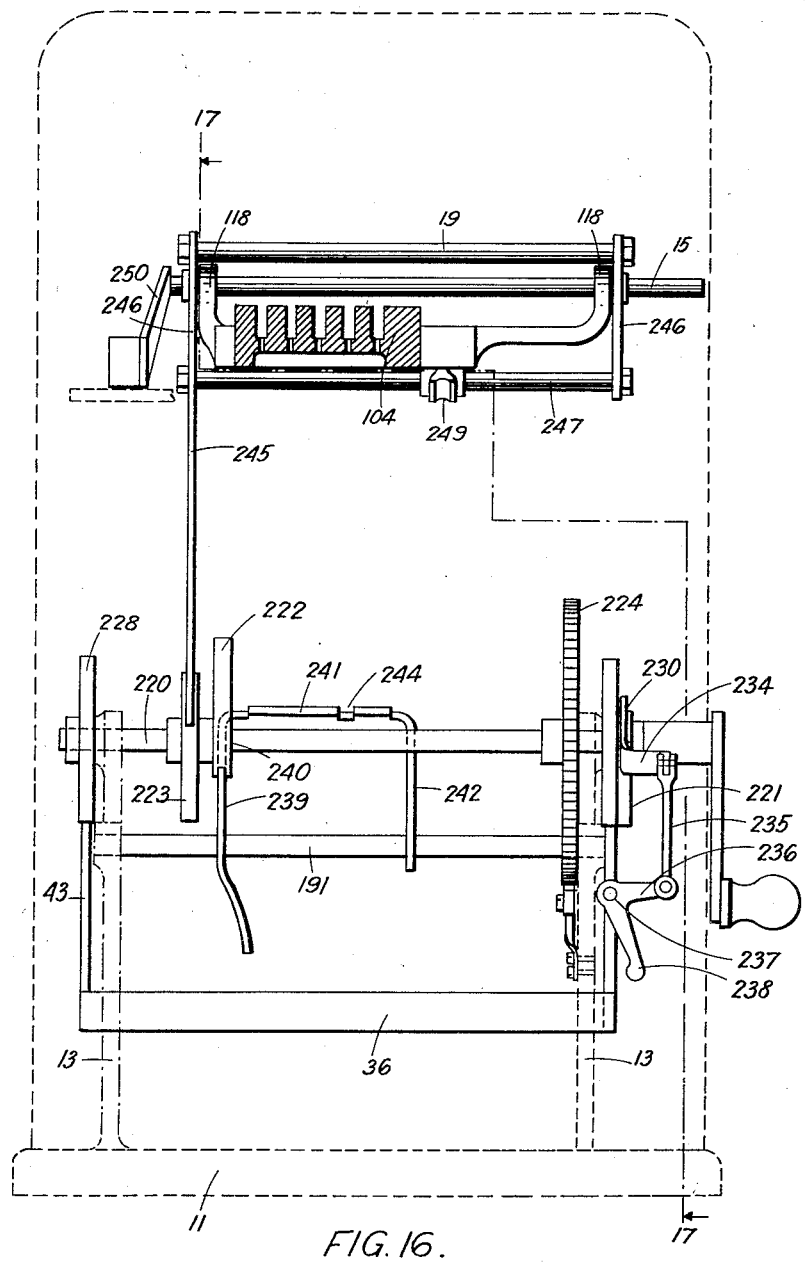

Figure 16 is a front sectional elevation showing those parts of the mechanism which are mainly employed in the resetting of the apparatus, other parts being omitted for the sake of clearness. This view corresponds and shows for identification certain features in common with Figure 2.

Figure 17:
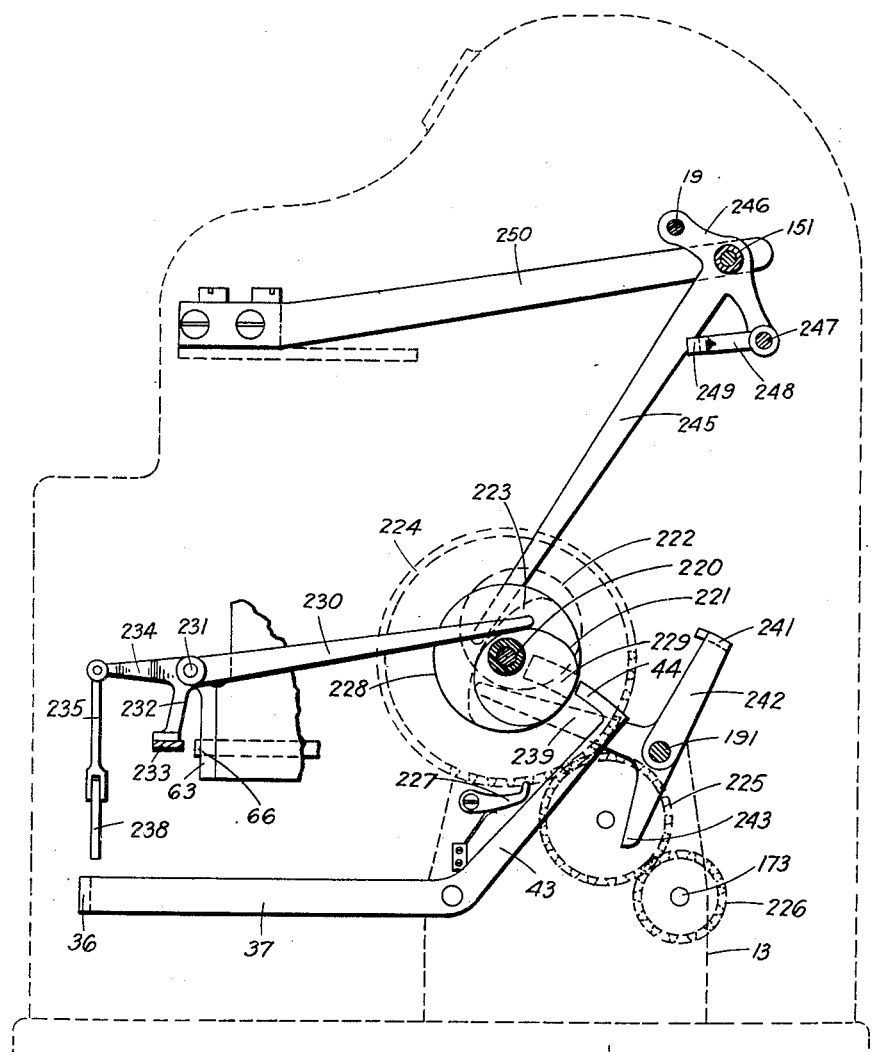

Figure 17 is a sectional elevation on the broken line 17—17 in Figure 16 looking in the direction of the arrows. This figure also shows for the sake of clearness and separated from other parts of the mechanism portions of it which are more particularly employed for resetting. Figure 17 corresponds to and embodies, for the purpose of identification, certain features in common with Figure 1.

Figure 18 comprises a series of plans illustrating by way of example several of the plate-like members embodied in one or other of the sets or sub-sets of the mechanical multiplication table.

The following views show the second of the two alternative structures of calculating machine which will be more particularly referred to, namely, that having the larger capacity.

Figure 19:
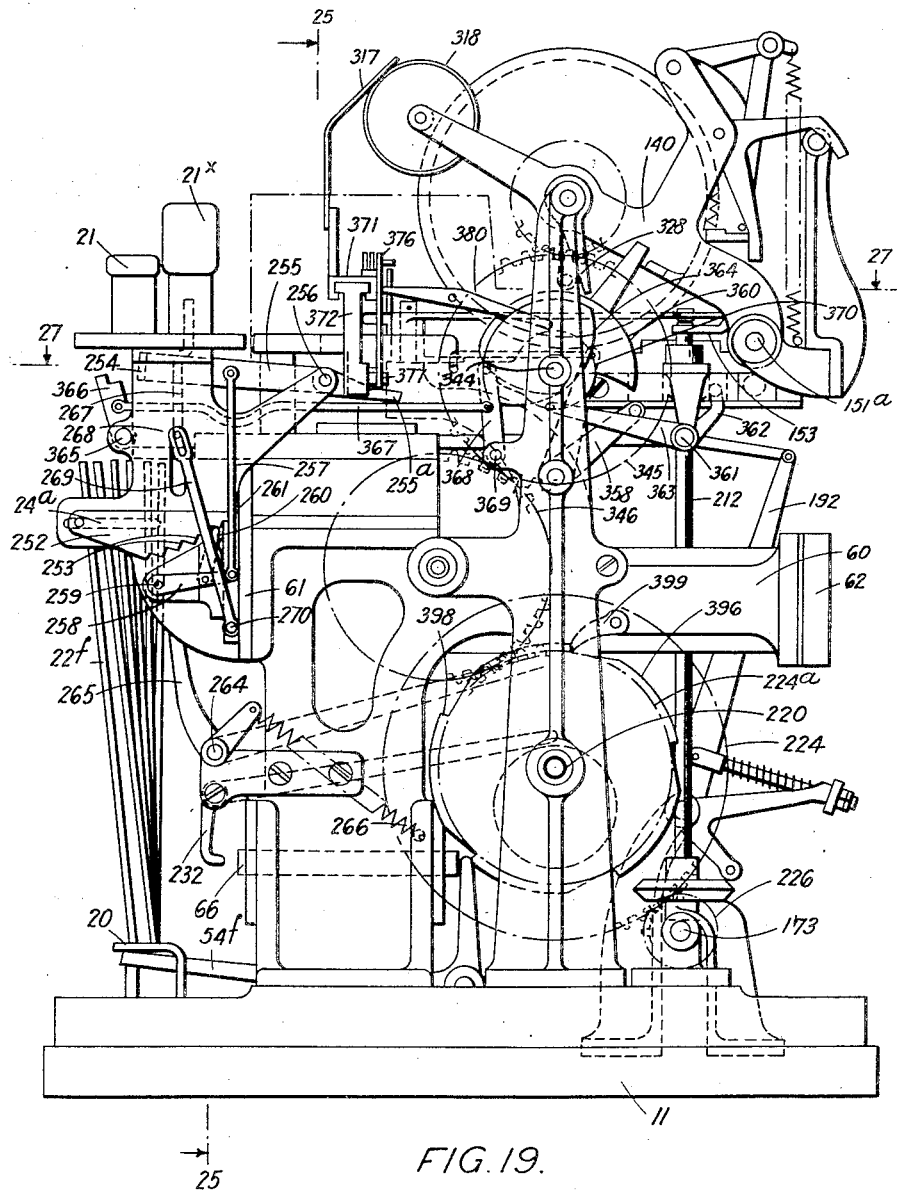

Figure 19 is an elevation of the right-hand side of the machine, the operating handle and gear wheels associated therewith being removed.

Figure 20:
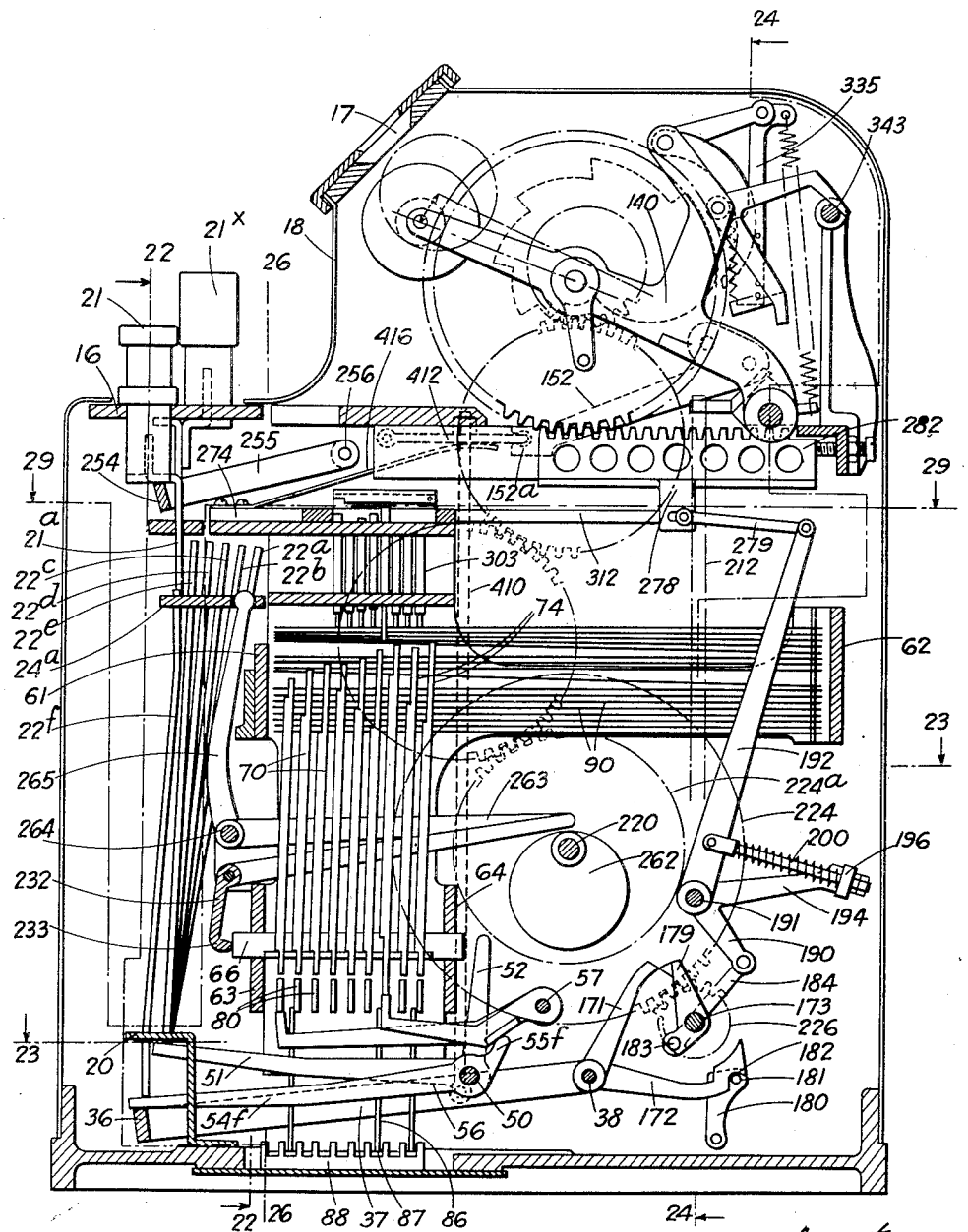
Figure 29:
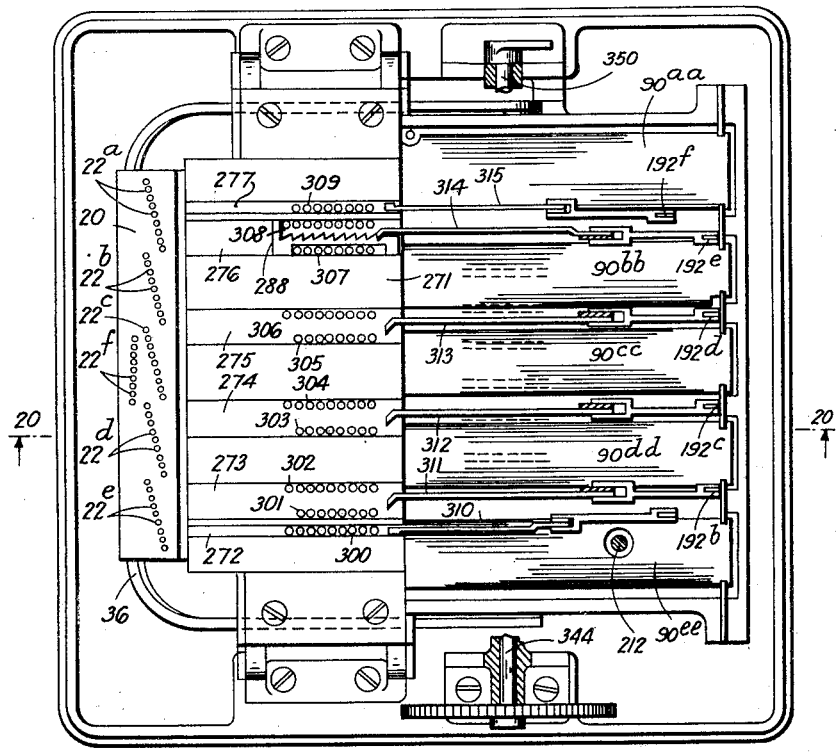

Figure 20 is a vertical section through the machine from front to back taken on the line 20—20 in Figure 29 looking in the direction of the arrows.

Figure 21:
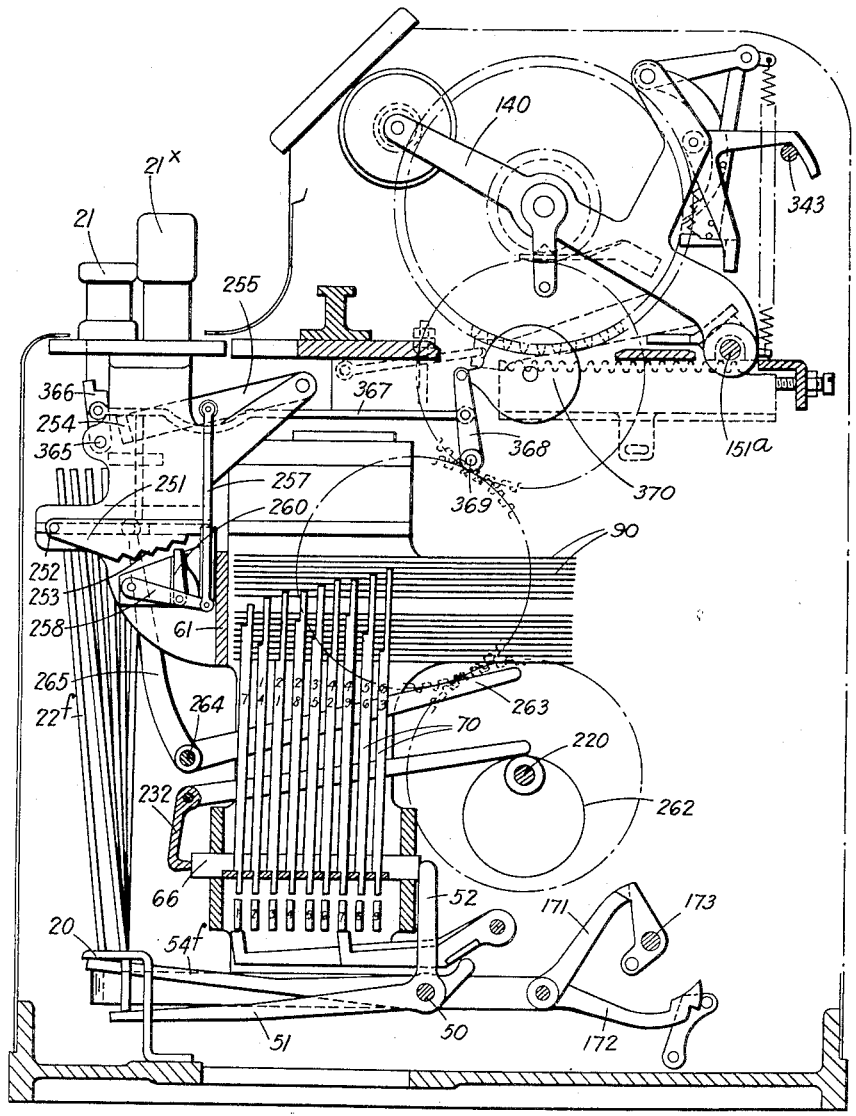
Figure 27:
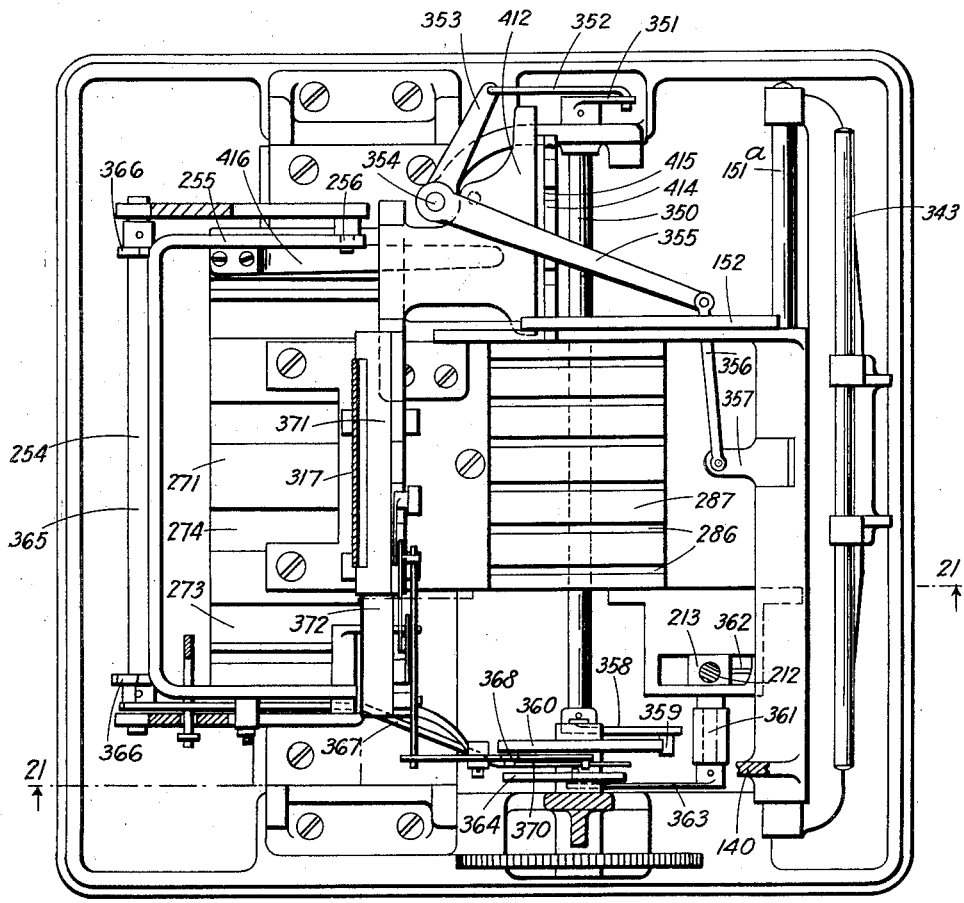

Figure 21 is a vertical section on the broken line 21—21 in Figure 27 looking in the direction of the arrows the section being somewhat similar to Figure 20 but showing certain parts which do not appear in Figure 20 while also indicating parts in positions other than as they appear in Figure 20.

Figure 22:
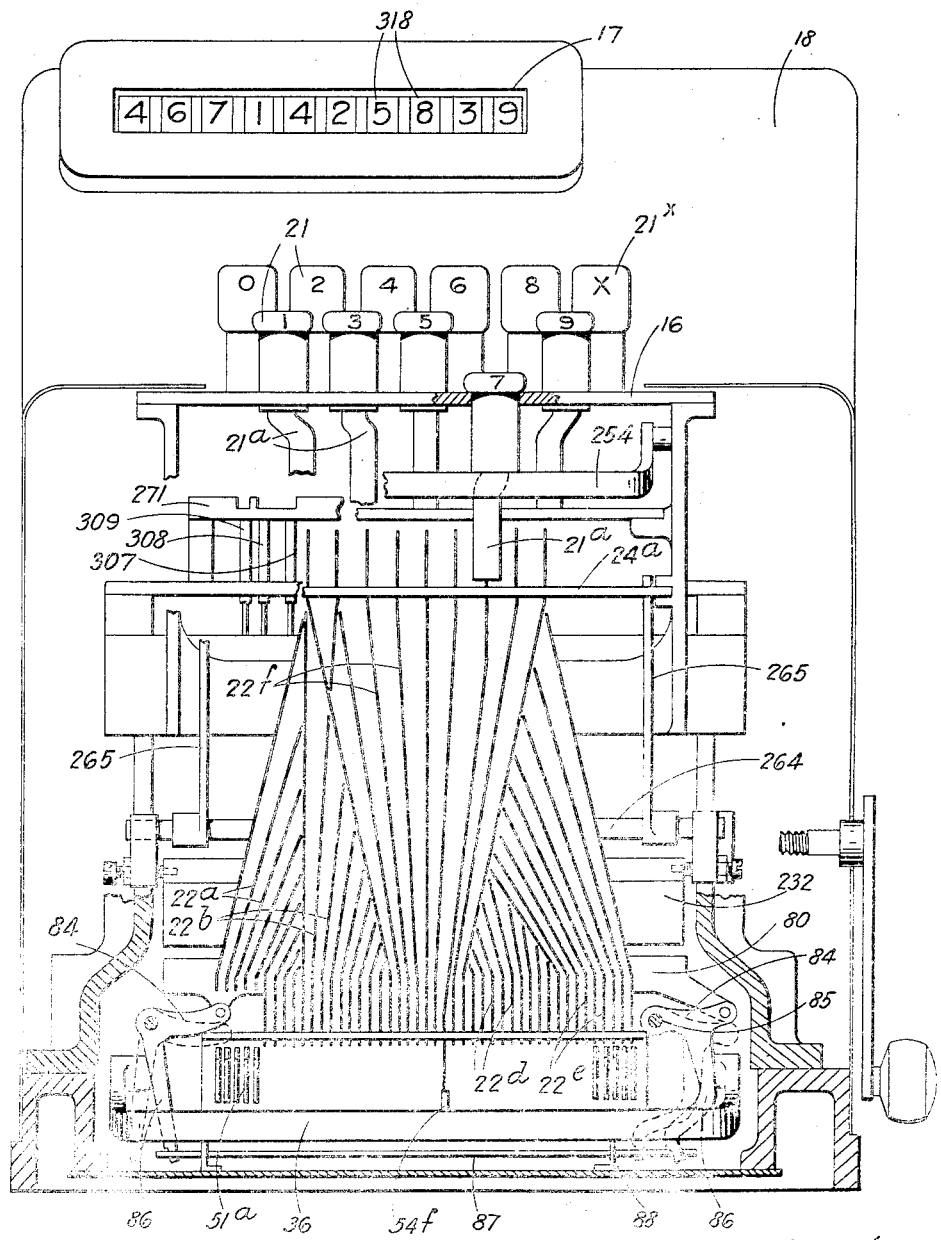

Figure 22 is a transverse sectional elevation on the line 22—22 in Figure 20 looking in the direction of the arrows certain parts being broken away for the sake of clearness.

Figure 23:
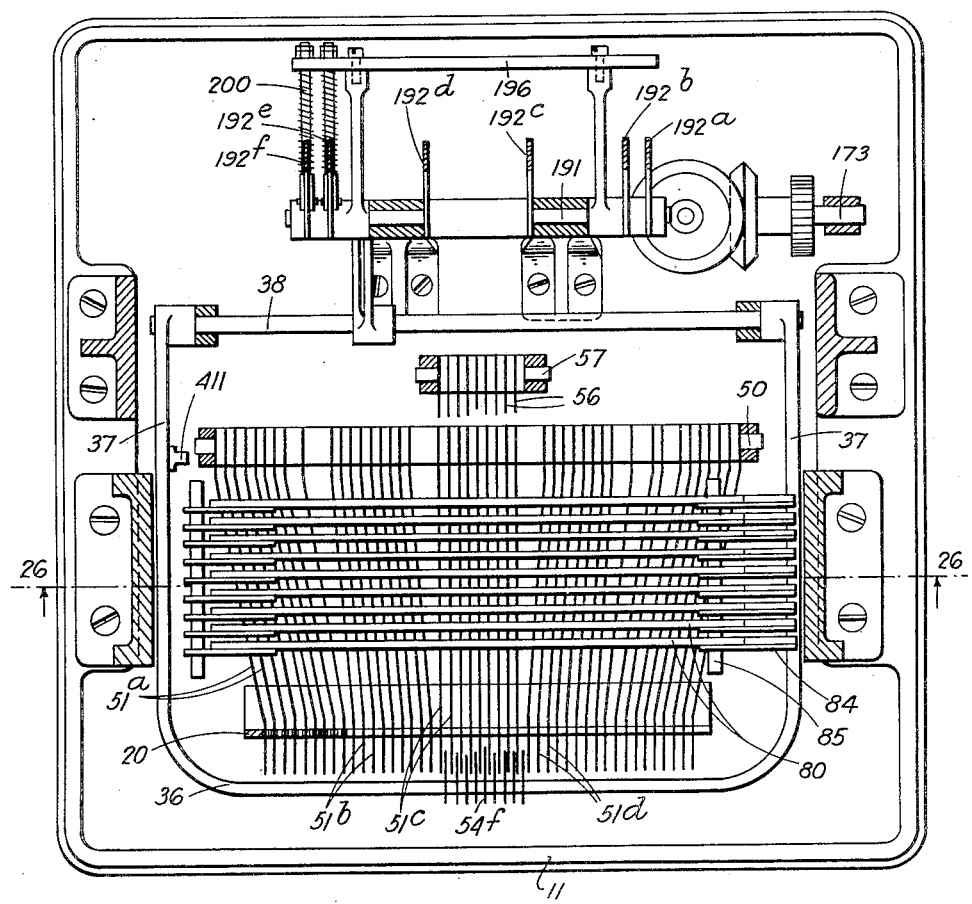

Figure 23 is a sectional plan approximately on the line 23—23 in Figure 20.

Figure 24:
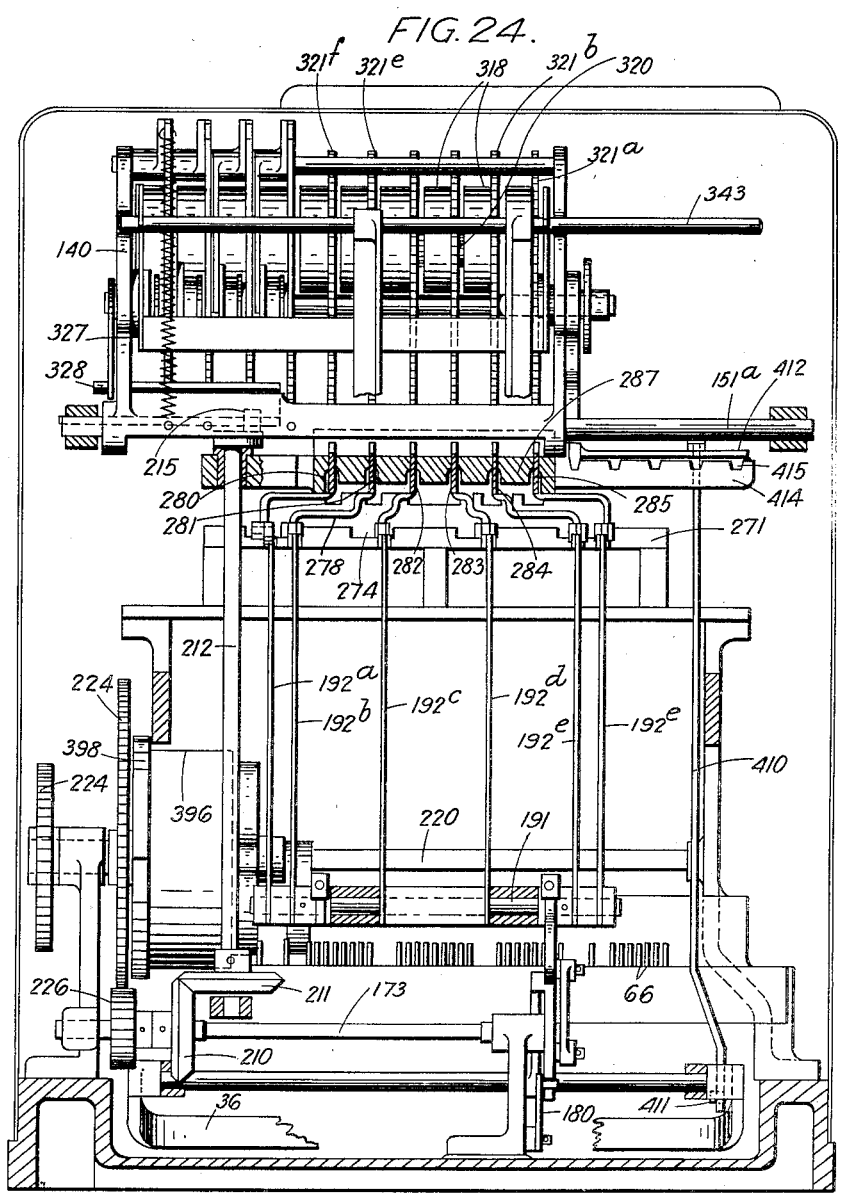

Figure 24 is a transverse vertical section on the line 24—24 in Figure 20 looking from the rear of the machine in the direction of the arrows.

Figure 25:
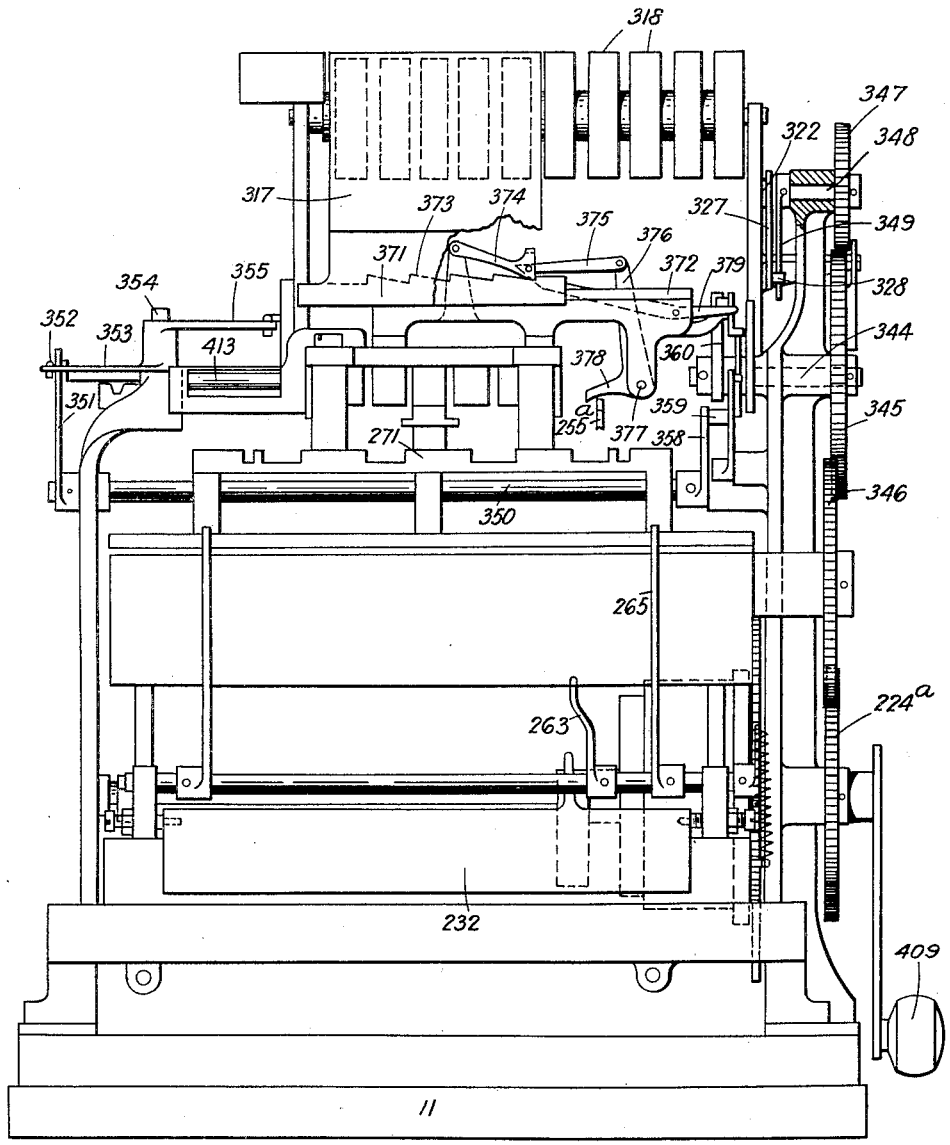

Figure 25 is a transverse vertical section taken roughly on the line 25—25 in Figure 19 looking from the front of the machine. Certain parts are here omitted and the view is arranged to show more particularly certain details and parts associated with the resetting apparatus.

Figure 26 is a transverse vertical section on the line 26—26 in Figure 20, or on the same line as indicated in Figure 23. The view is taken as looking from the front of the machine in the direction of the arrows, some parts being omitted for the sake of clearness.

Figure 27 is a sectional plan on the line 27—27 in Figure 19.

Figure 28:
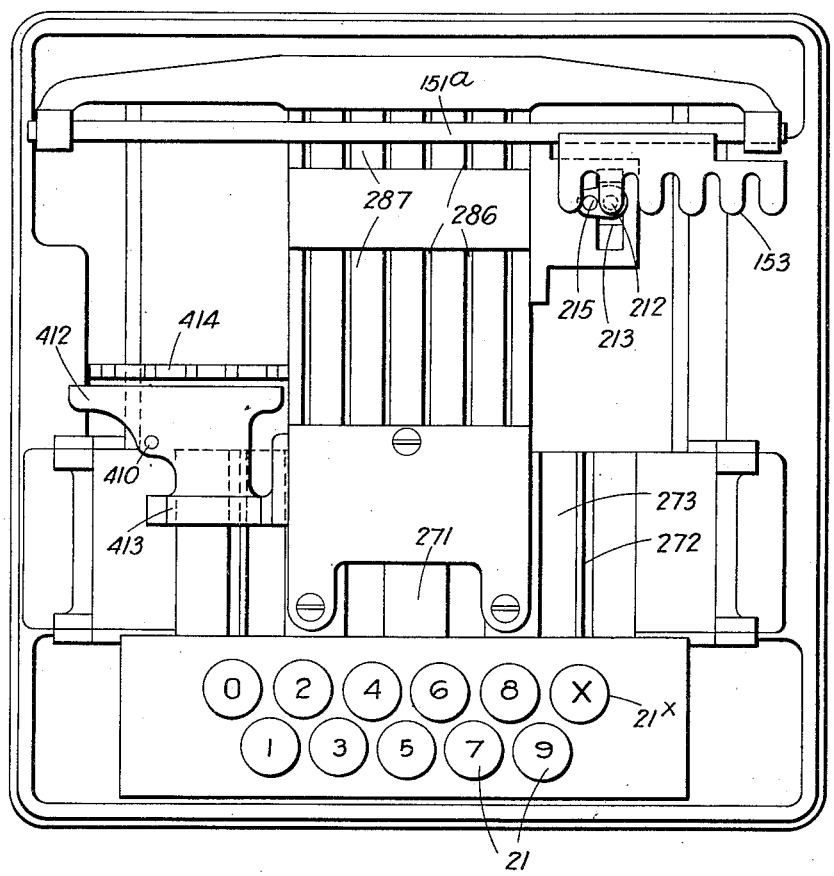

Figure 28 is a plan of the machine with the upper portions omitted including the adding mechanism.

Figure 29 is a sectional plan on the broken line 29—29 in Figure 20.

Figure 30 shows the multiplication table set out in a manner which indicates the basis of the arrangement of the mechanical multiplication table in the present form of the machine.

Figure 31 is a vertical sectional elevation showing the relative disposition of the vertically sliding rods, the horizontal plate members on which these rods act and the stops adapted to be lifted thereby.

Figure 32 is a plan on an enlarged scale showing details of the manner in which the stops and associated sliding members are arranged and function.

Figure 33 is a plan of a portion of the frame plate in which slide the members adapted to be positioned by the stops set up this view showing certain details in the structure of the parts.

Figure 33a is a right-hand side elevation of the frame plate member in which the stops are set up.

Figure 34 is an end view on an enlarged scale of the parts shown in Figure 33 illustrating details.

Figure 35:
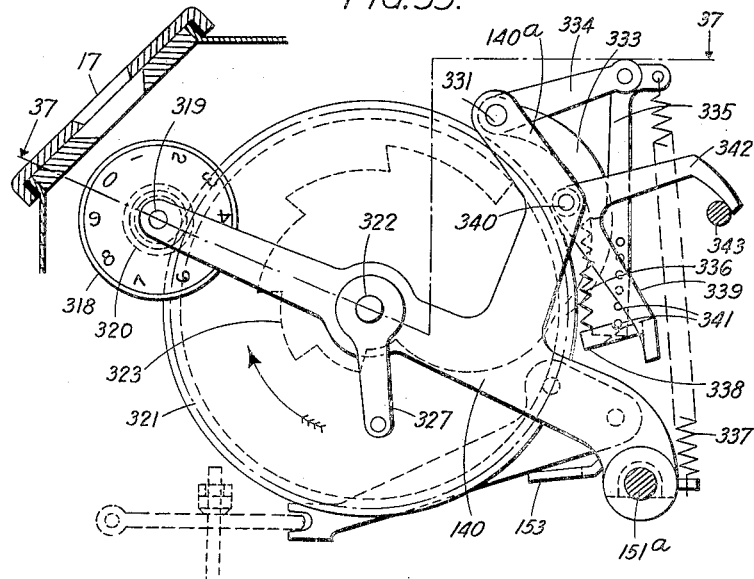

Figure 35 is a side view of the adding mechanism showing the parts in the position of rest.

Figure 36:
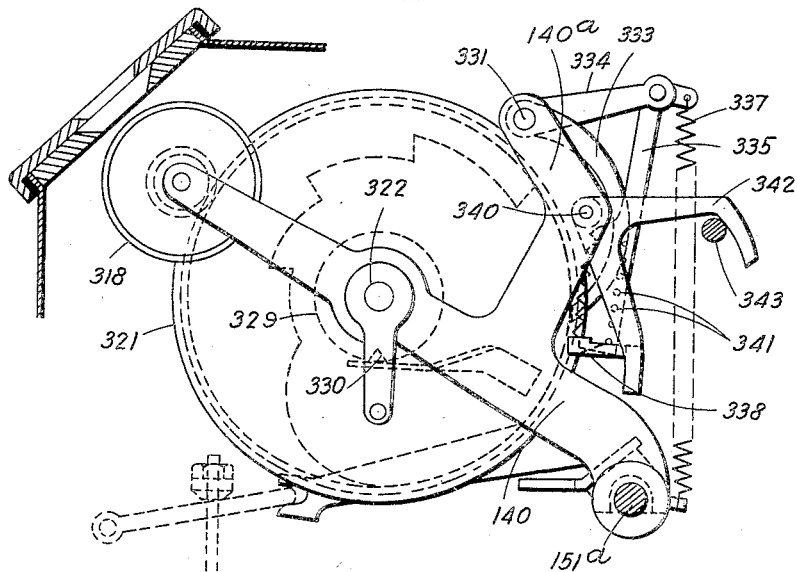

Figure 36 is a similar view showing the adding mechanism raised into a position such as to display the answer at the window.

Figure 37:
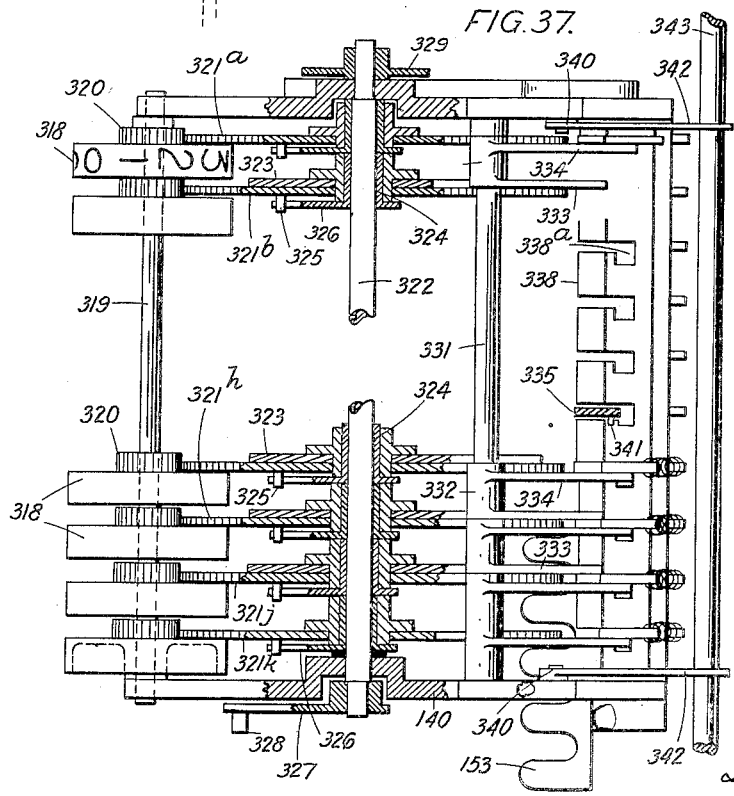

Figure 37 is a sectional plan on the broken line 37—37 in Figure 35 looking in the direction of the arrows.

Figure 38:
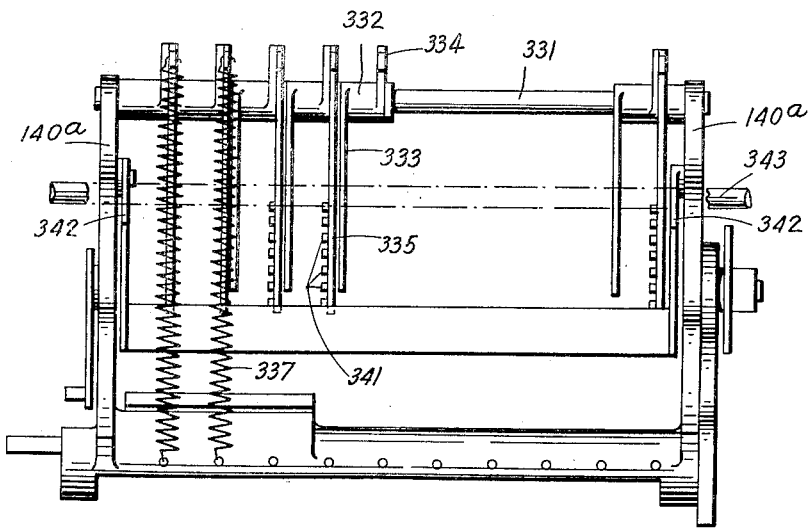

Figure 38 is a rear elevation of the mechanism shown in Figure 35.

Figure 39:
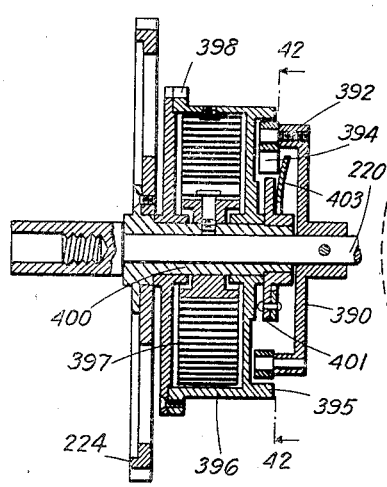

Figure 39 is a longitudinal sectional elevation through the spring box and mechanism associated therewith for winding up the spring when the apparatus is reset this spring serving to actuate parts of the apparatus intermittently when the machine is in use.

Figure 40:
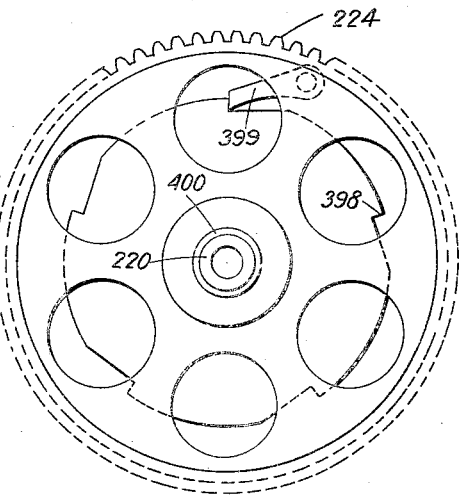

Figure 40 is an end view of the mechanism shown in Figure 39 looking at this mechanism from the left-hand side as seen in Figure 39.

Figure 41:
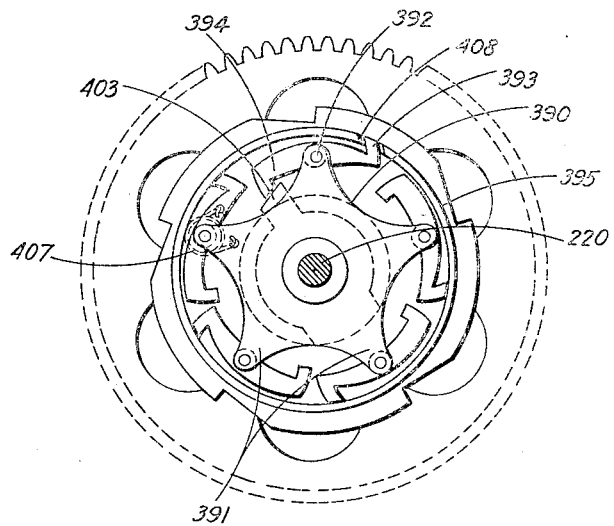

Figure 41 is an end view of the same mechanism but looking at it from the right-hand side as it is shown in Figure 39.

Figure 42:
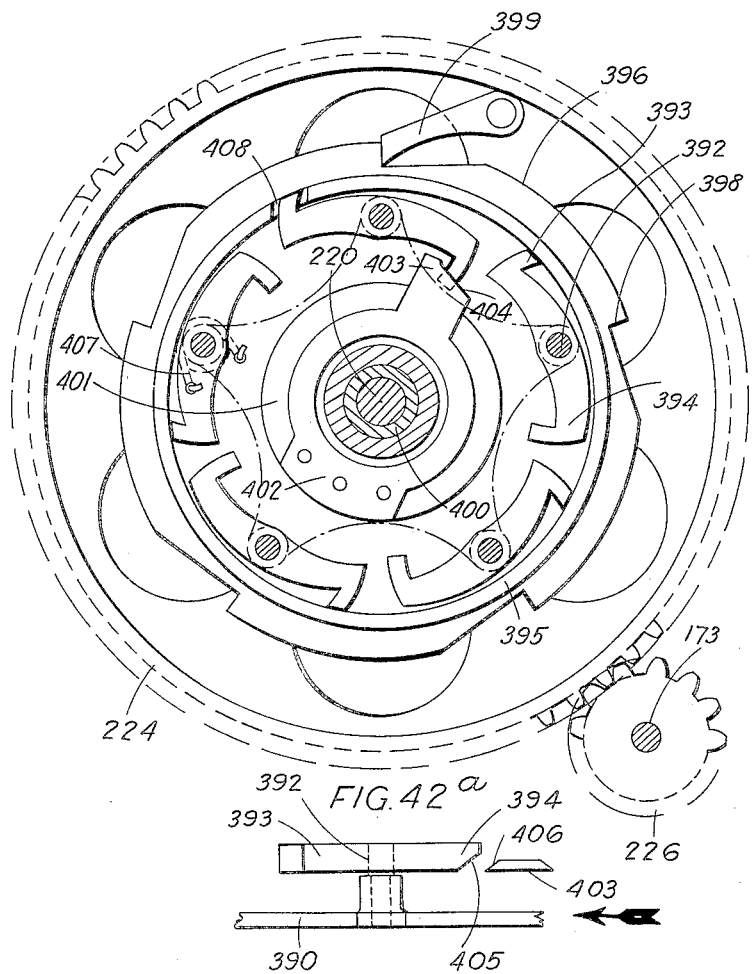

Figure 42 is a transverse sectional elevation on an enlarged scale on the line 42—42 in Figure 39.

Figure 42a is a plan of a detail of the mechanism shown in Figure 42.

Figure 43:
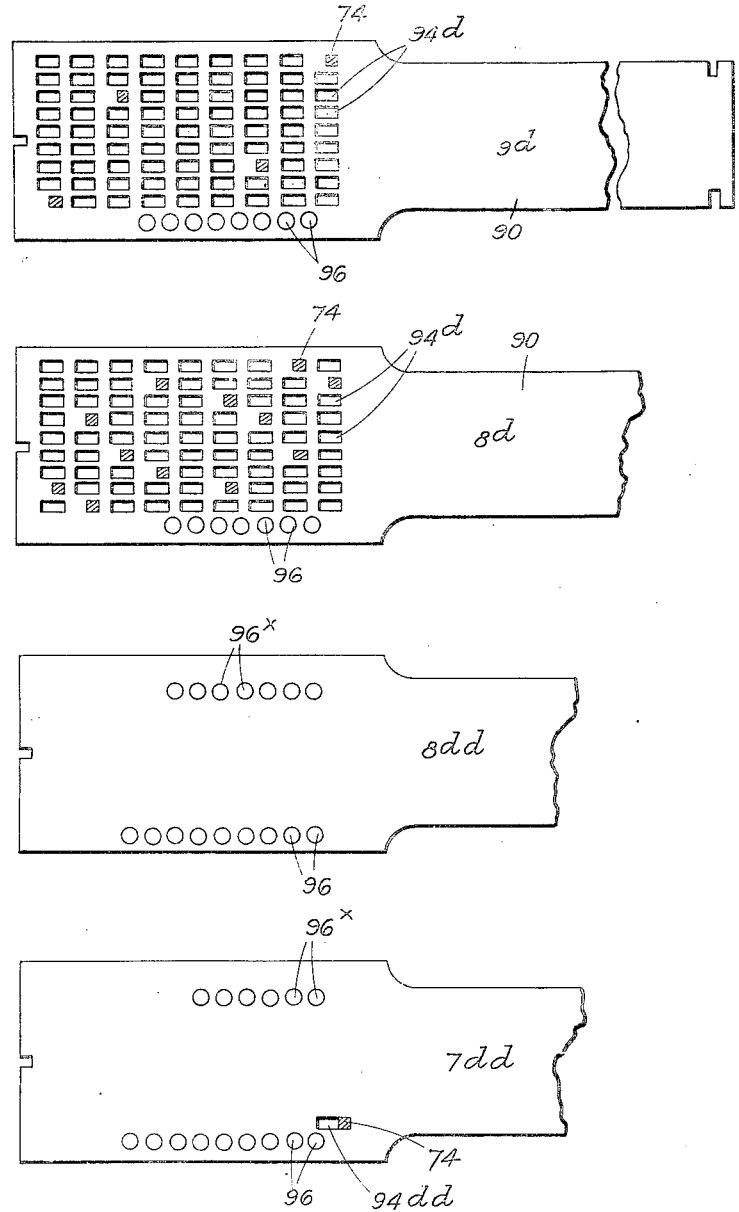

Figure 43 comprises a series of plans which show several of the plate-like members embodied in the mechanical multiplication table.

Like letters indicate like parts throughout the drawings.

There will be described first the machine illustrated in Figures 1 to 18 inclusive which has the lesser capacity, that is to say the machine which is capable of dealing with a two-figure factor and a three-figure factor.

The whole machine is mounted on a base 11 which carries preferably formed integral therewith certain upwardly directed brackets or like parts 12, 13, 14 and 15 which are suitably disposed, these brackets serving to carry bearings for shafts or serving to support various parts of the mechanism either directly or through transverse members such as 16. The whole base and these supporting members may be conveniently referred to as the framing or frame members.

Referring to Figures 1 to 4, the keys forming the single set required are suitably disposed so that each key when depressed pushes downwards a vertically sliding rod-like member. Each key 21 may be mounted directly on the upper end of its corresponding rod 22 or the keys may be carried on suitably guided and preferably vertically movable members which in turn can engage or otherwise act on the upper ends of the rods in the necessary manner so as to cause the sliding of these rods as and when the keys are depressed. For example, levers or other mechanical devices adapted to transmit the movement from the keys to the sliding rods may be utilized. The vertically sliding rods 22, which for convenience may be referred to as the key rods, are so arranged that while their upper ends are guided by and can slide in a plate 16 forming part of the machine framing which extends transversely across the front of the machine, the rods have sufficient freedom in this plate for their lower ends 23 to be swung laterally, that is to say, transversely with respect to the front of the machine. The lower portions of these key rods pass through holes in and are guided by a horizontally disposed bar 24 which is supported conveniently towards its ends by and can slide in frame bracket members 12 (see Figures 3 and 4).

This bar 24 can slide in the direction of its length, that is, transversely across the front of the machine. When thus caused to slide this bar 24 will carry with it the lower ends 23 of all the key rods 22 and will swing all these rods simultaneously so that their lower ends can be positioned successively over the ends of levers which are suitably grouped for the purpose so that these levers can be actuated by the keys through the key rods. Transverse sliding movement of this bar 24 takes place in steps and in the case of a machine having the capacity of that now being described this bar can move from its initial position through two steps so that the lower ends of the key rods can occupy in succession three different positions, thus enabling each of these rods to act in turn on the ends of three levers whose ends are grouped adjacent to the lower end 23 of each key rod. Initially the lower end of each key rod is located over the first lever in that group of levers adapted to be actuated by this rod so that when a key 21 is first depressed, it will act on this first lever but the key rod 22 will then be swung so as to position its lower end over the second lever. Hence, since all the key rods are swung simultaneously in this way, when the next key, whichever it may be, is depressed, the second lever in its corresponding group will be actuated and subsequently the bar 24 will slide its second step and the ends of all the key rods will then be located over the third of the levers in the several groups. When therefore a key is now depressed it will actuate the third lever in the group associated with it. The first two levers in each group function to effect partial selection in the selector mechanism as the figures in the first factor are fed into the machine while the third lever in each group functions to complete this selection.

It follows therefore from what has been said above with respect to the general operation of the machine that the number of levers in each of these groups bears a definite relation to the capacity of the machine with respect to the number of figures in the first factor. Thus if $n$ is the number of figures in the first factor with which the machine is constructed to deal, then the number of levers in each group will be $n + 1$. These last levers, that is to say the third lever in each group in the particular construction under consideration, always functions in the same manner in feeding in, in succession each of any number of figures which may compose the second factor in the sum.

The sliding movement of the bar 24, that is to say the swinging of the lower ends of the key rods, is controlled conveniently in the following manner (see Figure 3). A sector-shaped plate 25 is pivoted at 26 so as to move in a substantially vertical plane for example on the front edge of the sliding bar 24 and in the peripheral edge of this plate 25 are cut two steps 27 and 28. The edge portion 29 of this sector plate and also the faces of the steps 27 and 28 are adapted to abut against the end of a horizontally arranged set screw 30 serving as a stop and carried by the frame bracket 12. On the other hand, what may be described as the radial edge portions of this plate, that is to say the downwardly facing parts 31 and 32 adjacent to the two steps, as also the lower edge 33 of the plate, are adapted to be acted on by the upwardly directed square end or nose of a spring-controlled pawl 34 pivoted at 35 on a universal bar 36 which extends across the front of the machine with its upper edge situated just below and adjacent to the lower ends 23 of all the key rods 22.

This universal bar 36 is carried at its ends by two levers 37 (Figure 1) which extend from the bar towards the back of the machine to a horizontal transverse shaft 38 on which these levers are loosely pivoted. The arrangement is such that when any one of the keys 21 is depressed the lower end of its key rod will act on and move downwards the universal bar 36 in addition to acting on the end of one or other of the grouped levers associated with this key rod. The universal bar is constantly pressed upwards by a suitably arranged spring 39 so that after the operation of a key the universal bar will be raised again automatically into its initial position carrying with it the key rod and key that has been depressed.

The bar 24 which swings the key rods is caused to slide for example towards the right-hand side of the machine by the action of a flat spring 40 which constitutes also a lever through which a rocking motion can be imparted to the horizontal shaft 38 on which this spring arm 40 is fixed. The end of the spring arm bears laterally against a downwardly directed tail 41 (Figure 3) disposed at or towards the left-hand end of the sliding bar 24. In the left-hand end of the universal bar 36 a recess or notch 42 is formed in such a position as to face towards and be adapted to be engaged by the spring arm 40. This spring arm cannot, however, enter this recess until the sliding bar 24 on which it acts through the tail 41 has taken the last step to the right in its sliding movement and consequently until this has occurred the movements of the universal bar 36 as the keys are depressed will not be communicated to the spring lever arm 40.

When, however, the spring lever 40 is permitted to enter the recess 42, any further movements of the universal bar 36 which will then take place as keys are depressed in the process of feeding into the machine the figures in the second factor of the sum, will cause the spring arm to move and thereby oscillations will be imparted to the shaft 38 on which this spring arm is mounted.

The parts above described operate in the following manner. When the figures making up the factors of a sum are fed into the machine and the necessary keys 21 are depressed in succession, the depression of the first key will cause the universal bar 36 to be pushed down taking with it the pawl 34. When the end of this pawl has moved downwards sufficiently, it will have been drawn off the first step 27 in the sector plate 25 and its side will fall against the face 28 of the second step, a suitably disposed spring imparting to the pawl a tendency to move in the required lateral direction and towards a stop 43 which determines the limit of its movement. On release of the key the universal bar 36 will rise owing to the spring 39 acting thereon and since the nose of the pawl 34 will then press upwards against the radial or downwardly facing edge part 32 of the sector plate 25 between the first and second steps the pawl will lift the sector plate. Consequently this plate will turn about its pivot until its peripheral edge 29 slides off the set screw stop 30 against which this part abutted, and this stop will then lie opposite to and be caused to abut against the face 27 of the first step on the sector plate as the horizontal bar 24 slides to the right under the action of the spring arm 40. This movement of this bar 24 will swing all the key rods 22 so that their lower ends are now positioned respectively over the second levers in the groups of levers which lie below and can be acted on by the ends of the key rods.

When the next key 21 is depressed for the purpose of feeding in the second figure of the first factor of the sum, the universal bar 36 will again be pushed down carrying with it the pawl 34 as before. The side of this pawl will then move off the second step 28 and its nose will now lie against the radial lower edge 33 of the sector plate, further swinging of the pawl being checked by its stop 43. On release of the key the universal bar 36 rises again and the pawl 34 will once more lift the sector plate 25 causing the end of the set screw stop 30 to slide off the face of the first step 27 on to the second step 28 thereby permitting the horizontal bar 24 to slide once more a step to the right. By this means all the key rods are swung again so that their lower ends are now respectively located over the third levers in the groups whose ends lie below the ends of the key rods. The spring arm 40 has now entered the recess 42 in the end of the universal bar 36. When keys are then depressed for the purpose of feeding in the figures in the second factor, no further sliding movement of the horizontal bar 24 and swinging of the key rods can take place but each of the keys 21 will act only on the third lever in the group associated therewith. Moreover each downward movement of the universal bar 36 which takes place whenever a key is then depressed will cause the spring arm 40 to move and effect an oscillation of the horizontal shaft 38 on which the spring arm is mounted.

When the mechanism is reset the parts described are restored to their initial position by causing the horizontally sliding bar 24 to move back again from right to left, thus swinging back to their initial positions all the key rods 22, this movement being imparted to the bar 24 by a lever to be described hereafter which acts on the righthand end of this bar. When thus pushed back against the action of the spring arm 40, which incidentally by this movement is lifted out of engagement with the recess 42 in the end of the universal bar, the bar 24 carries the sector plate 25 into such successive positions with relation to the nose of the pawl 34 that that plate can drop step by step under the force of gravity aided if necessary by a spring until the nose of the pawl rests again against the radial edge part 31 adjacent to the first step. The peripheral edge 29 of the sector plate is then positioned so as to abut against the set screw stop 30 which will hold the bar 24 in its initial position. The key rods 22 are now positioned with respect to the grouped lever ends so that each of these key rods can act on the first lever in the group associated with it.

The levers on which the key rods act may be regarded as comprised in that portion of the apparatus which is for convenience referred to as the key-actuated mechanism. These levers are interposed between the key rods and the selector mechanism, the detail construction, form and disposition of these levers varying as may be convenient and in accordance with requirements having regard to the other details in the construction of the apparatus. In each case, however, the levers form a series of sets, the number of these sets being one in excess of the number of sections in the selector mechanism.

While those sets of levers which correspond to the selector sections serve to effect partial selection in these selector sections in succession as indicated above, the additional set of levers functions to effect completion of the selection in all the selector sections simultaneously.

In a calculating machine having the capacity of that now being described, these key-actuated selector-operating levers may be arranged in the following manner. A shaft 50 (Figures 1 and 4) which extends transversely across the machine, carries loosely thereon two sets of levers 51a and 51b each set corresponding to a section of a selector which, as indicated, in this case comprises two sections since the capacity of the machine is limited to two figures in the first factor. Each of the levers in these sets has two arms, one arm 52a or 52b being directed upwardly so that its end lies adjacent to the rear of the lower part of the selector while the other arm 51a or 51b of each lever extends forwardly and if necessary is bent laterally so that its end will lie below the lower end 23 of a key rod in such a position that the latter when suitably swung and pushed down by the depression of a key can act on the lever. There is a third set of levers carried loosely on a transverse shaft 53 (Figures 1 and 3) disposed conveniently towards the front of the apparatus. Each of these levers has two arms one of which 55 extends in a somewhat horizontal direction towards the back of the machine so that its end which is conveniently upwardly directed lies below the selector. The second arm 54 of each lever is so formed and arranged that its end lies below and in such a position adjacent to the lower end 23 of a key rod that when the latter has been suitably swung and its key is depressed this key rod will act on and move the lever 54, 55 and through it effect the completion of the selection in the selector. This is the set of levers which functions whenever a key is depressed to feed in a figure in the second factor.

The ends of the forwardly extending arms of all the levers in these three sets on which the key rods can act, are arranged in groups (see Figures 3 and 4) each group containing the ends of three levers 51a, 51b and 54, that is to say, one lever from each set, and each group being disposed below and near the end of a key rod. In each group the ends of the three levers are always arranged in the same relative positions with respect to the lever sets, that is to say in every group the first lever end on the left belongs to a lever 51a in the first set, the second, or middle lever end belongs to a lever 51b in the second set, while the third lever end belongs to a lever 54 in the third set (see Figures 3 and 4). The grouped ends of all these levers lie in a horizontal row across the front of the machine and below the sliding bar 24 by means of which are swung the lower ends of the key rods. The relationship between the lower end 23 of each key rod and the group of lever ends with which this key rod is associated is such that when the sliding bar 24 is in its initial position the end of each key rod lies over the end of the arm of a lever 51a by means of which partial selection is effected in the first section of the selector. When the bar 24 has moved its first step in the manner described above and in so doing has swung all the key rods, the lower ends of these rods will then be located respectively over the ends of the levers 51b which serve to effect partial selection in the second section of the selector. When the bar 24 takes its second step and swings the key rods into the third position as described above, all the key rods will have their ends located over the ends of the levers 54 whose function is to effect completion of the selection simultaneously in the two sections of the selector.

By this means the operative relation between each key 21 and the key-actuated levers forming the group associated with that key is altered so that selector-actuating levers will be operated in different sets in succession as and when successive key operation takes place. It will be understood, however, that this successive operation of the levers in a group ceases after the figures in the first factor and the first of the figures comprised in the second factor have been fed in since the keys then continue to actuate the third set of levers 54 which function each time in a similar manner with respect to all sections of the selector simultaneously so as to perform the second part of the selective process.

Figure 6:
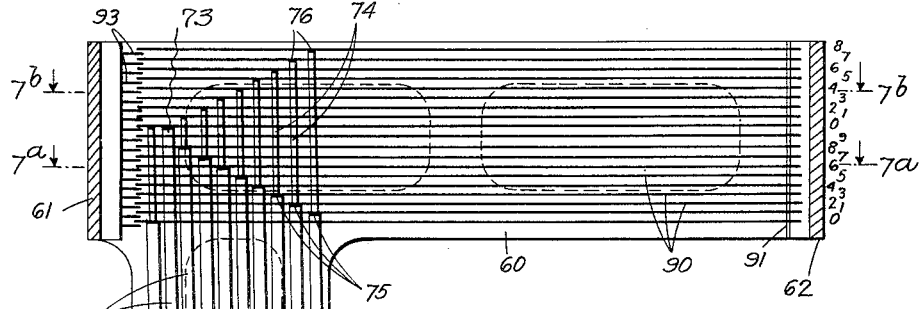
Figure 6 is a vertical section through the mechanism constituting the mechanical multiplication table the section being taken through the mechanism from front to back of the machine as on the line 6—6 in Figure 5 looking in the direction of the arrows.

Turning now to the selector mechanism, this is shown more particularly and separately in Figures 5, 6 and 7, but it is also seen in side elevation in Figure 1 and in front elevation in Figure 3 in the position which this part of the apparatus occupies in the machine considered as a whole. Details of certain parts appear in Figure 18. The following description will refer therefore mainly to these figures.

The selector mechanism may be said to comprise two parts the first of which contains sets of vertically sliding rods which are positioned as by swinging when the first part of the selection process takes place, this positioning of sets of rods enabling individual rods in these sets to be pushed up subsequently when the second part of the selection process is carried out and the selection thereby completed. The second or upper part of the selector comprises sets of members which can be lifted by the above-mentioned rods and in turn serve to set up stops with partial product values.

These parts are carried by a somewhat box-like casing comprising vertically arranged side plates 60 which, as will be seen in Figures 1 and 6, have a contour somewhat resembling an inverted L. These side plates are connected at their upper parts, that is to say, at the ends of the horizontal portions of their L formation by a front plate 61 and a back plate 62. The lower parts of those portions of the side plates which extend downwardly are connected by a front plate 63 and a back plate 64. The box-like framework composed of these several members is suitably supported on the base plate 11 of the machine in the position shown in Figures 1 and 3. When considered in front elevation as seen in Figures 3 and 5 and in plan as seen in Figure 7, the apparatus carried by and enclosed in the box-like casing 60, 61, 62, 63, 64, may be considered to comprise two main portions disposed respectively towards the right and left parts of the casing. It will be convenient to refer to the mechanism in the left-hand part as the A mechanism and that lying towards the righthand side as the B mechanism. In their main features it may be said that the A and B mechanisms are to a large extent similar though differing in detail. The A mechanism serves for the selection and setting up of stops having position values corresponding to the partial products obtained by multiplying the first figure in the first factor of the sum by the several figures in the second factor of the sum. The B mechanism, on the other hand, serves for the selection and setting up of stops having position values corresponding to the partial products obtained by multiplying the second figure in the first factor by the several figures in the second factor of the sum.

Between the downwardly directed portions of the side plates 60 are a number of rods 70 which extend and can be moved individually in a vertical direction. Towards its lower end each rod has a shoulder 71 formed thereon and beyond this shoulder the end 72 of each rod is of less diameter than the main portion of the rod. The reduced ends 72 of these rods pass through holes 65 in a series of horizontally disposed bars 66 the end portions of which lie and can slide in openings formed in the frame plates 63, 64. As will be seen in Figure 6, the holes 65 are tapered being smallest in diameter at their upper ends. The shoulders 71 formed on the rods 70 rest on the upper parts of the sliding bars 66 which thus support these rods while allowing each of them to be pushed up. At the same time, if any bar 66 is caused to slide for example towards the front of the machine, it will move with it and swing all those rods 70 which are carried thereby. Each of the sliding bars 66 has formed on it at its rearward end an upwardly projecting lug 67 which serves as a stop to limit the extent to which the bar can be caused to slide towards the front of the machine by reason of this lug coming in contact with the outer surface of the frame plate 64. It will be noted that the bars 66 are arranged parallel lying side by side in two main groups, as can be seen in Figure 5, one group forming part of the A selector mechanism while the other group forms part of the B selector mechanism.

The sliding bars 66 are all arranged in the plates 63, 64 so that the rear ends of these bars with the lugs 67 lie opposite and adjacent to the upper ends of the lever arms 52a and 52b (see Figure 1) so that when owing to actuation of a key a lever 51a is moved, the arm 52a of that lever will push the end of the corresponding sliding bar 66 which is in the A part of the selector mechanism and will cause this bar to slide until its lug 67 abuts against the frame plate 64.

In the same way when owing to the depression of a key the lever 51b is moved, the arm 52b of that lever will slide a corresponding bar 66 in the B portion of the selector mechanism.

The vertically movable rods 70 whose lower ends are supported in the manner described by the horizontally sliding bars 66 are arranged in two main groups as shown in Figure 5 one of these groups forming part of the A selector mechanism while the other group forms a part of the B selector mechanism. Each of these main groups of rods 70 is composed of ten separate sets, each of these sets in turn containing ten rods disposed in a row in a substantially vertical plane running in a front to back direction with respect to the whole machine as shown in Figure 6. The rods in a set are preferably all parallel and the vertical planes in which lie the several sets are preferably all parallel. All the rods 70 are conveniently similar in size as to their lower parts 72 and all the rods in any one set are equally spaced apart either as a whole or at any rate with respect to their lower ends which are carried and movable by the bars 66. Considering an under side view of the ends 72 of the rods in all the sets, the sets of rods are so disposed in relation to each other that these ends lie in parallel rows in a direction transverse to the machine, these rows forming an angle which is preferably though not necessarily 90° with the bars 66 and the rows of rods carried thereby, the latter rows as mentioned extending in a direction from front to back of the machine.

If the lower ends of all the rods 70 are viewed as when looking up at them from below or in an under side plan, the centres of the rods will appear as lying in rows at right angles to each other and thus occupying positions in relation to each other similar to the squares on a chessboard. This particular arrangement is that preferred and adopted in the construction here described but it will be understood that the relative positioning of the sets of rods may be otherwise than as above described as for example in place of the centres of the ends of all these rods when viewed from beneath lying in rows at right angles to each other, these rows may be disposed so as to form with each other some other angle as may be convenient with respect to other features in the construction. The sliding bars 66 have individual number values these same number values therefore attaching to the sets of rods 70 carried by these several sliding bars. The number values of these sliding bars run from 0 to 9 in the A group and similarly in the B group, as marked above the ends of the bars 66 as seen in Figure 5, the sliding bar in each group with number value 0 being that at the lefthand end of the group, while the bar at the righthand end has the number value of 9.

Below the bars 66 and the lower ends 72 of the rods 70 are arranged a series of ten substantially similar knife-like plates 80 which run horizontally with their edges directed upward and parallel to each other and extending in a transverse direction across the machine below both sections of the selector. The thickness of the upper edge of each knife-life plate is conveniently substantially equal to the size of the lower end 72 of a vertical rod as measured in the plane in which that rod can be positioned by swinging.

The knives 80 are so spaced apart in the front to back direction that the distance between the centre lines of the knives is equal to the spacing apart of the centres of the lower ends 72 of the rods in each set and this spacing is such that when a set of rods is in its initial position, as shown in Figure 6, if one of the knives is lifted it will pass between the ends of the rods adjacent thereto and will not act on these rods. On the other hand, when a set of rods has been swung in consequence of the sliding of its bar 66, the lower ends of all the ten rods in that set will be located over all the ten knives 80 so that if now any one of the knives is lifted it will push up that rod whose end registers with the upper edge of that knife. Each knife is adapted to be lifted by the key actuation of a corresponding lever 55 in the third of the set of levers mentioned above.

The knives are so carried by links or other suitable mechanism that when acted on by its lever each knife as it rises will remain substantially horizontal and parallel to its original position of rest. Conveniently and as shown in Figure 5, this is effected by each plate having pivoted thereto as at 81 two links 82 whose other ends are pivoted loosely on two transverse shafts 83 carried by lugs 68 extending downwardly from the frame plates 63, 64. The points of connection 81 between each knife 80 and its pair of links 82 are conveniently disposed towards the ends of the knife. Beneath each knife lies the end of the arm 55 on one of the levers 54 on which a key when depressed can act through the end 23 of its rod 22 when these key rods have been swung by the sliding of the bar 24 so as to locate the ends 23 of the key rods over the ends of the levers 54.

The knives 80 have selective number values running from 0 to 9, as indicated in Figure 6, that knife which lies nearest the front of the apparatus having a number value of 0, and the knife which lies at the rear having a number value of 9. The levers 54, 55 which transmit movement from the keys to the several knives are so constructed and arranged that when the key rods 22 have been suitably swung by sliding of the bar 24 the depression of any key 21 will cause a knife 80 having the number value corresponding to that of the key depressed to be lifted. When so lifted the knife will move upwards throughout its whole length and will remain substantially parallel during its upward movement by reason of the disposition of the links 82 which carry that knife. Thus when a knife 80 is lifted it can push up to a substantially equal extent the corresponding vertical rod 70 in each and every set in the two sections of the selector. Actually when a knife is raised it will push up only the rod or rods 70 in the particular set or sets which may have been swung in the process of effecting partial selection. It will be seen therefore that while this positioning by swinging of the lower ends of the rod 70 takes place separately and successively in the two sections of the selector as the first factors are fed into the machine, thereby effecting partial selection, this selection is completed simultaneously in both sections of the selector as and when a knife 80 is lifted.

When the keys are actuated to feed in the figures in the first factor of the sum, the first key that is depressed will cause a bar 66 in the A portion of the selector mechanism to slide and thereby position the lower ends 72 of all the rods 70 carried by that bar over the knives 80. The bar 66 thus caused to slide will be that having a number value corresponding to the number value of the key whose depression has brought about this sliding movement, and hence the feeding in of this first figure in the first factor will effect the positioning with respect to the knives 80 of a complete set of ten rods 70 in the A portion of the selector mechanism. Owing to the swinging of the key rods 22 by the transverse sliding of the bar 24 in the manner described above, the next key that is depressed for the purpose of feeding in the second figure in the first factor will cause similar sliding of a bar 66 in the B portion of the selector mechanism with the result that in that part of the selector mechanism also a complete set of rods 70 will be swung so as to position their lower ends 72 over the knives 80. Owing to the further swinging of the key rods 22 by the sliding action of the bar 24, the next key that is depressed will lift a knife 80 having a number value corresponding to that of the key depressed and this knife will then act on and push up the two rods 70 in those sets that have already been swung into the paths of the knives. In the same way depression of other keys necessary to feed in the remaining figures in the second factor will lift the corresponding knives and push up rods 70 in the same two sets in the A and B portions of the selector mechanism.

Turning now to the normal multiplication table as set out in Figure 8, if this table be split up by setting out in two separate tables firstly all the tens digits of the products as they appear in the normal table and, secondly, all the units digits as they appear in this table, there will be obtained then the two separate tables shown in Figures 8a and 8b, the table Figure 8a containing the tens and the table Figure 8b containing only the units of the several products. The tens and units in these two tables Figures 8a and 8b occupy the same relative positions as they do in Figure 8 so that if one of these tables drawn on transparent material is superimposed on the other table, each and every complete product would be readable as a whole in the several squares.

Each rod 70 has in effect a number value which is that of one of the products appearing in a square in the multiplication table as set out in Figure 8 so that when one of these rods 70 is pushed up it will function to give an indication of that product value. This product-indicating mechanism, which is comprised in the upper part of the selector apparatus and has been referred to as the mechanical multiplication table, splits up each product so that the ten digit in that product is indicated separately from the unit digit in the product in the same way as the products are shown split up in Figures 8a and 8b.

To take a concrete example and assuming that it is desired to multiply 3 by 7, the depression of the No. 3 key will have caused the bar 66 with value 3 to slide and thus position over the knives the lower ends of all the rods 70 in the B part of the mechanism carried by this bar 66. Referring to Figure 8, it may be said that in this way a selection has been effected with respect to all the products in the horizontal row opposite the index No. 3 at the lefthand side of the multiplication table.

This selection has resulted from swinging the corresponding set of rods 70 and thereby rendering them alive by reason of their lower ends being positioned in the paths of the knives 80. When now the No. 7 key is depressed, the corresponding No. 7 knife will be raised and this will push up that rod 70 which has a product value of 21. Referring again to Figure 8, it will be seen that the No. 7 knife can function with respect to all the rods 70 having the product values appearing in the vertical row in the multiplication table over the index No. 7. Thus the raising of this No. 7 knife has completed the selection by pushing up the rod 70 having the product value of 21. This rod 70 will then give an indication of this product value split up as shown respectively in Figures 8a and 8b, that is to say, the tens digit 2 will be indicated separately from the units digit 1.

The A and B parts of the selector mechanism may be said to operate thus far in an identical manner. The A part, however, deals with products resulting from the multiplication of the first or tens figure in the first factor by all the several figures in the second factor while the B part of the selector mechanism deals with products resulting from the multiplication of the units or second figure in the first factor by all the several figures in the second factor. It will be noted, however, that the product indications resulting from pushing up the rods 70 are given simultaneously in the A and B parts of the mechanism when a knife is raised as the result of depressing a key to feed in the digits in the second factor of the sum to be performed, but these product indications are given separately and successively as and when the keys are depressed to feed in the successive digits in the second factor in the sum.

Thus supposing that the sum to be performed is the multiplication of 27 by 469, the depression of the keys necessary to feed in the digits 2 and 7 in the first factor renders alive the corresponding sets of rods 70 in the manner described, both in the A and in the B parts of the selector, by reason of the bars 66 carrying these sets being caused to slide. When now the No. 4 key is depressed, thereby raising the corresponding knife, there will be given simultaneous indications of the partial products split in the following manner:—

In the A part of the selector mechanism—

$$2 \times 4 = 0\text{--}8$$

In the B part of the selector mechanism—

$$7 \times 4 = 2\text{--}8$$

These indications having been given and suitably dealt with in the manner described hereinafter, the rods 70 that have been pushed up drop by gravity as the No. 4 knife is lowered following release of the No. 4 key and the mechanism is ready for the 6 to be fed into the machine. When the No. 6 key is depressed partial product indications are given in the following way:—

In the A part of the mechanism—

$$2 \times 6 = 1\text{-}2$$

In the B part of the mechanism—

$$7 \times 6 = 4\text{-}2$$

Finally, when the indications of these partial products have been effected and dealt with in the mechanism, the last figure 9 in the second factor is fed in by depressing the No. 9 key.

Partial product indications are then given simultaneously as follows:—

In the A part of the mechanism—

$$2 \times 9 = 1\text{-}8$$

In the B part of the mechanism—

$$7 \times 9 = 6\text{-}3$$

Thus it will be understood that the mechanism which has been termed the mechanical multiplication table deals in effect with the several products resulting from the multiplication of each digit in the first factor by each digit in the second factor in a distinct manner so that these products, which will be partial products of the whole sum, if there is more than one digit in each factor, can be dealt with in split form for purposes of addition and in the process of presenting the complete answer to the sum.

The second and upper part of the selector comprises a series of members which together form the mechanical representation of the multiplication table. In the preferred construction each of these members is constituted by a lever 90 having a plate-like form as shown in Figures 6 and 7, a number of these plate levers being shown also in Figure 18. It is to be understood, however, that these members may be otherwise constructed while functioning in a similar manner. The plates 90 are all disposed substantially horizontally and are arranged in two main sets, all the plates in a set being superimposed and suitably and preferably equally spaced apart in the vertical direction each set lying in and forming part of a section of the whole selector mechanism.

Each set of plates is divided into two superimposed groups the four groups being indicated by the chain line rectangles shown in the upper part of Figure 5. In the A section of the selector, which deals with the products obtained by multiplying the first or tens figure in the first factor by the several figures in the second factor, the uppermost group of plates 90aa comprises nine plates to which are assigned individual number values from 0 to 8 inclusive, the function of these plates being to effect the setting up of stops indicative of the values of the tens in these products. The individual plates in the group 90aa thus function with respect to the several numbers as set out in the squares in the table Figure 8a. The second and lower group 90a contains ten plates to which are assigned individual number values from 0 to 9 inclusive, and their function is to set up stops indicative of the values of the units in the products thus obtained. These plates function therefore with respect to the several numbers as set out in the squares in the table Figure 8b.

In the B section of the selector, there are similar groups of plates namely an upper group 90bb containing nine plates and a lower group 90b containing ten plates, the plates in these groups functioning respectively to set up stops indicative of the tens and units (as set out in the tables Figures 8a and 8b) in the products obtained by multiplying the second or units figure in the first factor by the several figures in the second factor.

The detail construction and manner of mounting of the plate-like levers 90 may vary as also the way in which they are grouped with respect to and are acted on by the vertically movable rods 70.

A simple method shown in Figure 7 may be adopted for the mounting of these plate-like levers which comprises a pair of comb-like plates 91 which are carried by the back frame member 62 and oppositely disposed in a substantially vertical plane. Between the teeth of these opposed members lie the edges of a plate-like lever in which have been formed slots or sawcuts 92 substantially equal in width to the thickness of the comb-like plates. The plate-like levers are thus carried in a manner which prevents their displacement while allowing them sufficient freedom of movement for each to be lifted through the small angle necessary. Preferably the plate-like levers are pivotally carried towards the back of the machine and extend forwardly with their end portions lying over the rods 70. In the front portions of the plates are formed holes through which some of the rods or parts of them can pass, the disposition of these holes, in parallel rows extending in two directions, and lying for example at an angle of 90°, corresponding to the relative disposition of the rods 70 as viewed in plan.

At its front edge each plate rests normally on one of a series of horizontally projecting pins 93 carried by the front frame plate 61. These pins 93 are staggered as shown in Figure 7 and the edges of the plates 90 are suitably notched so as to allow each plate to be raised to the requisite extent while also providing the necessary support for this plate after it has been raised and allowed to fall back into its position of rest.

The lifting of the plates 90 is effected when the vertical rods 70 are pushed up following the positioning of these rods and the lifting of knives 80 in the process of selection. While each of certain of the rods 70 when pushed up lifts only a single plate 90 and thus sets up only a single stop, on the other hand each of certain other rods 70 when pushed up lifts two plates 90 and thereby causes two stops to be set up.

These stops have number values and consequently the plates 90 may be assigned corresponding number values. These number values are indicated against the rear ends of the plates at the righthand side of Figure 6. The lower group of plates appearing in this figure is the group 90b indicated in Figure 5 and these have respective number values ranging from 0 to 9 inclusive. This group of plates serves to set up stops with number values corresponding to the units in the partial products obtained by multiplying the units or second figure in the first factor with the several figures in the second factor. That is to say lifting of these plates sets up stops whose several number values are those set out in the table Figure 8b. The upper group of plates 90 shown in Figure 6 is the group 90bb indicated in Figure 5 and these plates respectively have number values ranging from 0 to 8 inclusive. These plates serve to set up stops with number values corresponding to the tens in the partial products obtained by multiplying the units or second figure in the first factor by the several figures in the second factor. The stops thus set up have the several number values set out in the table Figure 8a.

The groups of plates 90a and 90aa in Figure 5 are assigned and serve to set up stops with similar number values but these in the case of the group 90a correspond to the units in the partial products obtained by multiplying the tens or first figure in the first factor by the several figures in the second factor, while the plates in the group 90aa serve to set up stops whose number values correspond to the tens in the partial products obtained by multiplying the tens or first figure in the first factor by the several figures in the second factor. Thus, taking for example a simple sum in which there are two single figure factors, say 6 multiplied by 7=42, the plate with number value 2 in the lower or 90b group will be lifted and this will push up a stop pin with value 2 (see Figure 8b). At the same time the plate with number value 4 in the upper or 90bb series will be lifted and this will push up the corresponding stop with number value 4 (see Figure 8a). If the sum to be performed is 60 multiplied by 7, the plate No. 2 in the 90a group will be lifted and will push up a stop with corresponding number value, and the plate No. 4 in the set 90aa will also be lifted pushing up the corresponding stop pin. On the other hand, if the sum to be performed is 6 multiplied by 77, the plates Nos. 2 and 4 in the groups 90b and 90bb respectively will first be lifted and will set up their corresponding stop pins and after these have been "felt" in the manner to be described hereinafter and their values recorded and indicated, then the same two plates in the sets 90b and 90bb will be raised again and the same two stop pins set up following the second depression of the number 7 keys for the purpose of feeding in the second figure in the second factor.

The upper parts of the rods 70 are formed and act on the plates 90 in various ways. Certain of them as in the case of one rod which appears in Figure 6 have their upper ends as shown at 73 in this figure of the same diameter as the main part of the rods. This end 73 is flat and lies close to the under surfaces of one of the plates 90. The other rods 70 have their upper portions reduced in diameter as at 74, thus forming on each rod a shoulder 75 where the reduction in diameter commences. In the plates 90 are formed certain holes 94 whose diameter is slightly greater than the diameter of the main part of the rods 70 and thus when these rods are pushed up they can pass freely through these holes 94 without acting on the plates 90 through which they pass. These plates have also formed in them certain holes 95 whose diameter is slightly in excess of the diameter of the reduced upper parts 74 of the rods 70 so that these reduced parts can pass freely through these holes 95. The lengths of the reduced parts 74 of the rods vary as also the overall lengths of these rods as shown in Figure 6. Thus taking the rod which lies most to the right of those shown in Figure 6, it will be seen that while the portion of larger diameter can pass through the larger hole formed in the lowermost plate 90 with number value 0 in the lower series, the next plate 90 with number value 1 has in it a smaller hole through which only the reduced part 74 of the rod can pass, the shoulder 75 of this rod then lying adjacent to the under surface of the number 1 plate.

The plates 90 in both groups which lie above that in the lower group with number value 1 all have smaller holes in them with the exception of the uppermost plate of all with number value 8 in the upper group, so that the reduced part 74 of this rod can pass freely through all these plates while the extreme end 76 of this rod lies close to the under surface of the plate number 8 in the upper set. Thus if this rod is pushed up, its shoulder 75 will engage and lift the plate number 1 in the lower set and its extreme upper end 76 will engage and lift the plate number 8 in the upper set. No one of the other plates will be lifted since the rod can pass freely through them all. The pushing up of this particular rod with number value 9, which will be effected by raising the No. 9 knife, will therefore cause the setting up of two stop pins one with value 8 in the tens (see Figure 8a), and one with number value 1 (see Figure 8b), the product indicated in this way being therefore 81.

By comparing the lengths of the rods 70 and of their reduced portions 74 as shown in Figure 6 with the partial product figures as set out in the tables Figures 8a and 8b, it will be seen how stops with values corresponding to these several figures will be set up as the several rods 70 are pushed up and caused to lift plates 90 in the two groups. It is to be noted that the set of rods 70 shown in Figure 6 is composed of the rods which function to give product indications corresponding to 9 multiplied by any number from 0 to 9 and therefore the product values indicated by these rods will be those made up of the figures set out in the lowest row of figures in Figure 8a and the lowest row of figures in Figure 8b, the complete products being seen in the lowest row of figures in Figure 8.

In the preferred construction the stops that are set up by the plate-like levers 90 are formed as pins of suitable dimensions and structure, the lower end of each of these pins resting on its corresponding plate and being suitably guided. The force of gravity may be relied on to cause the pins and their corresponding plates to drop back again into their initial and inoperative positions or springs may be employed to assist this movement. In place of the stops being formed as sliding pins, they may be constructed and moved otherwise as a result of the selection effected in or by means of the rods 70 and the stop-setting plate-like levers 90 or members moved thereby. For example, a series of discs may be provided each of which has its periphery stepped in the radial direction. Alternatively, radial notches or recesses may be formed in the periphery of each disc, these notches extending for different distances towards the centre of the disc. Yet again, each disc may be provided on one or both faces with laterally projecting pins differing in length or in their positions with respect to the centre. In either of these constructions the steps, notches, pins or other features formed on or carried by the disc constitute the stops. In place of employing complete rotatable discs carrying the stops, pivoted sector-shaped or quadrantal members may be utilized these members being formed and provided with steps, pins or other devices serving as stops which can be set up in the desired manner. Yet again, the stops may be carried by or formed on members disposed so that they can slide so as to bring the several stops forming each set into an operative position.

For example, a sliding bar may be formed with steps of different heights these steps constituting stops or the bar may carry a set of pins which are either of different dimensions as for instance in respect of their height or so arranged relatively that they can function in the desired manner. In each case the parts which function as stops, by reason of their positions or dimensions are capable of giving indications of the number values represented by these stops. Further, the stops should be capable of being positioned as a result of the selective process due to key actuation so that any stop selected and set up can be "felt" in some convenient manner for the purpose of ascertaining its number value and in order to enable an indication to be given of this number value. Thus it will be appreciated that it is possible to employ for the purpose various mechanical equivalents of the stop devices more particularly described hereunder by way of example.

The movement necessary to set up any stop may be imparted in various ways as found convenient by the plate-like or other lever devices to the stops or stop-carrying members whatever the form of the latter.

The stops whatever their form are arranged in sets each set corresponding to a group of plate-like members 90 in a section of the selector. Thus in the machine now being described there are four sets of stop pins 100, 101, 102 and 103 and the pins in each set are arranged in a row so that they all lie and can slide in the same vertical plane all the stops in one set being equally spaced apart in the horizontal direction. These four sets of stop pins are shown in plan in Figure 9 and also in end view in Figure 5. The rows of stops lie parallel to each other and extend in the front to back direction with respect to the whole machine.

In two of the rows 101 and 102 there are nine stops each of which is movable, that is to say, capable of being separately pushed or set up, while at the end of each of these rows is a tenth stop which is fixed. In the other two rows 100 and 103 there are eight movable stops with a ninth one which is fixed at the end of each row. The arrangement is such that a member whose function it is to "feel" a stop which has been set up can move in the process of feeling through a distance which will be determined by the position in its row of the stop set up, the extreme limit to the distance through which this feeling member can move being determined by the endmost and fixed stop. While the structure and arrangement of these feeling members may vary, in the arrangement employed in the present machine each of the feeling members is constituted by a plate or bar of suitable shape and dimensions which can slide in a guide of some convenient construction.

The member 104 in which the guides are formed is shown in plan in Figure 9, in side elevation in Figure 10, as viewed from the front in Figure 5 and as viewed from the rear in Figure 11. The front portion comprises a bridge-like central part 105 laterally supported above a base plate 106. The flat upper surface of the part 105 is extended laterally in overhanging flanges 107 and 108. The member has a rearwardly extending part 109 which serves to support what may be referred to as the adding mechanism by means of which partial products are added together and a visible indication given of the answer the partial products being derived from "feeling" stops set up in the forward portion 105 of this member which, as will be seen by reference to Figure 1, extends from the front towards the back of the machine.

The guides are formed as horizontally extending parallel slots or grooves in the upper surface of the member 104. Taking these guide grooves in order from right to left as seen in Figure 5 from the front of the machine, there are five guides 110, 111, 112, 113 and 114. The sets of stop pins can slide freely through and are guided by various parts of the member 104, the set of stops 102 being arranged so that when any one of them is pushed up it will project into the guide groove 110 while the set of stops 103 are similarly arranged with respect to the guide groove 112. The two sets of stops 100 and 101 when pushed up do not project into a guide groove but are located respectively in the lateral flanges 107 and 108 so that when a stop pin in either of these sets is pushed up its end will project above the flat upper surface of the member 104. The stop pin which lies at the foremost end of each row is a fixture so that these end pins in the sets 102, 103 constitute the extreme limits which determine the sliding movement in the grooves 110 and 112 of the feeler members when these members are moved towards the front of the machine. In the guide groove 113 is a fixed stop 115 a similar fixed stop 116 being disposed in the groove 114. The functions of these fixed stops will be referred to hereafter.

Figure 2:
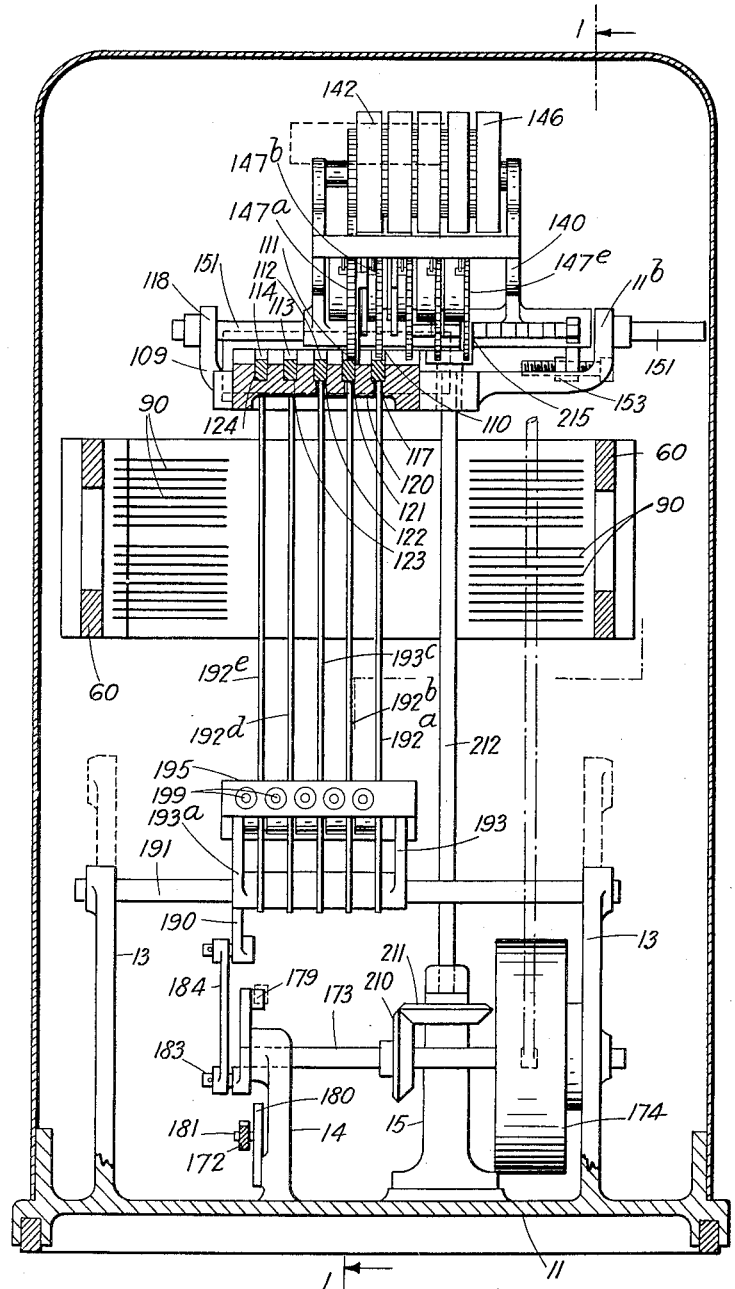
Figure 2 is a transverse vertical section on the broken line 2—2 in Figure 1 looking in the direction of the arrows.

In these several guide grooves lie and can slide a series of five bars or the like 120, 121, 122, 123 and 124 which can be seen in the transverse sectional elevation Figure 2, while one of these bars 121 which lies and can slide in the guide groove 111 is shown in side elevation in the upper part of Figure 1. This guide groove 111 is uninterrupted by any fixed stop.

In the portions of the guide grooves which lie in the rear part 109 of the guide member, slots 117 are formed as shown in Figure 9 each of these slots extending right through the member 109 from its under-side into the bottom of a groove as will be seen from Figures 1 and 2. The slot 117 in the guide groove 111 has the greatest length, the slots in the guide grooves 110 and 112 being shorter but all these three slots terminate in the same transverse plane at their forward ends. The slots in the guide grooves 113 and 114 are appreciably shorter and the rear ends of these slots as also the rear ends of the slots in the grooves 110 and 112 all terminate in the same transverse plane while the slot 117 in the guide groove 111 extends further rearwardly. Through each of these slots extends a finger which engages with an opening 125 formed in the rear portion of each sliding bar in the manner shown in Figure 1. The arrangement and operation of these fingers will be referred to hereafter but it may be said here that by means of these fingers sliding movement can be imparted to each of the bars 120, 121, 122, 123 and 124, thereby causing them to move forward into the positions determined by the stop pins.

The disposition of the two sets of stop pins 102 and 103 in the guide grooves 110 and 112 is such that they can project directly into the path of the sliding bars or feeler members 120 and 122 which lie in these guide grooves. In the case of the sets of stop pins 100 and 101 these, as already described, are disposed in the lateral flanges 107 and 108 of the forward part 105 of the guide plate 104 and the feeling of the pins in these two sets is effected indirectly by the feeler member 121 which slides in the guide groove 111.

The indirect feeling of these stops may be effected in various ways but in the construction of machine now being described the feeler member 121 has pivoted on its forward end at 126 a flat bar or lever having two arms 127 and 128 which extend oppositely in a horizontal plane the bar being arranged so that it can swing freely over the upper flat surface of the part 105 the ends of the bar being of such length and so formed that they are adapted respectively to make contact with stop pins in the two sets 100 and 101 in the manner shown in Figure 9. The swinging bar 127, 128 can move freely over the feeler members which slide in the other grooves and the stop pins in those grooves since these are arranged so that they do not project above the upper surface of the part 105. Owing to the action of this swinging bar the position into which the feeler member 121 can slide will be determined when the arms 127 and 128 of the bar have come into contact respectively with stop pins in the two sets 100 and 101.

The guide member 104 is positioned and secured on the top of the casing 60, 61 and 62 which encloses the plate-like levers 90, the base plate 106 closing in the forward portion of the top of this casing as shown in Figure 1. The movable stop pins in the several sets extend downwards through holes in the base plate 106 and the lower ends of these pins rest on their corresponding plate-like levers 90 so that each of these plates controls a single stop pin and when a plate is lifted it will push up a corresponding pin into the path of a feeler member.

Referring to Figure 5, it will be seen that the lower ends of the stop pins in the set 100 rest on the plate-like levers in the group 90$bb$, the lower ends of the pins in the set 102 rest on the plate-like levers in the group 90$b$, the lower ends of the pins in the set 103 rest on the plate-like levers in the group 90$aa$ while the lower ends of the stop pins in the set 101 rest respectively on the plate-like levers in the group 90$a$.

In order to economize space the stop pins in the sets 102 and 103 may be arranged so close together as shown in Figure 9 that all the pins in a set are practically in contact when in place of there being a series of separate guide holes for these pins slots of the required width may be formed in the member 105 and in the base plate 106 the sides of these slots serving to support the pins in the lateral direction while in the fore and aft direction, that is to say the direction in which run the guide grooves 110 and 112 the pins support each other. If desired, however, the pins may be spaced apart and each may pass through separate guide holes. The stop pins in the sets 100 and 101 are, however, more widely spaced apart the distance between any two pins in each of these sets being equal to the diameter of a pin. This arrangement ensures that the feeler member 121 as it slides will move through distance increments determined by the stops set up in the two sets 100 and 101 which distance increments are equal to the distance increments through which will move the feeler members 120 and 122 as determined by the stops set up in the sets 102 and 103.

In the Figure 9 the number values of the stop pins in the sets 100 and 101 are indicated beside these pins there being, as already mentioned, nine pins with number values from 0 to 8 in the set 100, all these pins being movable except the No. 8 pin which is fixed, while in the set 101 there are ten pins with number values from 0 to 9, all these pins being movable except the No. 9 pin. Number values which are not however indicated in Figure 9 are attached and in the same order to the nine pins in the set 103 and to the ten pins in the set 102.

Since each plate-like lever 90 when lifted pushes up only a single stop pin, it is necessary to arrange for these pins to pass through or past certain of the plates so that the lower end of any one pin will rest on the upper surface of the plate which causes that pin to be set up. Thus there are formed in the plates 90 holes 96 (see Figure 7) through which pins in the sets 100 and 101 can pass, these holes being of such diameter as to provide the necessary clearance in order to ensure that lifting of a plate will not push up any stop pin but that whose lower end rests on that plate. The position occupied by the lower end of the pin which is to be pushed up is indicated by an X at 97 on the plates shown in Figure 7. In the case of the sets of stop pins 102 and 103, since the vertical planes in which these pins are located lie adjacent to the inner edges of the plates 90, the necessary clearance for these pins is provided by notching or otherwise cutting away as at 98 the edges of these plates, the extent of such notching or cutting away being determined by the number of pins for which clearance must be allowed.

Referring now to the detail structure of the several plates 90, two of these are shown clearly in Figure 7 while others are shown in the series of views comprised in Figure 18. In this latter figure the number value of each plate is indicated on or near it in the several views, that is to say, the number value of the partial product figure represented by the stop pin which will be set up when the plate is lifted. Lettering is associated with these number values to indicate the particular group to which each plate belongs, the letters $a$ and $aa$ indicating the groups 90$a$ and 90$aa$, while the letters $b$ and $bb$ indicate the groups 90$b$ and 90$bb$. Thus in Figure 18 there are shown the plates 90 having number values 0, 1, 2, 3 and 8 belonging to the set 90$a$, the plate having number value 6 belonging to the same set being shown in Figure 7. In Figure 18 there are shown the plates with number values 0, 1, 2, 3 and 7 belonging to the set 90$aa$. Further, there is shown in Figure 18 the plate No. 0 belonging to the set 90$b$ and the plate No. 0 belonging to the set 90$bb$ while the plate No. 2 belonging to the set 90$bb$ is shown in Figure 7. In each of these views the cross marked at 97 indicates the place where rests on the plate the lower end of the stop pin which will be pushed up when this plate is lifted. The black dots at 99 in each of the views in Figure 18 indicate where the upper ends 76 of rods 70 lie adjacent to the under surface of a plate so that when any one of these rods is pushed up that plate will be lifted and a corresponding stop pin set up. The large holes 94 indicated in each plate shown in Figure 18 provide the clearance for the main parts of rods 70 which have to pass through certain plates in order to act on and lift plates above.

Similarly the small holes 95 provide for the passage of the reduced upper parts 74 of rods whose upper ends 76 bear against and effect the lifting of plates above. From what has been said previously, it will be appreciated that in case of certain rods 70 when any one of them is pushed up it will lift two plates 90, one of these plates being raised by reason of the engagement of the shoulder 75 on the rod 70 with the under side of a plate in a lower set, while the upper end 76 of that rod will lie against and lift simultaneously a plate in the corresponding upper set.

If the views of the several plates 90 are compared with the figures as set out in Figures 8a and 8b, it is possible to see the relationship between any one of these plates and the number value assigned thereto as this number appears in the tables in Figures 8a and 8b. It may be remarked that with respect to the arrangement of the larger holes 94, the smaller holes 95 and what may be termed the lift points 99, the plates which compose the group 90a are similar to the plates composing the group 90b, that is to say, the plate with 0 number value is the same in each set. There is a like similarity between the plate composing the group 90aa and 90bb. Comparing the tables in Figures 8a and 8b with the views of the plates 90 and taking for example the plates No. 0aa and No. 0bb in Figure 18, it will be seen that in each of these plates there is a lift point 99 in a position corresponding to a 0 in the table in Figure 8a. This means that whenever a rod 70 in the position indicated by a lift point 99 is pushed up, by reason of the upper end 76 of this rod lying adjacent to the under surface of one of these plates, this plate will be lifted and a corresponding stop pin with 0 value set up, in the case of the plate 0aa this will be a stop pin in the set 103 whereas in the case of the plate 0bb this will be a stop pin in the set 100.

Holes 94 appear in each of these plates in positions corresponding to all the other figures in the table in Figure 8a. In the case of the plate 0aa there is a series of clearance holes 96 for the passage of all the stop pins 101 which are lifted by the lower set of plates composing the group 90a. In the case of the plate 0bb its edge is cut away as at 98 to allow clearance for the set of stop pins 102 which are acted on by the lower group of plates 90b. Considering the plate 1aa the lift points 99 will be found to correspond to the figures 1 in the table in Figure 8a while holes 94 provide for the passage of other rods 70. As in the case of the plate 0aa so here there is a row of holes 96 which provide for the free passage of the stop pins in the set 101. The edge of this plate is also cut away at 98 to allow clearance for those stop pins in the set 103 which are acted on by plates disposed below the plate 1aa. In the same way in the plates 2aa, 3aa and 8aa there will be found to be a relation between the lift points 99 and the corresponding numbers 2, 3 and 7 in the table in Figure 8a.

The following example will serve to show how the partial product values are indicated by the several sets of stop pins and how the two digits respectively in the tens and units of the partial products are added together and an indication of the required sum obtained from the feeler member 121 by reason of the positioning of this feeler member resulting from the feeling of stops in the two separate sets 100 and 101.

Assuming that the sum to be performed is 47×8, then the answer may be set out in the following manner:—

```
  3  2
     5  6
  3  7  6
```

By the action of the selector mechanism following the depression of the keys in due succession four stop pins will be set up. In the B section of the selector the plate selected from the 90bb group will set up a stop pin having a value of 5 in the set 100. The selected plate in the 90b group will set up a stop pin having a value of 6 in the set 102. In the A section of the selector the selected plate in the 90aa group will set up a stop pin with value 3 in the set 103. The selected plate in the 90a group will set up a stop pin with value of 2 in the set 101. Of the stop pins thus set up those with values 6 and 3 in the sets 102 and 103 will respectively be felt directly so that indications of these separate values can be given, but the third feeler member 121 in the process of feeling will take up a position determined by the contact of the ends 127 and 128 of the swinging bar carried thereby with the two pins respectively having values of 2 and 5 in the sets 100 and 101 and the resultant position value of the feeling member 121 will be 7. Thus in the process of feeling these two pins the values of these pins will have been added together and their sum can be indicated by the position which the feeler member has thus been caused to take up.

From what has been said above it will be apparent that in the process of feeling the stops the number value assigned to each stop is in effect a measure of the distance moved by the feeling member when referred to its zero position. Hence it is desirable that all the sliding feeler members should move through similar equal increments when they assume their respective number-indicating positions and the spacing of the stop pins is arranged so as to ensure this. Thus as mentioned the pins composing the sets 102 and 103 are spaced apart so that the distance between their centres is not greatly if at all in excess of the diameters of the pins, but the pins forming the two lateral sets 100 and 101 are spaced more widely apart. By this means the third feeler member 121 will be caused to move through distance increments equal to those through which move the feeler members 120 and 122, but the feeler 121 can slide through a total distance in excess of the total distance through which either of the other two feeler members can slide. This is necessary since, in addition to being able to assume positions corresponding to the individual number values of the pins in either one of the sets 100 and 101, the feeler member 121 must be capable of taking up positions corresponding to the number value of the sum of the two figures represented by stops set up simultaneously in both of the two sets 100 and 101.

The number of stop pins in each row or set is determined by the possible figures obtainable in the answers. It is convenient to arrange that the last or endmost stop in each row is a fixture since each of these pins can only be felt when no other pin in the same row has been set up.

The means by which the required answer indications are obtained from the positioning of the feeler members may vary. In some instances a direct reading of the answers may be obtained by causing the sliding feeler members to carry numbers which are brought into positions where they can be viewed when the feeler members have taken up the positions determined by the stops set up. Such an arrangement is not, however, convenient by reason of the need for providing means for dealing with the carry. In the preferred arrangement therefore, the movement of each feeler member is transmitted in some convenient manner, and either directly or indirectly, to answer-indicating members which, for example, may rotate or swing so as to cause figures to be exhibited as required. It is then practicable to provide means whereby these answer-indicating members can receive an additional movement as and when necessary for the purpose of adding in the carry. The transmission of the movement of the feeler members to the answer-indicating members may be effected either as each feeler member travels from its zero position into a position determined by the stop or stops set up or when the feeler member is returning from the position thus determined into its zero position. In the construction of machine now under consideration, it is convenient to arrange that the feeler members, without acting on the answer-indicating members, first slide into positions determined by the stop or stops set up, that is towards the front of the machine, and then as the feeler members are subsequently caused to move back towards their zero positions they are brought into operative connection with the answer-indicating members and move the latter to the required extent.

The answer-indicating mechanism employed in the present construction is shown more particularly in Figures 12, 13, 14 and 15 but is also seen in position on the machine in Figures 1 and 2. This mechanism comprises a frame 140 which carries on a shaft 141 a series of rotatable discs 142, 143, 144, 145 and 146 of suitable dimensions and construction each disc bearing on its flanged periphery numbers which can be presented at a window 17 (Figure 1) provided for the purpose in the outer casing 18 which encloses the machine. Each of these number-carrying discs can be rotated by gearing also carried in the same framing 140 the latter being so mounted that it can be lowered or raised in order to cause a series of gear wheels 147 to engage respectively with or be disengaged from toothed racks 129 (Figure 1) formed on or carried by the several sliding feeler members 120, 121, 122, 123 and 124 (Figure 2). In this machine there are five number-carrying discs each with its corresponding gear wheels 147, 148, 149 and 150 through which the discs can be rotated. The number of the number-carrying discs is determined by the maximum number of figures which can appear in the answers to the sums with which the machine in question can deal.

The framing 140 which carries this answer-indicating mechanism is pivotally mounted towards its rear and a convenient arrangement for this purpose being that indicated in the drawings where the framing 140 is fixed to and extends from a shaft 151 which projects to an appreciable extent from the opposite sides of the framing 140 as shown in Figures 13 and 14. The portions of this shaft are carried and can slide in lateral bearings 118 (which extend upwardly from the rear portion 109 of the plate 104, see Figures 2, 9 and 10).

These bearings are sufficiently spaced apart to allow of the frame 140 with the wheels carried thereby being traversed across the sliding feeler members to the extent necessary to enable the gear wheels 147 to be engaged successively with the racks 129 of the sliding feeler members. For the purpose of lifting the frame 140 and thereby taking the gear wheels 147 out of engagement with the racks of the feeler members when traversing of the frame 140 is to take place, a lever 152 is provided, see Figures 12 and 14, which projects forwardly from the shaft 151 at one side of the framing 140. Lifting movement is imparted to the whole framing through this lever 152 in a manner to be described hereafter. The traversing of the framing 140 is effected by rotation of a pin wheel which engages a rack 153 disposed on the forward side of the under part of the framing 140 adjacent to the shaft 151. The arrangement and operation of the pin wheel mechanism will be described hereafter.

In order to appreciate the co-operation of the answer giving mechanism with the rack of the feeler members 120, 121, 122, 123 and 124, it is necessary to note the relative diposition of these feeler members. Considering their positions as viewed from the front of the machine the feeler 121 which carries the swinging bar 127, 128 lies between the two sliding feeler members 120 and 122 both of which, as mentioned, feel directly the stop pins set up in the rows 102 and 103. For convenience, the sliding feeler 122 will be referred to as the first feeler, the feeler 121 carrying the swinging bar will be referred to as the second feeler, while the feeler 120 which lies towards the righthand side will be referred to as the third feeler.

The sum last set out above may now be conveniently restated as follows in order to associate the figures therein with these several feelers by means of which the values of these figures are ascertained:—

| Sliding feelers | 122 | 121 | 120 |
|---|---|---|---|
| | 1st | 2nd | 3rd |
| | | 3 | 2 |
| | | 5 | 6 |
| | 3 | 7 | 6 |

It will be convenient also to identify the several gear wheels 147 in a somewhat similar manner the indications being shown in Figure 13. Taking these gear wheels in order from left to right as they appear from the front of the machine, that is as seen in Figure 13, the first gear wheel 147a is that through which rotation is imparted to the number-indicating wheel 142. The second gear wheel 147b transmits movement to the number wheel 143, the third gear wheel 147c transmits movement to the number wheel 144, the fourth gear wheel 147d transmits movement to the number wheel 145 and the fifth and last gear wheel 147e transmits movement to the number wheel 146.

From the manner in which the calculating machine is operated as described above, it will be understood that when feeding in figures in the factors of a sum to be performed in the machine, keys are depressed in the order in which these figures would normally be written down by hand. Thus taking the sum just set out, 47×8, the 4 key is first depressed and then the 7 key, thereby performing partial selection in the selector mechanism.

The 8 key is then depressed completing the selection and setting up those stops which will determine the positioning respectively of the first, second and third feeler racks. These three feeler racks are then positioned and the number values thereby ascertained are all fed into the answer-indicating mechanism as one complete sum. The stops that have been set up fall back and the feelers return automatically to their zero positions. If there is a second figure in the second factor, the key corresponding to this figure is then depressed and thereby the necessary selection is completed and stops set up with number values indicative of the required partial products. These stops are then felt and these partial products are fed in as a second but subsidiary complete sum into the answer-indicating mechanism. The totals of these two subsidiary sums are added together in this mechanism and the required total product indicated. The same procedure is followed if there is a third figure in the second factor.

After the figures in the above sum 47×8 have been fed into the machine and the corresponding stops set up and felt, the frame 140 carrying the answer-indicating mechanism is lowered and owing to the position into which this mechanism has been traversed following depression of the No. 8 key, the first gear wheel 147a will engage with the rack of the first feeler 122, the gear wheel 147b will engage with the rack of the second feeler 121 and the gear wheel 147c will engage with the rack of the third feeler 120. The gear wheels 147d and 147e at this stage will be inoperative. As the feeler members now all slide back towards their zero positions, they will rotate the number-carrying wheels 142, 143 and 144 into positions such that these wheels will indicate the answer to the sum performed, namely 376.

If there is a second figure in the second factor in the sum which is being dealt with, the key corresponding to this figure is now depressed and the selection of stops indicative of the partial products obtained by multiplying the first factor by this figure is completed and these stops are set up. By mechanism to be described hereafter which is actuated as a result of depression of the key, the frame 140 carrying the answer-indicating mechanism is raised by the lever 152 so as to disengage the gear wheels 147 from the sliding feeler racks and at the same time this frame 140 is traversed to the extent of one step towards the left. The gear wheels 147 are now positioned so that when the frame carrying them is lowered, after the feeler members have moved forward into the positions determined by the stops set up, the gear wheels 147b, 147c and 147d will now engage respectively with the racks of the first, second and third feeler members and consequently as these members slide back into their zero positions the number-carrying wheels 143, 144 and 145 will be rotated severally so as to indicate figures in accordance with the number values ascertained by feeling the stops set up. It is to be noted, however, that in the construction under consideration the carry figures are added in after the racks have reached their zero positions by mechanism to be described. Thus supposing the sum to be performed is 47×88, the second stage of the sum has been dealt with in the following manner:—

```
    3  7  6
       3  7  6
    ─────────
    3 10 13  6
```

The number-carrying wheel 142 will show the figure 3 as at this stage it has not been rotated further. The number-carrying wheel 143 will show 0, the wheel 144 will show 3 and the wheel 145 will show 6. The carry from the third wheel 144 to the second wheel 143 and similarly from this latter wheel 143 to the wheel 142 will then be effected by mechanism to be described.

Before detailing the mechanism employed to effect the carry, it will be desirable to comment on the operation of the mechanism described above under certain circumstances and further to indicate to what extent carrying has to be provided for in a machine havin the capacity of that now under consideration.

It will be noted that in one of the sums set out above by way of example where 47 is multiplied by 8, no carry is necessitated from the tens into the hundreds in the answer and in that case therefore the correct total answer will be indicated directly by the number wheels without the carry mechanism coming into operation. If, however, the sum to be performed is such as 77×7:—

```
       4  9
          4  9
       ───────
       5  3  9
``` then of course a carry of 1 has to be effected from the tens into the hundreds in order to provide the correct answer. Here the carry results from adding together the figures which fall in the tens column in the two partial products which together make up the total answer, this addition in effect being performed as the second feeler member 121 takes up the position determined when the swinging bar 127, 128 has felt the two stops set up in the rows 100 and 101 as indicative of the two figures 9 and 4 which here have to be added together.

It has been mentioned above that the feeler member 121 can slide through a total distance which is greater than either of the sliding feeler members 120 and 122. This greater movement is utilized to cause the number-carrying wheel which in this instance would be the wheel 143, to be rotated forthwith by the feeler 121 into such a position, that this number-carrying wheel will indicate the correct answer figure which should appear in the tens column and in this instance is 3, while at the same time positioning parts which will eventually enable the carry mechanism to operate and cause the first number-carrying wheel 142 to be rotated a further increment, whereby that wheel will show the required answer figure of 5. The carry takes place automatically when the whole operation of the machine associated with feeding in a sum is completed or after the third figure in the second factor, if there is such a third figure, has been fed into the machine.

If now the sum to be performed is 7×77, then the feeding in of the first figure in the second factor causes the complete answer to the sum up to that stage, namely 49, to be indicated by the wheels 142 and 143. Then when, as a second operation, the second figure in the second factor is fed in, a second rotary movement is imparted by a sliding feeler member to the number-carrying wheel 143 thereby setting the carry mechanism so that the number-carrying wheel 142 will be rotated the necessary further increment when the carry mechanism operates at the completion of the sum.

It may be noted here that when the mechanism has been reset and is ready for a sum to be fed into it the frame 140 with the answer-indicating mechanism has been traversed into its extreme position to the right when the gear wheels 147a and 147b are located respectively above and in positions to engage the racks of the second and third sliding feeler members 121 and 120. Though these gear wheels at this time engage respectively with these two feeler members they are not actually moved by these members since the mechanism by means of which the lifting and traversing of the answer-indicating mechanism is effected operates in such relation to the depression of a key when feeding in a figure in the second factor that when this key is depressed, thereby causing the selected stops to be set up, and before these stops are felt, the frame 140 with the answer-indicating mechanism is raised and traversed one step so as to bring the gear wheels 147a, 147b and 147c respectively over the racks of the first, second and third feeler members 122, 121 and 120. It is only when thus relatively positioned and after the stops have been felt that the answer-indicating mechanism is lowered so as to cause the gear wheels severally to engage with the racks of these feeler members. Hence if for example there is only a single figure in each factor as for instance in the case of 7×7, it is necessary in the first place to depress the 0 key and then the 7 key in respect of the figure in the first factor.

When now the 7 key is again depressed in respect of the figure in the second factor, two 0 stops will be set up, one in the set 101, which will be felt indirectly through the arm 127 of the swinging bar by the sliding feeler member 121, and the other in the set of stops 103 which will be felt directly by the sliding feeler member 122. Both these 0 stops will have been set up by selection effected in the A section of the selector mechanism. On the other hand, stops indicative of 4 and 9 will be set up by the selection effected in the B section of the selector mechanism. The 4 stop will be set up in the set 100 and will be felt by the arm 128 of the swinging bar carried by the feeler 121, while the 9 stop will be set up in the set 102 adapted to be felt directly by the sliding feeler 120. After these stops have been felt by the three feelers, the answer-indicating mechanism will be lowered bringing the gear wheels 147a, 147b and 147c respectively into engagement with the racks of the three feelers. Since the feeler 122 will not have moved, owing to a 0 stop being set up in front of it, the number-carrying wheel 142 will not be rotated, but will remain in its initial position showing 0 in the answer. The feelers 121 and 120 will have assumed such positions in feeling the stops set up that as they return to their zero positions the number-carrying wheels 143 and 144 will be rotated so as to show the figures 4 and 9 as the answer.

If there are two figures in the first factor and only one in the second factor, as in such a sum as 77×7, then when the 7 key is depressed in respect of the first figure in the first factor, there will be effected partial selection of stops in respect of 4 and 9 in the A section of the selector mechanism. When the 7 key is again depressed in respect of the second figure in the first factor, there will be effected partial selection of stops in respect of 4 and 9 in the B section of the selector. When the 7 key is depressed in respect of the single figure in the second factor the selection of stops in all four sets will be completed and these stops will be set up, the 9 and 4 stops in the tens column being both felt and added together by the feeler member 121 and subsequently as this feeler returns to its zero position it will cause the number-carrying wheel 143 to be rotated so as to show 3 in the answer and the 1 will be carried in the manner described hereunder.

Thus the sequence of operations is such that when a key is depressed to feed in a figure in the second factor, mechanism actuated by the depression of this key immediately lifts the gear wheels of the answer-indicating mechanism out of engagement with the feeler racks leaving the latter free to be moved forward to feel the stops set up. At the same time the answer-indicating mechanism is traversed towards the left to the extent of one step. On the release of the key the answer-indicating mechanism is lowered so as to bring the gear wheels into engagement with the positioned feeler racks which are then moved back into their zero positions and as they move they turn answer-indicating wheels to show the answer.

A consideration of the possible figures that will have to be dealt with in the answer-indicating mechanism in this machine shows that of the five number-carrying wheels and the corresponding gear mechanisms for rotating them, it will never be necessary to effect a carry from the wheel 146 to the wheel 145 since the highest number that can be fed into the wheel 146 is 9. It may be necessary, however, to effect a carry from the wheel 145 to the wheel 144, from the wheel 144 to the wheel 143 and from the wheel 143 to the wheel 142. Each of the gear wheels 147b, 147c and 147d which effect rotation of the number-carrying wheels 143, 144 and 145, carries at one side thereof a cam 154 having parts 155, 156, 157 and 158 having different radial heights the steps between these parts being suitably spaced apart in a circumferential direction. The radial height of all the steps is the same but the circumferential distance apart between the steps is determined in accordance with the carry points, in a rotational sense.

In addition to the grooves or guides 110, 111 and 112 which respectively carry the three feeler members 120, 121 and 122, there are provided on the lefthand side of these guide grooves two additional guide grooves 113 and 114 each of which carries a sliding rack member 123 and 124. Neither of these sliding racks can move in the forward direction beyond fixed stops 115 and 116 which determine their zero positions, but they can move rearwardly under certain conditions and function solely for carrying purposes. These racks 123 and 124 move parallel to the sliding feeler members 120, 121 and 122 and all these five sliding members are equally spaced apart across the machine. Projecting upwardly from each of the sliding carry racks and also from the feeler member 122 is an arm 130 whose upper part is bent over laterally so as to overhang the sliding member next adjacent to it on the righthand side (see Figure 15a), and each of these arms has on its upper end a rearwardly directed projection 131 (see Figure 1) so positioned as to bear against the periphery of one of the stepped cams 154 described above.

When the sliding members 122, 123 and 124 are in their initial positions the ends 131 of these upwardly directed arms can just make contact with the radially highest parts 155 of the stepped cams 154 and if then either of these cams is rotationally positioned so as to present this part 155 to the arm end 131, the sliding member which carries that arm can then move no further towards the rear of the machine, that is to say, beyond its normal zero or initial position. If, however, the rotational position of a cam is such as to present to the slide arm a lower part such as 156 of the cam, then if and when that sliding member is by other means to be described permitted further rearward movement, this movement can take place through a distance determined by the total radial depth of the cam face presented to the slide arm. Such rearward movement of a sliding rack beyond its zero or initial position will cause a corresponding rotation of the number-carrying wheel moved thereby which will be the next number-carrying wheel of higher denomination.

The over movement of sliding feeling members beyond their zero positions so as to effect the carry is controlled and permitted in the following manner. The rear ends of all the five sliding members when in their zero or initial positions abut against a plate 132 which can slide in a groove 119 in the part 109 transversely across the rear ends of all the guide grooves (see Figures 9, 9a, 10 and 11). In this plate are three openings 133 each of such dimensions as will permit the free passage therethrough of the end of a feeler slide. The spacing apart of these openings 133 corresponds to the spacing apart of the sliding members. Initially this plate 132 is so positioned that the openings 133 therein do not register with the grooves 112, 113 and 114 in which slide the members 122, 123 and 124 but by suitably operated mechanism and as the sliding feelers are about to move rearwards and rotate the answer-indicating wheels, this plate 132 is caused to slide laterally into a position such that the openings therein register respectively with the three guide grooves 112, 113 and 114. Then if any one of the sliding members 122, 123 and 124 is not stopped in its zero position by its upwardly projecting arm end 131 making contact with the highest part 155 of the cam 154 of the next adjacent gear wheel 147, this sliding rack member can then pass beyond its zero position with its end projecting through an opening 133 in the transverse plate 132, the extent of this movement beyond the zero point being determined by the part of the cam presented to the upwardly projecting arm of this particular rack.

This over movement will impart additional rotation to the corresponding number-indicating wheel to the extent of one or more increments in accordance with the amount of the carry. If this additional rotation of a number-indicating wheel is sufficient to necessitate in turn a carry therefrom into a number-indicating wheel of still higher denomination, the positioning by reason of the additional carry rotation of the cam 154 of the gear wheel 147 of lower denomination will permit the next adjacent rack member to move past its zero point and rotate the number-indicating wheel of next highest denomination to the extent of one or more increments corresponding to the carry.

The movement of the transversely sliding plate 132 which controls the carry is effected by the answer-indicating mechanism in the course of its traversing movement. Conveniently the arrangement is such that when the frame 140 makes its last traversing step to the left, it picks up and moves to the left this plate 132 which then slides against the action of a spring 134. This is effected by means of an arm 159 carrying an adjustable stud 160 which projects rearwardly from the shaft 151 in such a position as to strike the end of the plate 132 and push it towards the left. See Figures 1, 12 and 14. The spring 134 serves to reset the plate 132 into its initial position when, in the process of resetting the whole mechanism, the answer-indicating mechanism is traversed back again to the right into its initial position.

With this arrangement it will be apparent that the carry mechanism cannot be operative until the answer-indicating mechanism has been fully traversed towards the left into its final position. In the case of a sum being performed in the machine in which there is no carry necessary, as for example $7 \times 7 = 49$, then when feeding in the single figure in the second factor it will suffice to depress merely the No. 7 key when the answer will appear correctly. In the case, however, of such a sum as $7 \times 77$, if the feeding in of the figures in the second factor is performed merely by depressing the No. 7 key twice in succession, then the answer as shown will be 439 since the answer-indicating mechanism will not have been fully traversed to the left and thus the carry mechanism will not have been operative. The carry mechanism can be made effective then by depressing the 0 key but the answer that will then actually be shown will appear as 5390 in place of 539. Hence in order to obtain a more correct answer indication with respect to the 0, it is necessary when feeding in the figures in the second factor in such a sum as $7 \times 77$ to deal with these figures actually as $07 \times 077$ so that when feeding in the figures in the second factor the 0 key will be depressed first and this will be followed by depression of the No. 7 key twice in succession. It has been explained already why it is necessary in such a sum as this to deal with the single figure in the first factor as if it were 07. By thus operating the mechanism, the answer-indicating mechanism will have been traversed to its full extent when the last figure in the second factor is fed in and this will ensure the operation of the carry mechanism.

It is to be noted that the answer in such a case will be shown actually as 00539 but it is possible to avoid exhibiting the first of these noughts if the number-carrying wheel 142, which owing to its position, will never actually need to display a 0 is provided with a blank in the position where the 0 should come. The answer to the sum in question may then appear as 0539.

The rotation of each number-carrying wheel is controlled by a coiled spring 161 preferably disposed in a drum 162 carried by the corresponding gear wheel 147 (see Figure 15). Each of these coiled springs tends to rotate the gear wheel 147 and the number-carrying wheel driven thereby in a direction opposite to that in which these wheels are turned when the gear wheel is in engagement with a sliding rack member and the latter is moving towards the zero position, that is towards the rear of the machine. Thus the rotational setting of each number-carrying wheel for the purpose of indicating an answer takes place against the action of its spring 161, these springs subsequently serving to restore the several number wheels to their initial or zero positions when the resetting of the whole mechanism takes place. In order to prevent this resetting action of the springs taking effect on the number-carrying wheels when the answer mechanism is lifted so as to disengage its gear wheels from the sliding racks, a detent 163 is provided for each gear wheel 147 and this detent engages the teeth of this wheel and locks it in the rotational position into which it has been moved by the sliding rack from which it has been disengaged.

Conveniently a single detent 163 serves for all the gear wheels 147 this detent, which is shown in Figures 1, 12 and 14, taking the form of a plate-like member pivoted towards one edge at 164 on the side members of the frame 140 over the shaft 151. The forward edge of the plate 163 is turned down as a flange to form a tooth which owing to the width of the plate will then lie over and near to all the gear wheels 147. The detent 163 is acted on by a spring 165 in such a way as to tend to move the detent towards the gear wheels. When the frame 140 is in its lowered position, that is to say when the gear wheels 147 are in engagement with the racks of the sliding members, the detent is held clear of the gear wheels by reason of an adjustable stud 166 which passes through the detent plate 163 this stud serving as a stop and coming then in contact with a bar 19 which extends transversely across the machine beneath the rear portion of the frame 140. This bar 19 is connected to the resetting mechanism and normally is fixed while the machine is in operation. The arrangement is such that when the frame 140 is lifted to take the gear wheels 147 out of engagement with the racks of the sliding members and before this disengagement is completed, the detent 163 will enter into engagement with the teeth of these gear wheels and retain them all, together with the number-carrying wheels, in the rotational positions into which they have been set. When resetting takes place the frame 140 is raised so as to allow the sliding members to be restored to their initial or zero positions and at the same time by lifting the bar 19 the detent 163 is raised clear of the gear wheels 147 which together with the number-carrying wheels associated therewith are then all rotated to their zero positions by the action of the coiled springs 161.

Pins 167 which project laterally from the gear wheels 147 (see Figures 1 and 15) come into contact with stops 168 which project into the paths of these pins from a transverse member 169 of the frame 140 and thus limit the extent to which rotation of the gear wheels 147 can take place in the resetting direction and determine their zero positions.

There will be described now the means whereby the several feeler or rack-carrying members 120, 121, 122, 123 and 124 are caused to slide either towards the front of the machine, as when feeling stops set up, or towards the rear of the machine, as when rotating the answer-indicating wheels. The means whereby traversing of the answer-indicating mechanism is effected will also be described.

A shaft 38, see Figures 1 and 4, has been referred to in association with the key-actuated mechanism. This shaft extends transversely across the lower part of the machine and carries the forwardly directed spring lever arm 40 through which the shaft 38 can be rocked as and when keys are actuated to feed into the machine figures in the second factor in the sum to be performed. In addition to the spring lever arm 40, this shaft 38 has fixed upon it a forwardly directed lever 170 and two rearwardly directed arms 171 and 172 these latter constituting part of an escapement and being arranged so that their ends lie respectively on opposite sides of, that is above and below, a horizontal shaft 173 which tends to be rotated by a spring contained in a drum 174 suitably arranged towards the righthand end of the shaft 173. The lever arm 170 is connected by a link 175 (Figure 1) with one arm 176 of a two-armed lever pivotally mounted at 177 on one side of the frame plate 104 (see Figures 9 and 10).

The other arm 178 of this lever projects rearwardly and engages with the forked end of the arm 152 which extends towards the front of the machine from the shaft 151 on which is carried the frame 140 of the answer-indicating mechanism (see Figures 1, 12 and 14). These lever mechanisms are so arranged that as the shaft 38 is rocked following key actuation of the universal bar 36, the frame 140 with the answer-indicating mechanism will be raised so as to take the gear wheels 147 out of engagement with the racks of the sliding members. Since it is necessary that the levers 178 and 152 through which is effected the raising of the frame 140 must remain in operative engagement while traversing of the frame 140 takes place and whatever the position into which this frame may move across the sliding rack members, the lever arm 178 is conveniently formed with its end of such breadth, as shown in Figure 9, that the end of this lever will remain in engagement with the forked end of the lever 152 throughout the lateral traversing movements of the frame 140 with the answer-indicating mechanism.

The two escapement arms 171 and 172 are constructed and arranged so that they can engage in turn with a detent 179 carried by and projecting from the spring driven shaft 173. The arrangement is such that when the universal bar 36 is depressed and the rock shaft 38 moved therewith, the upper escapement arm 171 will move into a position clear of the detent 179 so that the shaft 173 can then rotate approximately through 180° when the detent will be engaged by the lower escapement arm 172. The detent will remain in engagement with this part of the escapement until the key that has been depressed is released so as to allow the universal bar to rise and rock the shaft 38 back again.

The detent is then released by the lower escapement arm 172 and the shaft 173 can turn through a further 180° until stopped by the detent engaging once more with the upper arm 171 of the escapement. In order to prevent a too rapid release of the key causing such corresponding rapid movements of the escapement as to prevent the detent being caught and held at least momentarily by the lower escapement arm, it is desirable to provide some device such as the following which will ensure a slight check in the rotation of the spring driven shaft. A spring actuated pawl 180 (Figures 1 and 2) is pivotally mounted adjacent to the end of the lower escapement arm 172 on one of the frame brackets 14 which forms a bearing support for the shaft 173, and this pawl has a lateral pin 181 which can engage a recess 182 in the under side of this escapement arm when the latter has been lifted into the position where it can engage the detent 179 and check the rotation of the shaft 173. When the pin 181 of the pawl 180 is thus in engagement with the escapement arm 172 a part of the pawl projects into the path of the detent 179, so that when the escapement has been actuated and its lower arm 172 lifted, this arm cannot drop back again but will be held in its raised position by the pawl 180, until the detent 179 swings round and strikes the pawl away just as the detent is about to engage the raised escapement arm 172. The latter can only then drop and leave the detent free so as to allow the shaft 173 to complete its rotation. Thus the movement of the escapement 171, 172 is timed in relation to the speed of rotation of the shaft 173 and the latter cannot turn so rapidly as to prevent the proper functioning of the parts actuated by this shaft.

Since this shaft causes the sliding of the feeler members it will be appreciated that unless some such timing device is employed, a too rapid operation of the keys might result in an imperfect feeling of the stops and a failure to ensure the necessary relation between the movements of the sliding racks and the answer-indicating mechanism.

The spring driven shaft 173 is provided with a crank and pin 183 the latter being connected by a link 184 to an arm 190 which projects from a horizontal rock shaft 191 which is carried in bearings by the frame brackets 13. On this shaft 191 are loosely pivoted a series of five levers 192 respectively designated 192a, 192b, 192c, 192d and 192e, which extend upwardly the end of each lever passing through the slot 117 in a guide groove and engaging the opening 125 in one of the sliding rack-carrying members 120, 121, 122, 123 and 124 (see Figures 1 and 2). Rigidly connected to the shaft 191 at each end of the row of loose levers 192 are two pairs of arms 193, 194 and 193a, 194a, the arms 193 and 193a in each pair projecting towards the front and the arms 194 and 194a projecting towards the back of the machine. These two pairs of arms support at their ends two bars 195 and 196 which lie parallel to the axis of the shaft 191 and on opposite sides of the five levers 192. Each of the levers 192 is provided with two laterally projecting pins 197, 198 which are engaged by the forked ends of two rods 199, 200 which extend respectively from the two bars 195, 196. Each of the rods 199, 200 can pass freely through a hole in the bar 195 or 196 which carries it, the outer end of the rod being threaded and provided with a nut and lock nut.

A spring is coiled around each rod with one end abutting against the forked end of the rod while the other end abuts against the bar 195 or 196. This arrangement constitutes such a series of yielding connections between the shaft 191 and the several levers 192 that while the shaft will always be rocked as the spring driven shaft 173 rotates and will then tend to impart corresponding movements to each and all of the levers 192, nevertheless when any one of these levers resists such movement the connection between it and the shaft 191 will yield. By this means when the shaft 191 is oscillated each of the sliding feeler members will be moved forward until checked by the stop that has been set up in its path, the yielding connection between the levers 192 and the shaft 191 permitting all the sliding feelers to be thus positioned against their respective stops. As the shaft 191 rocks back again all the feelers will be returned towards their zero positions. If then the sliding plate 132 which controls the carry is moved so as to permit the sliding rack-carrying members to move past their zero positions, those members will so move to the extent permitted by the stepped cams 154, such movement being due to the springs in the yielding connections between the levers 192 and the shaft 191 which then tend to turn these levers towards the rear of the machine.

On the spring driven shaft 173 is mounted a bevel wheel 210 which gears with a bevel wheel 211 carried on the lower end of an upwardly directed shaft 212. The lower end of this shaft is carried in such a manner by the frame bracket 15 as to allow it to rock to a slight extent when the upper end of the shaft is swung in the fore and aft direction.

Towards its upper end the shaft 212 passes through a bearing block 213 (Figure 9) which can slide in the fore and aft direction in one side of the part 109 of the frame member 104. This bearing block is constantly pressed towards the rear of the machine by a suitably arranged spring 214. On the end of this vertical shaft 212 is a crank and pin 215 (Figure 2) the latter being disposed so as to engage with the teeth of the rack 153 which is carried by the framing 140 of the answer-indicating mechanism, this rack being arranged adjacent to the shaft 151 on which this mechanism turns when raised and lowered. As the shaft 173 rotates under control of the escapement 171, 172, it will rotate the vertical shaft 212 and thereby impart a traversing movement to the answer-indicating mechanism this movement taking place to the extent of one step towards the left of the machine for each complete rotation of the shaft 173.

Thus after the figures in the first factor have been fed in and the universal bar 36 is moved by operation of a key or keys to feed in the figures in the second factor, the answer-indicating mechanism is first lifted out of engagement with the sliding feeler members and the escapement 171, 172 is actuated so as to permit the shaft 173 to be rotated. The rotation of this shaft acting through the levers 192 first causes the sliding in the forward direction of the feeler members and effects simultaneously the traversing to the extent of one step of the answer-indicating mechanism, after the latter has been raised, and then as the escapement moves to permit the shaft 173 to perform the second half of its rotation, the answer-indicating mechanism is lowered and the feeler members are all moved rearwardly towards their zero positions.

Turning now to the resetting mechanism, which is mainly illustrated in Figures 16 and 17, broadly speaking this may be said to comprise a series of cams on a shaft which when rotated by hand or power act on suitably arranged levers or devices which restore to their initial positions various parts which in the process of operating the machine have been caused to assume positions from which they cannot return automatically, as for example by the force of gravity or by springs acting on them directly or indirectly. Rotation of the cam-shaft also effects the winding up of the spring in the drum 174 by means of which rotation is imparted to the shaft 173.

The shaft 220 which carries these cams extends transversely across the machine being carried by the frame brackets 13 and disposed preferably in some suitable position above the shaft 173. The shaft 220 carries three cams 221, 222 and 223 and a gear wheel 224 the latter meshing with a suitably arranged wheel 225 of convenient size which in turn gears with a pinion 226 carried by the drum 176 containing the coiled spring whose inner end is attached to the shaft 173 controlled by the escapement. The outer end of this spring is attached to the drum and the arrangement is such that the spring can be wound up by rotating the drum. The cam shaft 220 is locked after resetting has been effected by means of a spring-controlled detent 227 which conveniently engages the teeth of the wheel 224. One of the arms 37 of the universal bar 36 is provided with an extension 43 having a finger 44 projecting therefrom and directed towards the periphery of a disc 228 mounted on the shaft 220. When this disc 228 and the shaft 220 have assumed that rotational position into which the shaft must be turned in order to complete the resetting process, the finger 44 lies opposite to and can enter a radial recess 229 formed in the disc 228 so that the universal bar 36 can then be depressed freely.

If, however, the cam shaft 220 has not been fully rotated in the resetting process, some portion of the periphery of the disc 228 will lie opposite to the finger 44 and thereby movement of the universal bar 36 will be prevented. This in turn will prevent the depression of a key and thus it will be impossible to operate the machine until the resetting has been completed and the cam shaft 220 turned into the necessary position. If desired and in order to balance the parts each lever arm 37 of the universal bar 36 may be provided with a similar extension 43, 44 which co-operates with a second disc such as 228, the two discs being positioned towards the opposite ends of the shaft 220.

Preferably the resetting of all parts of the mechanism can be effected by turning the cam shaft 220 once through 360°. It is desirable to provide some visible indication of the rotational position of the cam shaft or some mechanically and automatically operating device may be provided whereby it will be impossible to turn the shaft in the process of resetting beyond that point at which it must remain when the machine is being operated.

Of the three cams on the shaft 220, the first 221, which is situated towards the righthand end of this shaft, serves to effect the resetting of the key rods 22 and the sliding bars 66 by means of which are swung the vertical rods 70 in the selector. This cam 221 acts on a lever 230 extending rearwardly from a shaft 231 carried in suitable bearings at the ends of the plate 63 which lies across the front of the lower part of the selector mechanism (see Figure 3).

Two arms 232 projecting downward from the ends of this shaft 231 carry a bar 233 running horizontally across the front of the selector and positioned opposite to the front ends of the sliding bars 66. When the cam 221 acts on this lever 230, the bar 233 will push back all those slides 66 which have been caused to move forwards in the process of selection, thus swinging back again the sets of rods 70 controlled by these slides so that the lower ends of all these rods are once more positioned where their ends cannot be acted on by the selector knives 80 when the latter are raised. The lever 230 is provided with a third and forwardly directed arm 234 connected by a link 235 to one arm 236 of a bell crank lever pivoted at 237 on the frame member 12, the bell crank lever being movable in a plane at right angles to the plane in which lies the cam-actuated lever 230. When this lever 230 is moved by the cam 221, the second arm 238 of the bell crank lever will come into contact with the righthand end of the sliding bar 24 by means of which the key rods 22 are swung. By this means this bar 24 will be pushed back across the machine towards the left thus swinging the key rods until their lower ends 23 are positioned respectively over the corresponding ends of the first set of key-actuated levers 51a. The sector-shaped stepped plate 25 which controls the positioning of the sliding bar 24 will then drop back into its initial position and the bar 24 will be retained thereby in its reset position. The resetting of this sliding bar 24 will have taken the spring lever arm 40 out of engagement with the recess 42 in the lefthand end of the universal bar 36 thus leaving the latter free to be moved, as a result of key actuation, without imparting movement to the escapement mechanism, until the operation of the mechanism has arrived at a stage when feeding in of the figures in the second factor is commenced.

The second cam 222 serves to effect the resetting of the sliding rack-carrying members in the following manner. A lever 239 on which the cam acts is pivoted loosely on the transverse shaft 191 which carries the upwardly extending levers 192 whose movement causes the sliding of the rack-carrying members. This lever 239 has a part which extends first rearwardly as at 240, then horizontally as at 241 and parallel to the shaft, and finally as at 242 back again to the shaft 191 thus forming a U-shaped member of which the two arms 240 and 242 lie respectively on either side of the set of the upwardly directed levers 192. The bar 241 which forms the central and horizontal part of this U-shaped member is so positioned that when the cam 222 is rotated and moves the lever 239, this bar 241 will be raised and brought into contact with any of the levers 192 which, as a result of a carry having taken place, have moved towards the rear of the machine together with the sliding racks. These levers 192 together with the sliding racks associated with them are in this way moved forward again to an extent sufficient to allow the transversely sliding plate 132 which controls the carry to be moved by the spring 134 acting thereon back into its initial position. All the sliding rack members are thus brought back into their zero positions. While the levers 192 are being restored to their initial positions in this manner, it is desirable to lock the detent arm 179 on which the escapement acts. This locking is performed by providing the lever 239 with a downwardly directed arm or tail 243 which when this lever is moved by the action of the cam is brought against the detent arm 179 on the spring driven shaft 173.

The central bar 241 of the U-shaped member may be notched or recessed in one or more places as at 244 as necessary to provide the clearance that may be required for the levers 192 on which this bar acts so that these levers can move freely towards the rear of the machine to the full extent that may be required when a carry is being fed into the answer-indicating mechanism.

The third cam 223 which is situated conveniently somewhat towards the lefthand end of the cam shaft 220 serves to effect the resetting of the answer-indicating mechanism. This cam acts on a lever 245 which extends downwardly from and is carried loosely on the shaft 151 on which the answer-indicating mechanism is carried. As described above this mechanism is conveniently fixed on this shaft which therefore moves in the direction of its axis through its bearings as the answer-indicating mechanism is traversed but the cam-actuated lever 245 is arranged so that it will not traverse with the spindle on which it turns. This is effected as shown in Figure 16 by providing a rectangular frame comprising two end plates 246 one of which forms part of the lever 245. These end plates 246 are both mounted so as to turn freely on the shaft 151 but they lie respectively adjacent to and on the outside of the laterally disposed bearings 118 of this shaft. The end plates 246 each comprise two arms these arms being connected in pairs by transversely extending bars 19 and 247. The bar 19 runs across the under side of the framing 140 of the answer-indicating mechanism and when the cam 223 moves the lever 245 the bar 19 will come against the framing 140 and lift the answer-indicating mechanism. At the same time the bar acts on and lifts the detent 163 out of engagement with the gear wheels 147. As a result of this and in the manner described the wheels 147 are free to be rotated by the coiled springs acting thereon thus restoring all the number-carrying wheels to their zero positions.

The second horizontal bar 247 lies below the rear part 109 of the feeler guide plate 104 and carries a forwardly directed arm 248 with forked end 249 adapted to engage the upper part of the vertical shaft 212 whose rotation causes traversing of the answer-indicating mechanism. When movement of the lever 245 brings the forked end 249 of the arm 248 into contact with the shaft 212, the upper part of the latter is swung forwardly thereby lifting the crank pin 215 carried by this shaft out of engagement with the rack 153 on the frame 140 of the answer-indicating mechanism. The latter is thus left free to be traversed back again from left to right by the action of a flat spring arm 250 which is disposed at the left-hand side of the machine and bears against the end of the shaft 151 of the answer-indicating mechanism.

Thus as the cam shaft 220 is rotated for the purpose of resetting the mechanism, the parts associated with the key-actuated selector mechanism are reset by the action of the first cam 221 and practically simultaneously the answer-indicating mechanism is reset by the action of the third cam 223. When in this resetting process the gear wheels 147 of the answer-indicating mechanism have been lifted clear of the sliding racks the second cam 222 effects the resetting of these sliding racks. As mentioned, during rotation of this cam shaft 220 and until it is once more in its initial rotational position, it is not possible to operate the keys.

While the complete machine, of which the structure is described above by way of example, is designed more especially for dealing with two figures in the first factor and three figures in the second factor in the sums to be performed therein, this machine may be arranged, broadly speaking, without material modification, to have a larger capacity more particularly with respect to the number of figures in the second factor. As has been mentioned, any increase in the number of figures in the first factor, however, necessitates primarily an increase in the number of sections in the selector mechanism and a corresponding set of key-actuated levers must be provided for each such additional section of the selector. The employment of additional sections in the selector mechanism necessitates corresponding additional sets of stops and sliding members for feeling these stops, while the number of gear wheels and associated number-carrying wheels in the answer-indicating mechanism must naturally be increased in a similar way and with relation to the maximum number of figures that can appear in any answer to a sum performed in the machine. If the capacity of the machine is to be increased merely with respect to the number of figures in the second factor, then the principal modification necessary in such a structure as that described above is in respect of the answer-indicating mechanism, in that sufficient gear wheels and associated number-carrying wheels must be provided to deal with the maximum number of figures that can appear in any answer. Additional sliding rack members are also required for the purpose of effecting the carrys.

If it is desired to increase materially the capacity of the machine with respect to the number of figures in the first factor which can be dealt with, difficulty may arise with respect to the structure and disposition of the key-actuated levers and the means by which the relation between each key and its corresponding lever in each of the sets of these levers is varied, if mechanism such as above described by way of example is employed for this part of the apparatus. Hence this portion of the mechanism is preferably varied somewhat in the case of a machine of greater capacity and in such a machine it is convenient also to modify somewhat the answer-indicating mechanism and the means by which the partial products are fed into this mechanism. One way in which these modifications may be carried into effect in the structure of a machine having for instance a capacity such that it may deal with five figures in the first factor and at least five figures in the second factor will now be described by way of example with reference to Figures 19 to 43. It is to be understood, however, that these modified structures either as a whole or in part may be utilized equally in a machine having a smaller capacity, these alternative mechanisms being then substituted for the corresponding mechanisms as described above.

From what has been stated previously, it will be understood that in this machine of larger capacity the number of sections in the selector must be increased in accordance with the number of figures in the first factor. If, as indicated, the number of these first factor figures is five, then it is necessary that there shall be five sections in the selector. These sections are all substantially alike, as described previously, the five sections of the selector being conveniently disposed side by side across the machine and above the knives 80.

There is a single set of these knives extending transversely across the machine and as in the machine structure previously described these knives when raised can act simultaneously on the ends of rods 70 in any or all of the selector sections that may have been swung in the process of partial selection due to the actuation of keys when feeding in the figures in the first factor of the sum.

It may be noted in this form of the machine that owing to the structural modifications described hereinafter it is not necessary to provide, as in the machine described above, a No. 0 key with corresponding key-actuated levers, and consequently there are only nine knives 80, nine rods 70 in each of the sets in a selector section and only nine of these sets of rods in each selector section with a corresponding number of sliding bars 66 for swinging these sets of rods.

Dealing first with that modified part of the mechanism which relates to the selection and setting up of the stops as a result of key actuation, it may be stated at the outset that the main difference between the mechanism employed for this purpose as above described and that set out hereunder is comprised in the means whereby the operative relation between each key and the key-actuated members forming the group associated with that key can be altered, so that the selector-actuating members will be operated in different sets in succession as and when successive key operation takes place. In the mechanism above described each key acts on a single rod 22 the lower end 23 of which is swung so as to bring it successively into register with the ends of levers 51a, 51b and 54 grouped together for this purpose.

In the modified form of this mechanism, each of these levers is acted on by a separate rod whose lower end is always in operative connection with the lever while the upper ends of all these rods are grouped so that all the rods in each group can be swung into a position such that they can be severally and successively acted on by one and the same key. Thus instead of the levers themselves having to be bent laterally so as to effect the necessary grouping of their ends in relation to single key rods, the levers themselves can be arranged in a comparatively simple manner while the key rods, through which only a direct thrust has to be transmitted, are bent or inclined as necessary in order to effect the desired grouping of the upper ends of these rods in relation to the keys. In the structure previously described the swinging of the key rods took place transversely across the front of the machine, but in the modified arrangement the grouped upper ends of these rods are conveniently swung in a front to back direction in the machine.

It is to be noted with this modified arrangement of key rods, that instead of using rod-like structures for transmitting the thrust from a key to the end of a selector-actuating lever, it becomes possible to employ some other device capable of functioning in a similar manner. For example, in place of each rigid key rod there may be used a flexible wire sliding within a tube constituting a guide therefor or within a coiled wire forming such a guide after the manner of the well-known Bowden wire device. Again, hydraulic or pneumatic devices may be used as for instance a tube filled with liquid and carrying a plunger at each end arranged so that when the plunger at the upper end is pushed in as a result of depressing a key, the plunger at the lower end of the tube will move correspondingly downwards and will impart the necessary movement to a lever with which it is connected.

Yet again, electrical means may be used to transmit the key movements to the several levers. Whatever device of the type or nature above indicated is utilized for transmitting key movements to the levers, substantially the same grouping of the transmission devices with relation to the several keys may be employed, and also substantially similar means may be utilized for bringing the individual transmission devices in the groups successively into operative relation with the single key with which each of such groups is associated.

The following is an instance of mechanism that may be used for the purpose indicated this mechanism embodying a series of key rods each of which has its lower end connected to a selector-actuating lever while the upper ends of these rods are grouped in relation to the keys.

In this construction each key is provided on its under side with a downwardly directed projecting member formed conveniently as a flat strip 21a the end of which is cut square and lies horizontally with the width of the strip disposed across the front of the machine. The upper ends of the key rods when swung are adapted to register in succession with this key strip 21a so that when the key is depressed the end of the strip will bear on the upper end of a key rod and enable the latter to be pushed downwards.

For convenience in the description of this modified structure it will be desirable to adopt the same method of designating the parts of the selector as was employed in connection with the machine described above and therefore the five parts of this mechanism will be referred to as the A, B, C, D and E sections as indicated in Figure 26.

Each section comprises two groups of horizontally disposed plate-like levers 90 arranged and functioning in substantially the same manner as already described. The lowermost of these groups in each section of the selector are designated respectively 90a, 90b, 90c, 90d and 90e, while the corresponding upper groups of plate-like levers 90 are designated 90aa, 90bb, 90cc, 90dd and 90ee. Since in this form of the machine there is a separate set of key rods corresponding to each section of the selector and through which partial selection in that section of the selector is effected as and when keys are depressed, it will be convenient to designate in the following manner the several sets of key rods together with the sets of levers on which these rods act (see Figures 22, 23 and 29). The set of rods 22a comprises those which acting through the set of levers 51a function in the A section of the selector. Similarly, the set of rods 22b acting through the set of levers 51b function in the B section of the selector. The set of rods 22c acting through the set of levers 51c function in the C section of the selector. The set of rods 22d acting through the set of levers 51d function in the D section of the selector, and finally the set of rods 22e acting through the set of levers 51e are those which function in the E section of the selector. In addition to these five sets of key rods, there is an additional set of key rods 22f which acting through levers 54f serve solely to effect the lifting of the knives 80, thereby completing the selection in all the selector sections simultaneously.

Each of the key-actuated levers has two arms 51 and 52 (see Figures 20 and 21) of which one 52 extends upwards from the horizontal transverse shaft 50 on which all these levers are pivoted and is adapted to engage the rear end of a sliding bar 66. The other lever arm 51 extends forwards into a position such that its end lies in the lower part of the front of the machine. A key rod runs upwardly from the forward end of each of these levers, the lower end of this rod either merely bearing on its lever 51 or being pivotally connected thereto as desired. The lower parts of all the key rods are guided in and can slide freely through a fixed plate 20 and are arranged as mentioned in sets corresponding to the sets of levers 51 on which they act. Conveniently the holes through which the lower ends of these rods pass in this guide plate, when viewed in plan, as in Figure 29, present the appearance of a series of rows of holes all the rows lying parallel but spaced apart and all being slightly inclined to the front and back edges of the plate in which the holes are formed, this plate extending transversely across the front of the machine. As they run upwards from this fixed guide plate the rods are splayed apart across the front of the machine, as shown in Figure 22, the rods being individually bent in a suitable manner to effect this. The grouped upper ends of all the rods, however, are again bent so as to run vertically through an upper guide plate 24a.

There are nine key rods in each set having the values 1 to 9 inclusive and one rod from each set is arranged as to its upper end so that this end lies adjacent to a key strip 21a having the corresponding number. Thus, if, as mentioned, there are five sections A, B, C, D and E in the selector as in the modified construction of machine now under consideration, there will be five sets of nine levers 51a, 51b, 51c, 51d and 51e (Figure 23) and five corresponding sets of key rods 22a, 22b, 22c, 22d and 22e (Figure 22) extending upwards from the ends of these levers. The upper ends of all those key rods with number values 1 are brought and grouped together in positions below and adjacent to the key strip 21a which extends downwardly from the No. 1 key, so that if the ends of the rods thus grouped are swung relatively to the key, the latter can act in succession on each of these rods and thereby actuate the No. 1 lever in each of the selector sections in succession. The upper ends of the key rods are so grouped where they pass through the upper guide plate 24a that when viewed from the front of the machine, Figure 22, the upper parts of the five rods in a group lie substantially one behind the other. On the other hand, when viewed from the side of the machine, Figures 19, 20 and 21, the rods appear to spread from the lower guide plate 20 upwards somewhat as the sticks of a fan. Thus if the upper guide plate 24a is moved from the front towards the back of the machine the upper ends of the rods in each group will be swung and brought in succession into register with the lower end of the corresponding key strip 21a.

The levers 54f by means of which the knives 80 are raised are arranged preferably centrally with respect to the whole machine as viewed from the front (Figure 23) and the forward ends of these levers are carried towards the front of the machine (Figures 20 and 21) and from the end of each of these levers a key rod 22f runs upwards through a hole in the guide plate 20. The key rods 22f are spread out with respect to their upper ends in the same way as the other key rods described above, see Figure 22, the upper end of each of the rods 22f after passing through the plate 24a being positioned below and adjacent to a key strip 21a with corresponding number value. Thus each group composed of the upper ends of key rods after passing through the plate 24a comprises five rods through which the vertical rods 70 in the several corresponding selector sections can be swung, and one rod 22f through which a knife 80 can be raised. Since all these rods are guided as to their upper parts in the same plate 24a they can be swung similarly and simultaneously with respect to the several keys.

As mentioned, there are nine knives 80 respectively actuated by the nine key rods 22f acting through the levers 54f. Conveniently in this construction the knife-operating levers 54f are pivoted on the same shaft 50 on which are pivoted the levers 51 (Figures 20 and 21). Each lever 54f has a second short arm 55f the rounded end of which bears against the under side of a lever 56 pivoted on a short shaft 57 which lies behind the centre part of the selector mechanism (see Figure 23.) All these levers 56 extend forwardly and have upward turned ends the lengths of the levers differing and being such that the end of each lever lies below the centre portion of a knife 80.

Each knife 80 is carried by a linkage adapted to cause the knife when raised to move always into positions parallel to itself, that is to say, the upper edge of the knife will be always horizontal so as to act simultaneously on the lower ends of all those rods 70 which have been swung into its path. A convenient mounting for the knives is that shown in Figures 22 and 26. Each knife is pivotally connected at or towards its opposite ends to links 84 each of which is pivoted on a fixed stud 85 and provided with a downwardly directed tail 86. The ends of the tails 86 of a pair of these links 84 engage in holes in a horizontal bar 87 which is mounted so that it can slide freely in the direction of its length. These connecting bars 87 conveniently rest and slide in two similarly notched plates 88 which project upwards from some convenient part of the base of the machine, see Figures 20, 22 and 26.

The sliding of the plate 24a by means of which the upper ends of the key rods are swung relatively to the key strips 21a is controlled by mechanism which, though in its details necessarily somewhat different, yet in its main features is substantially the same as that by means of which the corresponding swinging of the key rods is controlled by the transverse sliding of the bar 24 in the structure of machine first described above. In this instance, however, as has been pointed out, the plate in question slides in a front to back direction relatively to the whole machine.

The sliding plate 24a, see Figure 19, has pivoted thereto at one end a sector-shaped plate 251 with a stepped peripheral portion which co-operates with a stop and pawl in a manner similar to the stepped sector-shaped plate 25 and pawl 34 which control the step-by-step transverse sliding of the bar 24 in the form of the machine first described above. In this case the sector-shaped plate 251 is pivoted at 252 on the righthand end of the sliding plate 24a the plate 251 extending rearwardly and having its rearward edge stepped as at 253. If desired the plate 24a may have two similar stepped sector-shaped plates 251 mounted respectively at the opposite ends thereof, corresponding pawl devices and mechanism being then arranged at each side of the machine to co-operate with the two pivoted plates. Adjacent to and below the keys 21 is a universal bar 254 carried at its ends by lever arms 255 pivoted at 256. This universal bar 254 is to be distinguished from the main universal bar 36 which lies in the lower part of the apparatus, see Figure 20, and is acted on by the levers 54f when any one of the key rods 22f is pushed down. This main universal bar 36 is carried by arms 37 on the transverse shaft 38 and it controls the escapement 171 and 172 as in the construction of machine first described. On the other hand the universal bar 254 effects through pawl mechanism the movements of the sector-shaped plate 251 and thus controls the sliding of the plate 24a and the swinging of the key rods.

From one of the arms 255 which carries the universal bar 254 a link 257 extends downwards and is connected to the free end of a lever 258 pivoted at 259. This lever has pivoted thereto an upwardly directed spring-controlled pawl 260 whose nose is adapted to bear against the lower and horizontal or downwardly directed faces of the steps 253 in the plate 251. The arrangement is such that whenever a number key 21 is depressed the bar 254 is caused to descend carrying with it the pawl 260 which then slips off the one step into a position such that its nose is presented against the horizontal face of the next step 253 in the plate 251. When the key is released the universal bar 254 rises owing to the action of a spring and the pawl 260 pushes up the sector plate lifting the vertical face of one step off the end of a stop member 261, thereby permitting the guide plate 24a to move to the extent of one step towards the rear of the machine and swing the upper ends of the key rods so that the second rod in each group registers with a key strip 21a. The resetting of the mechanism is effected through a cam 262 (see Figure 20) acting on a lever 263 fixed on a transverse shaft 264 (see Figure 22) from which extend upwardly two levers 265. The ends of these levers engage the plate 24a and when moved by rotation of the cam the levers 265 push forward the plate until it has reached its limit position. The sector-shaped plate 251 will then drop and hold the plate 24a in its initial position. The shaft 264 is acted on by a spring 266 (Figure 19) which tends to turn the shaft and through the levers 265 move the plate 24a towards the rear.

In this form of the machine there is a special key 21x marked, for example, with the multiplying sign and this key when depressed does not act on the universal bar 254 but its function is to move downwards the stop member 261 against which the sector-shaped plate 251 bears so that the guide plate 24a with the key rods can move rearwardly into its extreme position thus bringing into register with the several numbered keys the key rods 22f which raise the knives 80. The stop member 261 is mounted so that it can slide vertically on some part of the framing of the machine for example the front plate 61 of the casing enclosing the upper part of the selector mechanism, see Figure 19. The key 21x is placed at the righthand end of the bank of keys (Figure 22) where it lies above the mechanism which controls the sector plate 251. From the key 21x extends downwards an arm 267 having at its end a lateral pin 268 which engages a slot in one end of a link 269 whose other end is pivotally connected at 270 to the sliding stop member 261. Thus depression of the key 21x will push down the stop member 261 releasing the plate 24a so that it can slide rearwardly into its limit position when the key rods will be swung so as to position the key rods 22f where they will be acted on by the keys 21. When the key 21x is released it will be raised together with the stop member 261 by spring action. By means of this key 21x if in the first factor of the sum to be performed there are less than the maximum number of five figures, then after the necessary figures have been fed into the machine, the special "x" key is depressed and the mechanism is forthwith set for feeding in the figures in the second factor. By suitable modification of the answer-indicating mechanism this arrangement enables an answer, in which there are a less number of figures than the maximum number possible, to be indicated without one or more naughts appearing to the left of the figures in the answer.

In this construction of the machine the disposition of the stops which can be selected and set up and the feeling mechanism is conveniently modified in the following manner. The stops are formed as vertically sliding pins (Figure 31) arranged in sets each set forming a row extending in a direction from front to back of the machine (Figure 29). All these rows of stops 300, 301, 302, 303, 304, 305, 306, 307, 308, and 309 are parallel and the individual stops, which are here all equally spaced apart, are guided in a horizontal plate member 271 arranged above the selector mechanism. In this machine which, as mentioned, is capable of dealing with five figures in each factor, there are ten rows of stops (Figure 29). The stops are arranged so that when pushed up their upper ends will project into the paths of feeler members which can slide in six longitudinal grooves, 272, 273, 274, 275, 276 and 277 (Figures 26 and 29) which run from front to back in the upper surface of the plate 271. The two rows 300 and 309 which lie respectively furthest to the right and to the left of the machine are arranged in the guide grooves 272 and 277 and the stops in these rows are felt respectively and directly by arms 310 and 315 each of which extends in a substantially horizontal direction towards the front of the machine from a lug 278 (Figure 20) to which the arm is pivotally connected, this lug projecting downwardly from a corresponding sliding rack member. There are four other similarly arranged feeler rods 311, 312, 313 and 314, each of which functions to feel stops in the two rows whose ends can be caused to project into one of the grooves 273, 274, 275 and 276. Each lug 278 to which a feeler rod is coupled is in turn connected by a link 279 to the upper end of one of the levers 192 by means of which feeling movement is imparted to the rods 310, 311, 312, 313, 314 and 315 and sliding of the rack members associated with these rods is caused.

All the six rack members 280, 281, 282, 283, 284 and 285 to which the feeler rods are connected are carried and guided in grooves 286 in a plate 287 disposed somewhat towards the back and upper portion of the machine and below the answer-indicating mechanism (see Figures 24, 27 and 28). All the sliding rack plates lie and move parallel, the two outermost of these rack plates 280 and 285 being arranged as mentioned so that each can feel directly by the rods 310 and 315 the stops set up in the lateral rows 300 and 309. The other four rack plates 281, 282, 283, 284 are similarly provided with forwardly directed feeling arms 311, 312, 313 and 314 each of which, however, serves as mentioned to feel the stops set up in two rows of stops. Each of these four feeler arms co-operates in the feeling process with a member 288 which can slide in one of the broader guide grooves 273, 274, 275, 276. As viewed in plan, Figures 32 and 32a, each sliding member 288 comprises a central and relatively narrow longitudinal part 289 connecting two transverse end portions 290 and 291 of which the former extends for the full width of the guide groove.

Through an opening at one side of the rear part 291 passes the end of the feeler rod such as 311. At one side of the central part 289 of the sliding member 288 is an elongated rectangular recess 292 which faces and is closed in by the one side wall 273a of the guide groove 273. The recess 292 and this wall 273a of the groove thus form a slot whose length is somewhat greater than the length of the row of stops 301 which lies adjacent to that side wall of the guide groove. The width of the recess 292 and the normal position of the sliding member 288 are such that when any one of the stops 301 in this row is set up, it will project into the recess so that when the member 288 is caused to slide in the forward direction its rear end part 291 will abut against this stop and limit the sliding movement of the member. The opposite side of the central part 289 of the sliding member 288 is formed with a series of teeth 293 directed towards the second row of stops 302 which lies adjacent to the other side wall 273b of the guide groove. Each feeler rod as 311 which co-operates with one of these sliding members 288 has its end inclined laterally as at 316 and provided with a bevelled face thus adapting it to engage any one of the teeth 293.

It may be remarked that in Figure 32 there are shown by way of example the two guide grooves 272 and 273 the former having in it the single row of stops 300 while in the groove 273 are the two rows of stops 301 and 302. The feeler rods 310 and 311 are those which are associated with these rows of stops. The sliding feeler members 288 in the other grooves 274, 275 and 276 are similar and function in a similar manner. Figure 32a shows also by way of example the same groove 273 and associated parts, certain portions of the mechanism being here removed and some of the stops omitted for the sake of clearness.

Assuming that stops have been set up in the two rows 301 and 302 then when the rack member with the feeler rod 311 is moved forwards the bevelled end 316 of the feeler rod will come in contact first with the stop set up in the row 302 and this will cause the end of the feeler rod to be deflected laterally so as to make the end 316 of this rod engage with one of the teeth 293 in the sliding member 288. It will be noted that these teeth correspond in their spacing apart to the stops in the row 302 opposite to the teeth so that when the end of the feeler rod is deflected laterally by any stop it will enter into engagement with the corresponding tooth 293. The position assumed by the feeler rod 311 when deflected and the manner in which its end engages with a tooth in the sliding member 288 is indicated in dotted lines in Figure 32a. In the latter figure it is assumed that the first stop at the rearward end of the row 302 has been set up, thereby causing the end 316 of the feeler rod 311 to enter into engagement with the first tooth in the sliding member 288, while in Figure 32 it is assumed that the third stop in this row has been set up causing the end of the feeler rod to enter into engagement with the third tooth of the member 288.

As the sliding movement of the feeder rod 311 continues towards the front of the machine, it will now carry with it the sliding member 288 until the inner face of the end part 291 of this member which forms the end of the lateral recess 292 abuts against the stop which has been set up in the row 301. In this way the sliding rack to which this feeler member is connected will be positioned in accordance with the combined number values of the two stops which have been set up and respectively felt in the rows 301 and 302. By this means the digits in two partial products resulting from the performance of a simple sum are added together in the same way as this operation is performed in the mechanism previously described where the sliding feeling member is provided with a swinging bar the end portions of which make contact with stops set up in two separate rows.

Since in this form of the machine no 0 stop is provided in the rows of stops as in the previously described construction and since all the levers 192 tend to move the sliding racks and feeler rods after stops have been set up, it is necessary to arrange some device which will act in effect as a 0 stop with respect to each row of stops and check the feeling movement of any feeler rod and rack member when no stop having a number value has been set up in a row felt thereby. Devices which serve for this purpose are illustrated in the detail views Figures 33 and 34 which show respectively in plan and end view a portion of the plate 271, certain parts being omitted for the sake of clearness. A series of hinged flaps are employed a separate flap being arranged with respect to each row of stops, certain of the flaps differing slightly in form and disposition though all of them in their main features function in a similar manner.

It will be convenient to describe primarily the flap device which cooperates with the row of stops 302. This flap comprises a main part 294 with one edge 295 rounded and resting in a semi-circular groove formed in the surface of the plate 271. A coiled spring 296 is arranged above this flap and the adjacent flap which is associated with the row of stops 303 in the next groove 274, the spring being carried in some convenient manner as by a horizontal pin connected to the plate 271 so that the spring holds the hinged edges of the flaps in place and also tends to move each flap downwards. The free edge of each flap is turned downwards as at 297 so that when the flap is down this part will lie in the groove 273 over the ends of all the stops 302. The end of the turned-down portion 297 of the flap will then present to the end of the feeler rod 311 when the latter is moved forward such a fixed obstruction as will prevent this rod from moving forward directly in certain cases as for instance in the case of the feeler rod 310 which feels directly the stops in the row 300 (see Figure 32) the end of this rod then butts up against the end of the flap. Forward movement of the rack connected to the feeler rod will then be prevented and no resultant rotation of the corresponding wheel of the answer mechanism will result. If, however, a stop say in the row 302 is pushed up, the end of this stop will lift the flap 294 in the manner indicated in Figure 34 and thus the obstruction will be removed and when the feeler rod 311 moves forward its end can make contact with and be deflected by the stop that has been set up.

Since it may happen that while no stop is set up in the row 302 there may be a stop which must be felt set up in the row 301, it is necessary to arrange that while the flap 294 whose end lies over the row of stops 302 can prevent any feeling movement by the rod 311 with respect to the row of stops 302, yet this feeler rod may be deflected so that its end may engage with the teeth 293 of the sliding member 288 and move the latter so as to feel the stop that has been set up in the row 301. To effect this the forward corner 298 of the flap which lies over the row of stops 302 is rounded off and there is a recess 293a before the first tooth 293 in the member 288 so that when the bevelled end 316 of the feeler rod 311 meets this corner 298 of the flap, the feeler rod will be deflected and its end will enter into the recess 293a. If no stop has been pushed up in the row 301, the turned-down end of the flap which lies over this row of stops will fill the recess 292 at the side of the sliding member 288 and effectually prevent the feeler rod from moving this sliding member. On the other hand, if a stop in the row 301 has been pushed up thereby raising the flap over it, then the feeler rod 311 can slide the member 288 into the position determined by the stop set up. The manner in which the end of the feeler rod 311 is thus deflected by the corner 298 of the flap 294 is indicated in Figure 32. In Figure 33 is shown the way in which those edges of the flaps which constitute hinges are arranged with respect to adjacent or overlapping flaps. Thus it will be seen that the flap 299 which cooperates with the row of stops 300 lies beneath the flap 294a which cooperates with the row of stops 301.

Whereas in the construction described previously the feeling of the stops set up was effected first and then the gear wheels of the answer-indicating mechanism were brought into engagement with the feeler racks when the latter, as they moved back towards their zero positions, rotated the gear wheels and number-carrying wheels of the answer-indicating mechanism, on the other hand the present modified construction is so arranged that the gear wheels of the answer-indicating mechanism are in their lower position meshing with the feeler racks and are rotated as these racks move forward during the stop-feeling process, but when this forward movement and the stop feeling is completed, the answer-indicating mechanism is then raised so as to disengage the gear wheels from the racks leaving the latter free to return to their zero positions. In this modified arrangement the sliding racks cannot move past their zero positions nor are separate sliding racks provided for the purpose of effecting the carry, but the carry mechanism is embodied in the answer-indicating mechanism which as a whole can be raised and lowered, the carry operation however being controlled by means of stepped cams associated respectively with the gear wheels of this mechanism. It follows in effect that whereas in the previously described construction the answer was displayed when the mechanism was in the lowered position, on the other hand in the modified construction the answer is not displayed until the answer-indicating mechanism has been raised, the lifting of the mechanism bringing the number-carrying wheels into the necessary position opposite the window 17 through which the answer is viewed. Associated with this window is a sliding screen 317 (Figures 19 and 25) the movement of which is so co-ordinated to the traversing movement of the answer-indicating mechanism and the operation of other parts of the apparatus, that only those number-carrying wheels can be viewed which have been set to show the total number of figures comprised in the answer.

The answer-indicating mechanism in its modified form which is shown more particularly in Figures 35, 36, 37 and 38, may be arranged and may operate as follows. In its fundamental features it resembles the answer-indicating mechanism already described, that is to say, the mechanism is mounted in a framing 140 carried on a horizontal shaft 151a about whose axis the whole mechanism can turn as it is raised or lowered. In this case it is convenient for the mechanism to be traversed on the shaft 151a which is fixed.

The traversing is effected by mechanism which in its main features is substantially the same as that described already, that is to say, there is a spring-driven shaft 173 controlled by an escapement 171, 172 actuated by the main universal bar 36. When the figures in the second factor in the sum are being fed into the machine, intermittent rotation is imparted from the shaft 173 to the vertical shaft 212 which has at its upper end a crank pin 215 adapted to engage with a horizontal and transversely arranged rack 153 carried by the framing answer-indicating mechanism. Thus this mechanism can be traversed step by step from right to left as viewed from the front of the machine.

The answer-indicating mechanism comprises a series of ten number-carrying wheels 318 all mounted loosely on a horizontal shaft 319. Each of these wheels is provided with a pinion 320 which meshes with a gear wheel 321, all these gear wheels which are individually designated 321a, 321b . . . 321k being mounted loosely on a shaft 322 carried in the framing 140. The gear wheels 321 are spaced apart in accordance with the spacing apart of the sliding racks 280, 281, 282, 283, 284, 285 with which individual gear wheels can engage when the mechanism is lowered.

In this construction the gear wheels 321 are not individually spring driven but can be rotated freely and when resetting occurs all these wheels are turned back again to their zero positions, the construction being such that in no case can any one gear wheel make more than one complete revolution in the process of feeding a partial product into the mechanism though in making such a revolution the gear wheel will cause its number wheel to make several revolutions. Each of the gear wheels except the first 321a and the last 321k in the series carries a stepped cam 323 which determines the amount of the carry in accordance with the rotational position which the gear wheel is caused to assume as the corresponding feeder rack slides into the position determined by the stops set up. The gear wheels 321 are not actually mounted directly on the shaft 322 but each gear wheel can rotate freely on a short sleeve 324 and these sleeves are threaded on to the shaft 322 to which they are all connected by splines, keyways and keys and feathers or like devices so that when the shaft is rotated, as is done in the process of resetting the mechanism, the sleeves 324 will be turned with the shaft. Each gear wheel has at one side thereof a projecting stud 325 and its corresponding sleeve 324 carries a radial arm 326 adapted to engage this stud so that when the shaft 322 with the sleeves is rotated all the sleeve arms 326 will pick up the corresponding gear wheels and turn them and their number wheels back to their zero positions. The shaft is provided at one end with a lever arm 327 and crank pin 328 through which it can be rotated while at the other end is a disc 329 with a notch adapted to be engaged by a spring detent 330 when the shaft 322 is in its reset position.

The mechanism which effects the carry is constructed and arranged in the following manner. Upwardly directed parts 140a of the framing 140 support the ends of a horizontal shaft 331 which lies over and somewhat towards the back of the gear wheels 321. This shaft 331 carries loose thereon a series of sleeves 332 each of which is provided with two arms of which one 333, disposed towards one end of the sleeve, is curved and extends downwardly with its nose directed towards the stepped cam 323 of one gear wheel 321. The other arm 334, disposed towards the other end of the sleeve 332, projects rearwardly in a position such that it lies almost in the plane of the next adjacent gear wheel towards the left. Thus for example while the arm 334 of one sleeve 332 will lie almost in the plane of the gear wheel 321a the arm 333 will have its nose directed against the cam 323 of the gear wheel 321b. Pivotally connected to this second arm and hanging downwards therefrom is a pawl 335 provided with a series of teeth 336 of ratchet form, the pawl being acted on by a spring 337 which tends to move it so as to bring its teeth into engagement with the teeth of the gear wheel 321. Thus if one gear wheel as 321b has been rotated into a carry position and the carry mechanism is released, the lever arm 333 whose end bears against the cam 323 of this wheel can move towards the shaft 322 to an extent determined by the step in the cam then presented to it. As the lever 333 moves it carries with it the pawl 335 which then engages the teeth of the next adjacent gear wheel as 321a and turns this wheel through an angle which has been thus determined by the rotational position of the cam of the gear wheel 321b. Each pawl 335 is held normally in an inoperative position by a catch plate 338 carried on the ends of the arms 339 of a pair of two-armed levers which are pivoted at 340 on the frame member 140a, the catch plate being adapted to engage one or other of a series of studs 341 projecting laterally from each pawl.

The catch plate is shown in plan in Figure 37 and has a series of L-shaped openings 338a cut into it from its free edge and in each of these openings lies a pawl 335. The shape of these openings is such that when the catch plate is in the position shown in Figures 35 and 37 relative to the pawls 335, one or other of the lateral pawl studs 341 will be engaged by the catch plate, in the manner shown in Figure 37 where one of the pawls is indicated in section. If, however, the levers 339 are moved so as to throw the catch plate forward, then the edge portion of each pawl which carries the lateral studs 341 lies in the wider part of its L-shaped opening 338a, and all the pawls are free to move downwards through these openings in the catch plate. The second arm 342 of each of the catch levers is bent and arranged to engage a fixed horizontal bar 343. When the answer-indicating mechanism is lowered as shown in Figure 35 so that the gear wheels 321 are in engagement with the sliding racks, the pawls 335 are all held in their inoperative positions by the catch plate 338 owing to the action of the fixed bar on the catch levers, but when the answer-indicating mechanism is raised as shown in Figure 36 the pawls are all released from the catch plate so that they can operate on their several gear wheels and rotate them to the necessary extent if the adjacent gear wheels and their cams have been rotated past the carry points. When resetting takes place the pawls are restored to their initial positions by the action of the gear wheel cams 323 on the pawl levers 333 as the gear wheels 321 are turned back into their zero positions, the pawls being then freed from the catch plate since at this time the framing 140 is in its raised position.

In this structure of the machine the resetting mechanism is conveniently varied also in certain respects in view of the modifications involved in other parts of the apparatus. The resetting is effected as before by rotating by hand or power a cam shaft 220 which runs transversely across the mechanism (Figures 19 and 20). As in the form of the machine previously described, the turning of this shaft causes rewinding of the spring by means of which rotation is imparted to the shaft controlled by the escapement. In this case, however, this spring is conveniently mounted not on the escapement shaft 173 but on the cam shaft 220 which carries a gear wheel 224 meshing directly with a pinion on the escapement shaft. A second and short cam-carrying shaft 344 mounted at one side of the upper part of the machine (Figures 19 and 25) is driven by a gearing 345, 346 from a second gear wheel 224a on the main cam or resetting shaft 220. The cam shaft 344 performs various functions. A gear wheel 345 on this shaft meshes with a gear wheel 347 on a short shaft 348 mounted in the upper part of the side framing of the machine (see Figure 25). This shaft 348 carries at its inner end an arm 349 adapted when the shaft 348 is rotated to make contact with the lateral pin 328 on the lever arm 327 on the end of the shaft 322 which carries the gear wheels 321 of the answer-indicating mechanism.

Thus when the shaft 348 is rotated when resetting is taking place it will pick up the arm 327 and by turning the shaft 322 restore all the gear wheels 321 and the number-carrying wheels 318 to their initial positions. A shaft 350 extends transversely across the machine between the side frame members and in a convenient position below the frame plate 271 (see Figures 25 and 27). On the left hand end of this shaft 350 is an arm 351 connected by a link 352 to one arm 353 of a bell crank lever pivoted at 354. The other arm 355 of this bell crank lever is connected by a link 356 to a lug 357 formed on a part of the frame 140 of the answer-indicating mechanism adjacent to the shaft 151a on which the answer-indicating mechanism slides transversely. On the right hand end of the shaft 350 is a crank arm 358 with a pin 359 which lies in the path of a cam 360 on the cam shaft 344. As the answer-indicating mechanism is traversed to the left on the shaft 151a during operation of the machine it will cause the shaft 350 to be rotated by means of the mechanism described. When resetting is taking place and the cam shaft 344 is rotated the cam 360 will act on the crank pin 359 and turn the shaft 350 in a direction opposite to that in which it was rotated during traversing of the answer-indicating mechanism. The latter will therefore now be moved back towards the right and will be restored to its initial position.

In order to free the answer-indicating mechanism so that it may be thus moved back to the right, it is necessary to disengage from the rack 153 of that mechanism the crank pin 215 on the upper end of the vertical shaft 212 and this is effected in the following manner as resetting takes place. As in the construction of the machine first described the upper part of the shaft 212 is carried in a bearing block 213 which can slide in the front to back direction in a guide slot in a part of the fixed frame of the machine (see Figure 27). This permits of the upper part of the rod 212 being swung sufficiently to remove the crank pin on the upper end of this shaft fully clear of the rack 153. Adjacent to the sliding bearing block 213 there is pivotally mounted at 361 (see Figures 19 and 27) a short shaft which carries two lever arms of which one 362 is curved so that its end lies against one side of the sliding bearing block 213. The second arm 363 on the shaft 361 extends forwardly and carries a lateral pin which lies in the path of a cam 364 on the shaft 344. When this shaft is rotated this cam will impart such movement to the lever 362 as will cause the bearing block 213 to slide in the forward direction and thus swing the upper part of the shaft 212 to the desired extent.

Rotation of the cam shaft 344 also moves a locking member into such a position as to prevent actuation of the keys when resetting is taking place. This locking member comprises a rock shaft 365 mounted transversely at the front of the machine (see Figures 19 and 27) two upwardly directed arms 366 being carried on this fixed shaft towards its ends. These arms 366 are so formed and arranged that if the shaft 365 is rocked so as to swing the arms 366 rearwardly the upper ends of these arms will engage the under side of the upper universal bar 254 towards its ends and thus prevent this bar from being pushed down. Since as mentioned this bar must always be depressed when any number key is pushed down, the locking of the bar 254 in this manner has the effect of locking the keys. When the arms 366 are swung forwardly, which is their normal position during operation of the machine, the universal bar 254 is free. The rocking of the shaft 365 in order to move the locking arms 366 is effected through a link 367 which extends between one of the locking arms and a lever 368 pivoted at 369. The lever 368 extends upwardly and its upper end carries a lateral pin on which acts a cam 370 mounted on the shaft 344. This cam which is shown in Figure 19 is so shaped that when the shaft 344 is in its normal rotational position of rest during operation of the machine the locking arms 366 are positively held clear of the universal bar 254, but when the cam shaft 344 is rotated in the process of resetting the mechanism the locking arms 366 can swing rearwardly under spring action and lock the universal bar 254 and the keys.

A further effect of rotating the upper cam shaft 344 in the process of resetting is to cause the shield 317 which moves over the number wheels 318 to slide back into its initial position. The shield 317 projects upwardly from a carrier 371 which can slide on a transverse guide bar 372 mounted on the framing (see Figures 19, 25 and 27). The carrier 371 has formed on its upper side ratchet teeth 373 which can be engaged by a pawl 374 suitably pivoted. A hook-shaped detent 375 can also engage these teeth and is pivotally carried on the end of one arm 376 of a bell crank lever pivoted at 377 on the framing. The other arm 378 of this lever lies over a tail 255a formed on one of the side bars 255 of the universal bar 254 this tail extending rearwardly from the pivot axis 256 of this universal bar. Thus as and when a key is depressed and the universal bar 254 pushed down, the lever 378 will be raised and through the other arm 376 of the same lever and the pawl 375 the shield 317 will be pulled against the action of a spring to the right to the extent of one step when the shield will be retained in that position by the pawl 374. Two two-armed levers 379 and 380 suitably pivoted and having the ends of their adjacent arms connected are arranged so that the cam 370 when the shaft 344 on which it is mounted is rotated will act on one arm of the lever 380 and raise the further arm of the lever 379. This lever arm will then raise the pawls 374 and 375 clear of the teeth 373 with the result that the shield 317 being released will be moved back into its initial position by the spring acting thereon.

The resetting shaft is conveniently provided with a device which serves to determine the extent to which the main spring can or need be rewound, the amount of rewinding required being in accordance with the number of figures in the second factor of the sum last dealt with, since if there are a lesser number of figures the escapement shaft 173 will have rotated a lesser number of times and the answer-indicating mechanism will have been traversed through a lesser number of steps than if there are a larger number of figures in the factor. This rewind controlling device may comprise the following features reference being made more particularly to Figures 39 to 42. The cam shaft 220 has fixed on it a star-shaped member 390 with five projections 391 the number of the latter corresponding to the number of figures in the second factor. On each of these projections is pivoted at 392 a two-armed dog one arm 393 of which has at its end an outwardly directed projection while the other arm 394 has an inwardly directed projection. These dogs lie within a cylindrical flange 395 formed on the side of the drum 396 which encloses the coiled main spring 397 the outer end of which is connected to this drum. On the periphery of this drum 396 are formed five teeth 398 any one of which may be engaged by a pawl 399 carried by some fixed part of the framing (see Figure 19). The spring drum 390 can turn freely on a sleeve 400 mounted on the cam shaft 220. The inner end of the spring 397 is attached to the sleeve 400 and on the latter at one side of the spring drum there is mounted the gear wheel 224 which meshes with the pinion 226 on the shaft 173 controlled by the escapement.

On the other end of the sleeve 400 which projects beyond the side of the spring drum 396 adjacent to the star-shaped member 390 there is a flange 401 which carries an annular spring member fixed to the flange 401 at 402 while the opposite part of this annular member is provided with a projection 403 which acts as a cam and also as a detent. The spring formation of the member 403 is such that it can be moved laterally out of the path of the dogs 394 and yet act thereon in the following manner. If the shaft 220 and the star-shaped member 390 with the dogs 393, 393 turns, say, in a counter-clockwise direction, considering the mechanism as shown in Figure 42, the end of each dog arm 394 as it encounters the member 403 will mount the inclined edge 404 of that member and the dog will be turned so as to move inwards its arm 393. On the other hand, if the sleeve 400 rotates relatively to the shaft 220 in the same counterclockwise direction looking at Figure 42, so that the cam member 403 overtakes the inwardly directed end of a dog arm 394, then the cam member 403 will be deflected laterally and will ride over the end of the dog arm and the latter will not be moved.

The structure of the parts is shown more in detail in Figure 42a where it will be seen that the inner edge of the end of the dog arm 394 is bevelled off as at 405 while the leading straight edge of the cam member 403 is correspondingly bevelled off at 406. The parts shown in Figure 42a are represented as in plan thus in effect showing the uppermost dog and adjacent part of the cam member somewhat as they appear in Figure 42. It will be apparent then how when the cam member 403 moves in the direction of the arrow Figure 42a and overtakes the dog arm 394, lateral deflection of the cam member is caused. Each of the dogs 393, 394 is controlled by a spring 407 which tends to move outwardly the dog arm 393. In the flange 395 of the spring drum 396 there is formed a single opening 408 positioned so that it can be engaged by the outwardly directed end of any dog arm 393 according to the relative rotational positions of the shaft 220 with the dog-carrying member 390 and the spring drum 396.

As the machine is operated to feed in the factors of a sum the shaft 173 controlled by the escapement is rotated by the spring 397 acting through its inner end which is connected to the sleeve 400 on which is the gear wheel 224 meshing with the pinion 226 on the shaft 173, the spring drum 396 to which the outer end of the spring is attached being at this time held against rotation by the pawl 399. Since as the sleeve 400 thus rotates it will cause the cam member 403 to overtake the dog arms 394 the cam member will not act on these dog arms but will be deflected. At this time the outwardly directed end of one of the dog arms 393 will be in engagement with the opening 408 in the flange of the spring drum 396. When now the shaft 220 is rotated by means of a handle 409 for the purpose of resetting the mechanism, it will carry with it the spring drum 396 owing to the engagement of a dog arm 393 with the opening 408 in the spring drum flange. Rotation of the spring drum will then be continued and the spring will be wound up until the inwardly directed projection of the arm 394 of that dog whose arm 393 is in engagement with the opening in the spring drum flange comes in contact with the cam member 403, when that dog will be disengaged from the spring drum flange and the latter will be held by the pawl 399 in the position into which it has been rotated. Thus the angle through which the spring drum 396 and the end of the spring which is attached thereto is turned in the process of resetting is determined in accordance with the angle through which the sleeve 400 to which the inner end of the spring is attached has turned in rotating the shaft 173 during feeding in of the figures.

The structure and arrangement of the parts constituting and immediately controlled by the escapement 171, 172, resemble to a considerable extent the corresponding parts in the machine structure first described above. It may be noted, however, that in this case since the sliding racks 280, 281, 282, 283, 284 and 285 and the feeler members associated with them cannot move rearwardly beyond their zero positions, there is no necessity to provide means with interposed yielding connections for moving the levers 192 rearwardly. Thus, as shown in Figure 20, the levers 192 mounted loosely on the shaft 191 are only acuated through rearwardly directed arms 194 extending from the sleeves on that shaft and rods 200 arranged with springs so as to constitute a yielding connection between the end of each lever 194 and corresponding lever 192.

The raising and lowering of the framing 140 carrying the answer-indicating mechanism is effected in a positive manner by movement derived from the universal bar 36, see Figure 24. A link 410 extends from a stud 411, which projects on the inner side of one arm 37 of the universal bar 36 (see Figure 25), to a plate-like lever 412 pivoted at 413 (see Figure 28) on the lefthand side of the upper part of the machine. The broad free end of this lever 412 is rounded and engages the forked end of a lever 152 which extends from one of the side members of the frame 140 (see Figure 20), the breadth of the end of the lever 412 being such that it will remain in engagement with the end of the lever 152 during the whole of the traversing movement of the answer-indicating mechanism carried by the framing 140.

Below and near the end of the lever 412 is a bar 414 (Figures 24 and 28) which projects laterally from the adjacent side of the frame guide plate 287 in which move the sliding rack members. In this bar 414 are a series of five teeth 415 equally spaced apart at distances corresponding to the distances between the sliding rack members 280, 281, 282, 283, 284, 285. The under side of the end of the lever 152 is formed as at 152a so as to engage any one of the teeth 415 when the answer-indicating mechanism is lowered. This mechanism is thus locked in any one of the positions into which it can be traversed. The answer-indicating mechanism is raised by the action of a spring 416 which acts on the under side of the lever 412 (see Figures 20 and 27), the gear wheels 321 being then disengaged from the sliding rack members. When however the universal bar 36 is depressed owing to the depression of a key when feeding in a figure in the second factor, the answer-indicating mechanism will be lowered so as to bring the gear wheels thereof into engagement with the sliding rack members and these gear wheels will then be rotated as these rack members move forward during the process of feeling the stops set up.

While, as mentioned, in their general structure, arrangement and operation the plate-like levers 90, the vertically sliding rods 70 which act on these levers and the stops which are lifted by these levers resemble the corresponding parts described in detail with respect to the structure of machine first referred to above, some reference may be made to small modifications in these parts, indicated more particularly in Figures 31 and 43. Figure 30 shows also the multiplication table set out in the form which is followed in the mechanical representation of this multiplication table in this modified machine structure wherein, as mentioned, there are no stops with 0 value positively set up by selective lifting of plates 90 but the flap devices 294, 294a and 299, described above more particularly with reference to Figures 32, 33 and 34, function automatically as stops with the value of 0. In the present machine the vertically sliding rods 70 are conveniently formed as flat strips each of which is shouldered towards its lower end so as to enable the rod to be supported in its lowered position by the sliding bar 66. Each rod is also shouldered at 75 as by reducing in width its upper part 74, as shown in Figure 31, to enable the rod when pushed up to lift a plate-like lever 90 in the lower set as well as a corresponding plate-like lever in the upper set against the under side of which latter lever the extreme end 73 of the rod 70 will bear.

Fig. 43 shows in plan by way of example those end portions of four plate-like levers 90 which are acted on by rods 70 and in turn act on and push up stop pins. It is to be noted that the rods 70 and upper and lower sets of plate-like levers 90 composing a section of the selector are substantially formed, arranged and operate to push up the stops in a similar manner in each section of the selector. Thus these parts as shown in Figure 31 may be taken as typical of the same parts in each of the sections of the selector. The sectional elevation in that figure indicates the No. 9 row of rods 70 which is swung in the forward direction by sliding the bar 66, when the 9 key is depressed for feeding in that figure in the first factor, thus positioning all the rods in the row so that when any knife 80 is raised it will push up a rod in this row and lift one or more plates thereby pushing up stop pins with position values corresponding to the products indicated in the lower row in the multiplication table as set out in Figure 30. Thus the product value obtained by pushing up any one of these rods 70 is indicated by the figures marked on the rod, thus 9, 18, 27, and so on. It may be noted that the rods 70 shown in Figure 21 are there similarly marked, these rods however being those in a No. 7 row. An examination of Figure 31 will show how the stops with the required values are pushed up when the necessary plates 90 are lifted, the number values of the several plates being indicated at the left hand side of the figure. The lower set of plates deals with the unit figures while the upper set of plates deals with the tens figures. Reference should be made in this connection also to Figure 26. Figure 31 may be, for example, taken as indicating the parts comprised in the D section of the selector.

In Figure 43 there are shown the plate-like levers with number values 8 and 9 in the units or lower set of the D section of the selector and the plates with number values 7 and 8 in the tens or upper set of the same section of the selector. Considering the plate 9*d*, the rectangular holes 94*d* provide for the clear passage through the plate of the upper parts 74 of the rods 70 whose ends are to act on and raise plates in the upper set. The smaller squares indicate in section the upper parts 74 of those rods 70 whose shoulders 75 bear against the under side of this plate and cause it to be lifted when any one of these rods is pushed up. If the positions of these sectioned rod portions 74 are compared with the multiplication table as set out in Figure 30, it will be seen that they correspond with the positions in the multiplication table of the units figure 9. The holes 96 are clearance holes for the passage therethrough of all stop pins with number values less than 9 in the row 302. The lower end of the stop pin with number value 9 in this row rests on this plate. The plate 8*d* is arranged in a similar manner the upper parts 74 of those rods 70 being indicated in section which when pushed up raise this plate in order to set up a stop with number value 8 in the units, the positions of these rods corresponding to the positions of the figure 8 in the units in the multiplication table as set out in Figure 30.

The plate marked 8*dd* is the uppermost plate in the upper set of those shown in Figure 31. There is no occasion to provide in this plate any rectangular holes for the passage of the upper parts of rods 70 since no one of these rods extends above this plate. The holes 96 are clearance holes for all the stop pins in the units row 302 which pins are pushed up when plates in the lower set are lifted. Along the other side of the plate 9*dd* are seven holes 96*x* which are clearance holes for the passage of all the stop pins in the tens row 304 except that with number 8 value whose lower end rests on the plate 8*dd* so that it will be pushed up when this plate is lifted. The plate 7*dd* has the same nine holes 96 along one edge but only six holes 96*x* along the other edge since this plate serves to push up the stop pin with number 7 value. In this plate there is a clearance hole 94*dd* through which can pass the upper part 74 of that rod whose upper end serves to lift the plate 8*dd*. By reference to Figure 31, it will be seen that this same rod when pushed up will lift by means of its shoulder 75 the lowermost plate 8 with number value 1 in the lower or units set of plates 90*d*.

The details of construction may be varied as found necessary in accordance with the capacity of the machine and it is to be noted that modifications may be made in the structure and disposition of the parts in accordance with the desired capacity of the machine. Further, the principal features of the invention as set out above and shown in certain constructional embodiments described by way of example, may be used in various forms in association with other structures in other calculating mechanisms.

What I claim as my invention and desire to secure by Letters Patent is:—

1. In a calculating machine for performing multiplication the combination of a plurality of movable stops indicative of partial product values, means whereby any one of these stops can be selected and set up, a set of numeral keys, a plurality of sets of members distinct from said means by movement of which the stop selection and setting up means is actuated, and means whereby as and when successive key operation takes place the said members are moved in different sets in succession.

2. In a calculating machine for performing multiplication the combination of a plurality of movable stops indicative of partial product values, means whereby any one of these stops can be selected and set up, a set of numeral keys, a plurality of sets of members by movement of which the stop selector mechanism is actuated so as to perform one part of the selection process, a single set of members by movement of which the stop selector mechanism is actuated so as to complete the selection and set up the selected stops, and means whereby as and when successive key operation takes place the said members are moved in different sets in succession.

3. In a calculating machine for performing multiplication the combination of a plurality of movable stops indicative of partial product values, means whereby any one of these means comprising a plurality of selector mechanism sections which function severally in respect of different denominations, means whereby the mechanism in each selector section is actuated independently of the other selector sections so as to perform in that one section a part of the selection process, means whereby the mechanisms in a plurality of the selector sections can be actuated simultaneously so as to complete therein the selection process and set up the stops selected thereby, a set of numeral keys, and means whereby as and when successive key operation takes place the said means for actuating the selector mechanisms are operated in succession so as to perform first the one part of the selection process and then complete this process and set up the selected stops.

4. In a calculating machine for performing multiplication the combination of a plurality of movable stops indicative of partial product values, means whereby any one of these stops can be selected and set up, a plurality of sets of members by movement of which the stop selection and setting up mechanism is actuated, a set of numeral keys, key-actuated members interposed between the keys and the said selector actuating members these key-actuated members being arranged on the one hand in sets corresponding to and cooperating with the several sets of selector actuating members and on the other hand being grouped in relation to the several keys so that a key-actuated member belonging to each set is associated with and can be actuated by one and the same key, and means whereby the operative relation between each key and the key-actuated members forming the group associated with that key can be altered so that selector actuating members will be operated in different sets in succession as and when successive key operation takes place.

5. In a calculating machine for performing multiplication the combination of a plurality of movable stops indicative of partial product values, mechanism whereby any one of these stops can be selected and set up, a single set of numeral keys, a plurality of sets of levers by actuation of which partial selection is effected in the selector mechanism, means whereby successive key operation for the purpose of feeding into the machine the first factor of the sum causes the actuation of the said levers in separate sets in succession, a set of levers by actuation of which selection is completed in the selector mechanism and the stops selected are set up, and means whereby these levers will be actuated when feeding in of the first factor has been completed and the second factor in the sum is fed in by key operation.

6. In a calculating machine for performing multiplication the combination of a plurality of movable stops indicative of partial product values, mechanism whereby any one of these stops can be selected and set up this mechanism comprising vertical rods each movable independently in the direction of its length, the lower ends of all these rods appearing in end view as in parallel rows which extend in two directions in one plane and at right angles, the rods forming those rows which extend in one direction constituting sets so mounted that all the rods in a selected set can be moved simultaneously as by swinging in a direction transverse to their length, a series of knife-like members mounted so that each knife is movable towards the ends of the rods, all these knives lying parallel and extending in a direction forming an angle to the direction in which the rods are movable transversely, this selective movement of the set of rods bringing the ends of these rods into the paths of the knives and the selective reciprocating movement of a knife causing those rods which have been swung into its path to be pushed up, means whereby the selected rods when thus pushed up will set up corresponding stops, a plurality of sets of selector-actuating members by movement of which swinging of the said sets of rods is effected and the said knife-like members are moved, a set of numeral keys, and means whereby as and when successive key operation takes place the said selector-actuating members are moved in different sets in succession.

7. In a calculating machine for performing multiplication the combination of a plurality of sets of movable stops indicative of partial product values, mechanism whereby any one of these stops can be selected and set up, a single set of numeral keys, a plurality of sets of members by movement of which the stop selection and setting up mechanism is actuated, means whereby as and when successive key operation takes place the said members are moved in different sets in succession, and mechanism for feeling the stops which have been selected and set up and for indicating the answer values thereby ascertained comprising a series of members each of which is movable from a zero position through a distance which is a measure of a partial product value, means whereby after they have moved into the positions determined by the stops set up these feeling members are restored to their zero positions, and means whereby the movements of the feeling members as determined by the stops are utilized to indicate the answer to the sum performed in the machine.

8. In a calculating machine for performing multiplication the combination of a plurality of sets of movable stops indicative of partial product values, mechanism whereby any one of these stops can be selected and set up, a set of numeral keys, a plurality of sets of members by movement of which the stop selection and setting up mechanism is actuated, means whereby as and when successive key operation takes place the said members are moved in different sets in succession, and mechanism for feeling the stops which have been selected and set up and for indicating the answer values thereby ascertained comprising a series of members each of which is movable from a zero position through a distance which is a measure of a partial product value, such distances being determined by the stops set up and each of said stops having a position value in relation to the zero position of a movable member, means by which the distance through which at least one of the said feeling members moves is determined as a result of feeling stops in two separate sets while in the case of at least one of the feeling members the distance through which it moves is determined by a stop in a single corresponding set, means whereby after they have moved into the positions determined by the stops set up these feeling members are restored to their zero positions, and means whereby the movements of the feeling members as determined by the stops are utilized to indicate the answer to the sum performed in the machine.

9. In a calculating machine for performing multiplication the combination of a plurality of movable stops indicative of partial product values, means whereby any one of these stops can be selected and set up, a set of numeral keys, a plurality of sets of members by movement of which the stop selector mechanism is actuated so as to perform one part of the selector process, a single set of members by movement of which the stop selector mechanism is actuated so as to complete the selection and set up the selected stops, key-actuated rod-like members through which the said selector actuating members are operated, and means whereby key operation when feeding in the first factor in the sum will cause all these rod-like members to be swung transversely to their length simultaneously thereby altering the operative relation between the keys and the sets of selector actuating members.

10. In a calculating machine for performing multiplication the combination of a plurality of sets of movable stops indicative of partial product values, mechanism whereby any one of these stops can be selected and set up, a single set of numeral keys, a plurality of sets of members by movement of which the stop selection and setting up mechanism is actuated, means whereby as and when successive key operation takes place the said members are moved in different sets in succession, mechanism for feeling the stops which have been selected and set up and for indicating the answer values thereby ascertained comprising a series of members each of which is movable from a zero position through a distance which is a measure of a partial product value, means whereby after they have moved into the positions determined by the stops set up these feeling members are restored to their zero positions, and means whereby the movements of the feeling members as determined by the stops are utilized to indicate the answer to the sum performed in the machine, a shaft which tends to be rotated constantly in one direction by a source of power, an escapement controlling the rotation of the shaft, key-actuated mechanism for operating this escapement, means whereby rotation of the shaft imparts movement to the feeling members.

11. In a calculating machine for performing multiplication, the combination with a plurality of sets of movable elements, each set representing digits of a different denomination, of a single set of numeral keys for selectively moving said elements, means operated by successive actuation of said keys to feed in the digits of one factor for placing said set of keys in successive operative relation to the several sets of movable elements, and means operated by actuation of said keys to feed in the digits of the other factor for placing said set of keys in operative relation to the sets of movable elements.

12. In a calculating machine for performing multiplication, the combination with a plurality of sets of movable elements, each set representing digits of a different denomination, of a single set of numeral keys, means whereby successive operation of keys to feed in the digits of one factor serves to move the corresponding elements in successive sets and means whereby operation of keys to feed in the digits of the other factor serves to move the corresponding elements in the several sets.

13. In a calculating machine, the combination with a plurality of sets of movable elements, each set representing digits of a different denomination, of a single set of numeral keys, and means whereby a predetermined number of key operations in succession serve to effect partial selection of the movable elements in the successive sets and continued successive operation of keys serves to complete the selection of these elements and move the elements selected.

14. In a calculating machine, the combination with a plurality of sets of movable elements, each set representing digits of a different denomination, of a single set of numeral keys, and means whereby a predetermined number of key operations in succession serve to effect partial selection of the movable elements in the successive sets and continued successive operation of keys serves to complete the selection of these elements in all of the sets simultaneously and move the elements selected.

15. In a calculating machine, the combination with a plurality of sets of movable elements, each set representing digits of a different denomination, of a single set of numeral keys for selectively moving said elements, and means operable on a predetermined number of successive actuations of said keys for placing said set of keys in successive operative relation to the several sets of movable elements to effect partial selection of the movable elements in successive sets and to thereafter place said keys in operative relation to all of said sets simultaneously, to complete the selection and move the elements selected.

16. In a calculating machine for performing multiplication, the combination with a numeral key, of a plurality of members associated with said key, and means operable on successive actuation of said key in feeding in one factor to place some of said members one at a time and in succession in operative relationship with said key, and operable on further actuation of said key in feeding in the second factor to place another of said members in operative relationship with said key.

17. In a calculating machine for performing multiplication, the combination with a numeral key of a plurality of members associated with said key, each of said members except one representing a different denomination, and means operable on successive actuation of said key in feeding in one factor to place some of said denominational members successively in operative relationship with said key, and operable on further actuation of said key to place and retain the excepted one of said members in operative relationship with said key.

18. In a calculating machine for performing multiplication, the combination with a single set of numeral keys, of a plurality of movable members associated with each key, and means operable on actuation of any key in feeding in one factor for shifting one of the said members associated with each key out of key-operable position and for shifting another of the said members associated with each key into key-operable position, and operable on further actuation of a key in feeding in the second factor to retain the last of said members thus placed in operative relationship with the associated keys.

19. In a calculating machine, the combination with a plurality of sets of movable members, the members in each set representing digits of a denomination different from that of the other set, means for effecting partial selection of certain members in each set by displacement thereof in one direction, means for completing the selection by displacement in another direction of certain of the members displaced by the operation of effecting partial selection, said last named means acting to complete the selection in all sets simultaneously, and a single set of numeral keys for actuating both of said means.

20. In a calculating machine, the combination with a plurality of sets of movable members, the members in each set representing digits of a denomination different from that of the other set, means for effecting partial selection of certain members in each set by displacement thereof in one direction, said means acting in each set in succession in distinct and successive operations thereof, means for completing the selection by displacement in another direction of certain of the members displaced by the operation of effecting partial selection, said last named means acting to complete the selection in all sets simultaneously, and a single set of numeral keys for actuating both of said means.

21. In a calculating machine, the combination with a plurality of sets of movable members, the members in each set representing digits of a denomination different from that of the other set, means for effecting partial selection of certain members in each set by displacement thereof in one direction, means for completing the selection by displacement in another direction of certain of the members displaced by the operation of effecting partial selection, and a single set of numeral keys for actuating both of said means.

22. In a calculating machine, the combination with a plurality of sets of movable members, the members in each set representing digits of a denomination different from that of the other set, means for effecting partial selection of certain members in each set by displacement thereof in one direction, means for completing the selection by displacement in another direction of certain of the members displaced by the operation of effecting partial selection, a single set of numeral keys for actuating both of said means, and means operable by actuation of said keys whereby the operative connection between said keys and said first named means is automatically shifted to said second named means.

23. In a calculating machine, the combination with a plurality of sets of movable members, the members in each set representing digits of a denomination different from that of the other set, means for effecting partial selection of certain members in each set by displacement thereof in one direction, said means acting in each set in succession in distinct and successive operations thereof, means for completing the selection by displacement in another direction of certain of the members displaced by the operation of effecting partial selection, said last named means acting to complete the selection in all sets simultaneously, a single set of numeral keys for actuating both of said means, and means operable by successive actuation of said keys for placing said keys in operative relationship with said first named means to effect distinct operation thereby of members in successive sets and for thereafter placing said keys in operative relationship with said second named means.

24. In a calculating machine for performing multiplication, the combination of a plurality of movable stops indicative by their relative positions of partial product values, means whereby any one of these stops can be selected and individually set up, these means comprising a plurality of fixed selector mechanism sections which function severally in respect of different denominations, means whereby the mechanism in each selector section is actuated independently of the other selector sections so as to perform in that one section a part of the selection process, means whereby the mechanisms in a plurality of the selector sections can be actuated simultaneously so as to complete therein the selection process and set up the stops selected thereby, a set of numeral keys, and means whereby as and when successive key operation takes place the said means for actuating the selector mechanisms are operated in succession so as to perform first the one part of the selection process and then complete this process and set up the selected stops.

25. In a calculating machine for performing multiplication, the combination of a plurality of sets of movable elements, each set representing digits of different denomination, these sets of movable elements constituting stop-selecting mechanism, a plurality of movable stops with means for setting up these stops when elements selected from the said steps are moved, a single set of numeral keys for selectively moving said elements, and means operated by successive actuation of said keys when feeding in the figures in one factor for placing said set of keys in successive operative relation to the several sets of movable elements and operated by further actuation of said keys when feeding in the figures in the other factor for placing said set of keys in operative relationship to the sets of movable elements.

26. In a calculating machine for performing multiplication, the combination of a plurality of sets of movable elements, each set representing digits of different denomination, these sets of movable elements constituting stop-selecting mechanism, a plurality of movable stops with means for setting up these stops when elements selected from the said sets are moved, a single set of numeral keys, and means whereby successive operation of keys when feeding in the figures in one factor serves to move the corresponding elements in successive sets, and whereby operation of keys when feeding in the figures in the other factor serves to move the corresponding elements in the several sets.

27. In a calculating machine for performing multiplication, the combination with a single set of numeral keys, of a plurality of movable members associated with each key, and means operable during actuation of said keys to separately feed in the digits in the two factors for shifting one of the said members associated with each key out of key-operable position and for shifting another of the said members associated with each key into key-operable position.

28. In a calculating machine for performing multiplication, the combination with a single set of numeral keys, of a plurality of movable members associated with each key, and means operable on actuation of a key to feed in the sole remaining digit in the first factor for shifting one of the said members associated with each key out of key-operable position and for shifting another of the said members associated with each key into key-operable position.

29. In a calculating machine for performing multiplication, the combination with a numeral key, of a plurality of members associated with said key, a group of said members functioning with respect to digits of different denomination in one factor, and one of said members functioning with respect to all denominations in the second factor, and means responsive to actuation of said numeral key for operatively associating said members in succession with said key.

30. In a calculating machine for performing multiplication, the combination with a numeral key, of a plurality of members associated with said key, a group of said members functioning with respect to digits of different denomination in one factor, and one of said members functioning with respect to all denominations in the second factor, and means responsive to actuation of said numeral key in feeding in the first factor for placing the members in said group and thereafter the remaining one of said members in successive operative relationship with said key.

31. In a calculating machine for performing multiplication, the combination with a numeral key, of a plurality of members associated with said key, a group of said members functioning with respect to digits of different denomination in one factor, and one of said members functioning with respect to all denominations in the second factor, and means for operatively associating said members in succession with said key.

32. In a calculating machine for performing multiplication, the combination with a numeral key, of a plurality of members associated with said key, and means operable on successive actuation of said key in feeding in one factor to place some of said members one at a time and in succession in operative relationship with said key, the last of said members thus placed in operative relationship with said key remaining operative during the feeding in of the second factor.

33. In a calculating machine for performing multiplication, the combination with a numeral key, of a plurality of members associated with said key, means operable on successive actuation of said key in feeding in one factor to place some of said members one at a time and in succession in operative relationship with said key, and means including stop elements associated with said members and positioned thereby.

34. In a calculating machine of the type in which stops are set up and felt for the purpose of obtaining and indicating an answer, the combination with a plurality of sets of stops, of a mechanism for selecting and positioning said stops, said mechanism consisting of a plurality of selector sections, each such section being allocated to a different denomination of digits, and means whereby each selector section is enabled to select and position a stop in each of two separate sets of stops to represent a partial product value.

35. The combination recited in claim 34 in which each selector section includes a set of superposed plate like elements, each of which is operatively related to a stop in the corresponding set.

36. In a calculating machine of the type in which stops are set up and felt for the purpose of obtaining and indicating an answer, the combination with a plurality of bodily movable stops, of a plurality of apertured plates, one of said plates being operatively associated with each stop for the purpose of setting up the same, a plurality of rods passing through the apertures in some of said plates and operatively engaging with others of said plates, whereby said plates may be selectively moved, and key-operated means for selecting and operating said rods.

37. In a calculating machine of the type in which stops are set up and felt for the purpose of obtaining and indicating an answer, the combination with a plurality of bodily movable stops, of a plurality of apertured plates, one of said plates being operatively associated with each stop for the purpose of setting up the same, a plurality of rods passing through the apertures in some of said plates and operatively engaging with others of said plates, certain of said rods being constructed and arranged to operatively engage with a plurality of plates, whereby movement of each rod effects selective movement of one or more plates, and key-operated means for selecting and operating said rods.

38. In a calculating machine for performing multiplication, the combination with a plurality of individually movable stops, of means for selecting and positioning certain of said stops to represent partial products, said stops being arranged in parallel rows, and mechanism for accumulating the partial products thus represented, said mechanism including a plurality of members individually movable in the direction of the parallel rows of stops, said members being adapted to engage and feel the selected and positioned stops in the corresponding rows.

39. In a calculating machine for performing multiplication, the combination with a plurality of individually movable stops, of means for selecting and positioning certain of said stops to represent partial products, said stops being arranged in parallel rows, and comprising pins longitudinally slidable in the planes defined by such rows, and mechanism for accumulating the partial products thus represented, said mechanism including a plurality of members individually movable in the direction of the parallel rows of stops, said members being adapted to engage and feel the selected and positioned stops in the corresponding rows.

40. In a calculating machine for performing multiplication, the combination with a plurality of individually movable stops, of means for selecting and positioning certain of said stops to represent partial products, said stops being arranged in parallel rows, mechanism for accumulating the partial products thus represented, said mechanism including a plurality of members individually movable in the direction of the parallel rows of stops, said members being adapted to engage and feel the selected and positioned stops in the corresponding rows, and means whereby at least one of said members is shifted during movement thereof from a path defined by one of said rows to a path defined by another of said rows, whereby the distance through which said member moves is determined by stops in two separate rows.

41. In a calculating machine for performing multiplication, the combination with a plurality of individually movable stops, of means for selecting and positioning certain of said stops to represent partial products, said stops being arranged in parallel rows, mechanism for accumulating the partial products thus represented, said mechanism including a plurality of members individually movable in the direction of the parallel rows of stops, said members being adapted to engage and feel the selected and positioned stops in the corresponding rows, and means movable in the direction of one of said rows and arranged to be engaged and moved by one of said members when the latter is deflected on engaging a positioned stop in an adjacent row, whereby the distance through which said member moves is determined by stops in two adjacent rows.

42. In a calculating machine, the combination with a plurality of independently movable stops arranged in rows, of mechanism whereby certain of said stops are selected and positioned, members arranged to move along certain of said rows to engagement with selected and positioned stops therein, means arranged to move along a row of stops adjacent to one of said last named rows and the member movable along the same into engagement with a selected and positioned stop in said row, and means whereby said last named member is deflected on engagement with a selected and positioned stop to cause said member to engage and move with said means, whereby the total distance through which said member moves may be determined by the selected and positioned stops in two separate rows.

43. In a calculating machine for performing multiplication, the combination with a plurality of individually movable stops, of means for selecting and positioning certain of said stops to represent partial products, each stop representing one digit only of a partial product, and mechanism for accumulating the partial products thus represented, said mechanism including a plurality of members, each of which is associated with and individually movable toward certain of said stops, the distance through which each member moves being determinable by the selection and positioning of at least one of the associated stops.

44. In a calculating machine for performing multiplication, the combination with a plurality of individually movable stops, of means for selecting and positioning certain of said stops to represent partial products, each stop representing one digit only of a partial product, mechanism for accumulating the partial products thus represented, said mechanism including a plurality of members, each of which is associated with and individually movable toward certain of said stops, the distance through which each member moves being determinable by the selection and positioning of at least one of the associated stops, and means whereby at least one of said members moves through a distance determinable by the selection and positioning of two stops representing digits of the same order of different partial products.

45. In a calculating machine for performing multiplication, the combination with a plurality of individually movable stops, of means for selecting and positioning certain of said stops to represent partial products, said stops being arranged in parallel rows, mechanism for accumulating the partial products thus represented, said mechanism including a plurality of members individually movable in the direction of the parallel rows of stops, said members being adapted to engage and feel the selected and positioned stops in the corresponding rows, and means whereby at least one of said members may engage and feel stops in two separate rows.

46. In a calculating machine for performing multiplication, the combination with a plurality of individually movable stops, of means for selecting and positioning certain of said stops to represent partial products, said stops being arranged in parallel rows, and mechanism for accumulating the partial products thus represented, said mechanism including a plurality of members individually movable in the direction of the parallel rows of stops, said members being adapted to engage and feel the selected and positioned stops in the corresponding rows, at least one of said members having a pivoted portion provided with two arms, each of said arms being adapted to engage and feel stops in two separate rows representing digits of the same order of different partial products.

47. In a calculating machine for performing multiplication, the combination with a plurality of individually movable stops, of means for selecting and positioning certain of said stops to represent partial products, said stops being arranged in parallel rows, mechanism for accumulating the partial products thus represented, said mechanism including a plurality of members individually movable in the direction of the parallel rows of stops, said members being adapted to engage and feel the selected and positioned stops in the corresponding rows, and means whereby at least one of said members may be deflected on engagement with a selected and positioned stop in one of said rows and move a further distance determinable by a selected and positioned stop in an adjacent row.

48. In a calculating machine for performing multiplication, the combination with a plurality of individually movable stops, of means for selecting and positioning certain of said stops to represent partial products, said stops being arranged in parallel rows, mechanism for accumulating the partial products thus represented, said mechanism including a plurality of members individually movable in the direction of the parallel rows of stops, said members being adapted to engage and feel the selected and positioned stops in the corresponding rows, means whereby at least one of said members may be deflected on engagement with a selected and positioned stop in one of said rows and move a further distance determinable by a selected and positioned stop in an adjacent row, said member including means movable to engage a positioned stop in the adjacent row, and means for coupling said last named means and said deflected member for unitary movement.

In testimony whereof I have signed my name to this specification.

HAROLD ISHERWOOD.